(12) United States Patent
Tanabe et al.

(10) Patent No.: US 12,420,739 B2
(45) Date of Patent: Sep. 23, 2025

(54) VEHICLE SEAT DEVICE

(71) Applicant: TS TECH CO., LTD., Saitama (JP)

(72) Inventors: Jinichi Tanabe, Tochigi (JP); Tatsuki Nonaka, Tochigi (JP); Atsushi Yamabe, Tochigi (JP); Shoji Endo, Tochigi (JP); Katsuya Isomura, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 99 days.

(21) Appl. No.: 18/027,950

(22) PCT Filed: Sep. 29, 2021

(86) PCT No.: PCT/JP2021/035904
§ 371 (c)(1),
(2) Date: Mar. 23, 2023

(87) PCT Pub. No.: WO2022/071408
PCT Pub. Date: Apr. 7, 2022

(65) Prior Publication Data
US 2023/0365098 A1    Nov. 16, 2023

Related U.S. Application Data
(60) Provisional application No. 63/085,231, filed on Sep. 30, 2020.

(51) Int. Cl.
*B60R 22/20* (2006.01)
*B60N 2/20* (2006.01)

(52) U.S. Cl.
CPC ............ *B60R 22/20* (2013.01); *B60N 2/20* (2013.01); *B60R 2022/208* (2013.01)

(58) Field of Classification Search
CPC .................. B60R 22/20; B60N 2022/208
See application file for complete search history.

(56) References Cited

U.S. PATENT DOCUMENTS
2019/0135137 A1* 5/2019 Jameson ............ B60N 2/015
2019/0299896 A1  10/2019 Nagasawa
(Continued)

FOREIGN PATENT DOCUMENTS
CN   110116704 A     8/2019
CN   117301976 A *  12/2023 ............ B60N 2/02
(Continued)

OTHER PUBLICATIONS
International Search Report mailed on Dec. 14, 2021, for the corresponding PCT Application No. PCT/JP2021/035904, with English machine translation.
(Continued)

*Primary Examiner* — Timothy J Brindley
(74) *Attorney, Agent, or Firm* — Michael Best & Friedrich LLP

(57) ABSTRACT

A vehicle seat device capable of suitably restraining an occupant by means of a seat belt device includes a seat main body having a seat cushion and a seat back, a reclining device connecting the seat back to the seat cushion so as to be pivotable and capable of locking a pivoting motion of the seat back, and a seat belt device for restraining an occupant seated on the seat main body. The seat belt device includes a lap belt restraining the occupant's lumbar or thighs, a belt anchor attached at a position beside the seat main body and having a belt engaging portion engaging with an engaged portion provided in a tip portion of the lap belt, and an anchor moving device capable of moving the belt engaging portion of the belt anchor in a seat front to back direction with respect to the seat main body.

12 Claims, 45 Drawing Sheets

(56) References Cited

U.S. PATENT DOCUMENTS

| | | | | |
|---|---|---|---|---|
| 2020/0139863 | A1* | 5/2020 | Mori | B60N 2/42763 |
| 2023/0051418 | A1* | 2/2023 | Kim | B60R 22/26 |
| 2023/0202423 | A1* | 6/2023 | Kini | B60R 22/1958 |
| | | | | 280/806 |
| 2024/0092309 | A1* | 3/2024 | Ramirez | B60R 22/03 |
| 2024/0140352 | A1* | 5/2024 | Schneider | B60R 22/26 |

FOREIGN PATENT DOCUMENTS

| | | | | |
|---|---|---|---|---|
| DE | 102021113102 A1 | * | 11/2021 | ............ B60R 22/20 |
| DE | 102021203753 A1 | * | 10/2022 | |
| EP | 1607286 A1 | | 12/2005 | |
| EP | 3922512 A1 | * | 12/2021 | ............ B60N 2/20 |
| FR | 3128416 A1 | * | 4/2023 | |
| JP | S63-180452 U | | 11/1988 | |
| JP | H01-152860 U | | 10/1989 | |
| JP | H05-46529 Y2 | | 12/1993 | |
| JP | H08-183426 A | | 7/1996 | |
| JP | 2001-122076 A | | 5/2001 | |
| JP | 2010-070158 A | | 4/2010 | |
| JP | 2017-030640 A | | 2/2017 | |
| JP | 2018-090224 A | | 6/2018 | |
| JP | 2019-177780 A | | 10/2019 | |
| WO | 2017/022738 A1 | | 2/2017 | |

OTHER PUBLICATIONS

Chinese Office Action dated Jan. 25, 2025 from the China National Intellectual Property Administration (CNIPA) for the corresponding Chinese Patent Application No. 202180066734.8, with English machine translation.

* cited by examiner

VEHICLE SEAT DEVICE

CROSS-REFERENCE TO RELATED APPLICATIONS

This application is a National Entry application of PCT Application Serial Number PCT/JP2021/035904, filed Sep. 29, 2021. Further, this application claims priority from U.S. Provisional Application No. 63/085,231, filed Sep. 30, 2020, the entire contents of which are hereby incorporated by reference into this application.

TECHNICAL FIELD

The present invention relates to a vehicle seat device. More particularly, the present invention relates to a vehicle seat device provided with a seat belt device for restraining an occupant seated on a seat main body.

BACKGROUND ART

Known in the related art is a vehicle seat device including a seat main body having a seat cushion and a seat back, a reclining device connecting the seat back to the seat cushion so as to be pivotable and capable of locking a pivoting motion of the seat back, and a seat belt device for restraining an occupant seated on the seat main body (see, for example, PATENT LITERATURE 1).

The vehicle seat device that is described in PATENT LITERATURE 1 includes a seat belt having a shoulder portion and a lap belt portion, belt drive means for performing winding and unwinding of the shoulder portion, first sensing means for sensing a frontal collision of a vehicle, second sensing means for sensing a change in an occupant's seating state, and control means for controlling the drive of the belt drive means.

According to the disclosure, when a frontal collision of the vehicle is sensed by the first sensing means, the control means controls the belt drive means based on the change in seating state sensed by the second sensing means to perform predetermined seat belt (shoulder portion) winding and unwinding motions.

By doing so, the occupant can be restrained in the event of a frontal collision of the vehicle. Specifically, it is possible to avoid, as much as possible, a state where the occupant slips under the seat belt and moves forward to make it difficult to absorb the impact with an airbag or the like.

CITATION LIST

Patent Literature

PATENT LITERATURE 1: JP 2019-177780 A

SUMMARY OF INVENTION

Technical Problem

By the way, in a vehicle seat device such as that disclosed in PATENT LITERATURE 1, there has been a demand for a technique that enables a seat belt device to restrain an occupant more suitably.

Specifically, it has been required to further suppress a phenomenon in which an occupant slips under a seat belt and moves forward in the event of a frontal collision of a vehicle (also referred to as a submarine phenomenon).

Also known is that, in a case where a seat main body is in a state where the seat back is greatly tilted backward with respect to the seat cushion (relax state), the occupant is likely to slip under the seat belt and slide forward in the event of a frontal collision of the vehicle.

Specifically, when the seat main body is in the relax state, the seated occupant has a posture in which his or her pelvis is lowered and laid down and the seat belt (lap belt) is placed on the pelvis. Then, the submarine phenomenon is likely to occur. Therefore, more suitable occupant restraint has been required.

It should be noted that with the spread of vehicles enabling autonomous driving, it is assumed that an occupant (driver) seated on a seat main body will switch the seat main body from a normal state to a relax state during autonomous driving. Therefore, a technique for further avoiding the occurrence of the submarine phenomenon is required.

The present invention has been made in view of the above problems, and an object of the present invention is to provide a vehicle seat device capable of suitably restraining an occupant by means of a seat belt device.

In addition, another object of the present invention is to provide a vehicle seat device capable of further suppressing a phenomenon (submarine phenomenon) in which an occupant slips under a seat belt and moves forward in the event of a frontal collision of a vehicle.

In addition, another object of the present invention is to provide a vehicle seat device allowing backward seat back tilting with respect to a seat cushion and enabling submarine phenomenon suppression.

Solution to Problem

The above objects are achieved by means of a vehicle seat device of the present invention including: a seat main body having a seat cushion and a seat back; a reclining device connecting the seat back to the seat cushion so as to be pivotable and capable of locking a pivoting motion of the seat back; and a seat belt device for restraining an occupant seated on the seat main body, in which the seat belt device includes a lap belt restraining the occupant's lumbar or thighs, a belt anchor attached at a position beside the seat main body and having a belt engaging portion engaging with an engaged portion provided in a tip portion of the lap belt, and an anchor moving device capable of moving the belt engaging portion of the belt anchor in a seat front to back direction with respect to the seat main body.

With the above configuration, it is possible to realize a vehicle seat device capable of suitably restraining an occupant by means of a seat belt device.

In particular, it is possible to realize a vehicle seat device capable of further suppressing a submarine phenomenon in the event of a frontal collision of a vehicle.

Specifically, the seat belt device includes the anchor moving device capable of moving the belt engaging portion of the belt anchor in the seat front to back direction with respect to the seat main body. By doing so, the position of the lap belt restraining the occupant's lumbar or thighs can be moved to a suitable position in the seat front to back direction in accordance with, for example, the occupant's sitting posture. In other words, the position of the lap belt can be moved in accordance with the occupant's pelvis.

At this time, the anchor moving device may include: a movable member attached to the seat cushion and movable in order to move the belt engaging portion to a seat front side beyond a normal position; and a connecting member interposed between the movable member and the belt anchor and operating in order to convert a movable motion of the movable member into a moving motion of the belt anchor.

By including the movable member as described above, the movable member can be moved by, for example, the seating load of the occupant seated on the seat main body (seat cushion), and the position of the belt anchor (lap belt) can be moved.

By doing so, an appropriate lap belt position can be set in accordance with the occupant's seating load (sitting posture).

At this time, the movable member may be a movable plate or a movable bar attached to the seat cushion so as to be movable to the seat front side and/or downward in response to the seated occupant's behavior, and the connecting member may be a connecting link pivoting in order to convert the movable motion of the movable member into the moving motion of the belt anchor.

With the above configuration, it is possible to set an appropriate position of the belt anchor (lap belt) corresponding to the seated occupant's behavior and move the lap belt to a suitable position with a simple configuration.

Specifically, the lap belt can be moved to a suitable position so as to suppress a phenomenon (submarine phenomenon) in which the occupant slips under the seat belt and moves forward in the event of a frontal collision of the vehicle. It should be noted that in order to suppress the submarine phenomenon, it is preferable to move the lap belt to the seat front position beyond the normal position in the event of a frontal collision of the vehicle. By doing so, the lap belt is capable of pressing the occupant's thighs downward and, as a result, the occupant's pelvis can be raised from a state where the pelvis is laid down (so as to rotate forward and upward).

In addition, with the above configuration, it is possible to realize the vehicle seat device capable of suitably suppressing the submarine phenomenon even in a state where the seat back is tilted backward by the reclining device (relax state).

At this time, the seat cushion may include a cushion frame as a skeleton, a pad material placed on the cushion frame, and a skin material covering the cushion frame and the pad material from above, the cushion frame may have: side frames disposed on right and left sides in a seat width direction and extending in the seat front to back direction; a front connecting frame connecting front parts of the right and left side frames; and a rear connecting frame connecting rear parts of the right and left side frames, and the movable member may be attached to a support member hooked on the front connecting frame and the rear connecting frame in a frame of the cushion frame or attached to the cushion frame in the frame of the cushion frame and disposed at a position supporting the pad material.

With the above configuration, the movable member can be attached at a suitable position using the existing frame in the seat cushion.

In addition, the movable member can be disposed at a relatively empty position in the seat cushion. By doing so, interference between the movable member and the existing components can be suppressed.

At this time, the anchor moving device may include: a drive member attached at a position beside the seat main body and driving the belt anchor in order to move the belt anchor to a seat front side beyond a normal position; and a transmission member interposed between the drive member and the reclining device and operating in order to convert a movable motion of the reclining device tilting the seat back backward into a driving motion of the drive member.

In addition, the reclining device may have a pivot shaft extending along a seat width direction and pivoting in order to tilt the seat back backward, the transmission member may be a transmission gear connected to the pivot shaft and pivoting in conjunction with a pivoting motion of the pivot shaft, and the drive member may be a drive shaft having a drive gear portion meshing with the transmission gear and performing a driving motion in the seat front to back direction in response to a pivoting motion of the transmission gear.

By including the drive member (drive shaft) and the transmission member (transmission gear) as described above, the belt anchor (lap belt) can be moved to the seat front side in response to the backward tilting motion of the seat back. By doing so, the submarine phenomenon can be suitably suppressed even in a state where the seat back is tilted backward by the seat main body (relax state) in the event of a frontal collision of the vehicle. In addition, the occupant's feeling of abdominal pressure can be mitigated.

At this time, the anchor moving device may include a transmission cable connecting the belt anchor and the seat back and moving the belt anchor to a seat front side beyond a normal position in response to a backward tilting motion of the seat back.

By including the transmission cable as described above, the belt anchor (lap belt) can be moved to the seat front side in response to the backward tilting motion of the seat back.

At this time, the seat back may include a back frame having back side frames disposed on right and left sides in a seat width direction, one end portion of the transmission cable may be attached to a lower part of the back side frame, the transmission cable may extend downward from the one end portion, bend, and further extend toward a seat front, and may extend so as to pass through positions behind and below a main body portion of the reclining device, and the other end portion of the transmission cable may be attached to the belt anchor.

With the above configuration, interference between the transmission cable and the main body portion of the reclining device can be suppressed when the seat back is pivoted by the reclining device.

At this time, the anchor moving device may be attached at a position beside the seat main body and drive the belt anchor in order to move the belt anchor to a seat front side beyond a normal position, and the vehicle seat device may include: an angle detection unit detecting a backward tilt angle of the seat back with respect to the seat cushion; and a control device controlling drive of the anchor moving device based on the backward tilt angle of the seat back detected by the angle detection unit.

With the above configuration, the control device controls the drive of the anchor moving device in accordance with the backward tilt angle of the seat back, and the belt anchor (lap belt) can be suitably moved in the seat front to back direction.

At this time, the anchor moving device may be attached at a position beside the seat main body and drive the belt anchor in order to move the belt anchor to a seat front side beyond a normal position, and the vehicle seat device may include: a collision detection sensor detecting or detecting in advance a frontal collision of a vehicle; and a control device controlling drive of the anchor moving device when the frontal collision of the vehicle is detected or detected in advance by the collision detection sensor.

With the above configuration, the control device controls the drive of the anchor moving device when a frontal collision of the vehicle is detected or detected in advance, and the belt anchor (lap belt) can be suitably moved in the seat front to back direction.

Advantageous Effects of Invention

According to the present invention, it is possible to realize a vehicle seat device capable of suitably restraining an occupant by means of a seat belt device. In particular, it is possible to realize a vehicle seat device capable of further suppressing a submarine phenomenon in the event of a frontal collision of a vehicle.

In addition, according to the present invention, the movable member can be moved by the seating load (sitting posture) of the occupant seated on the seat cushion, and the position of the belt anchor (lap belt) can be moved.

In addition, according to the present invention, it is possible to set an appropriate position of the belt anchor (lap belt) corresponding to the seated occupant's behavior and move the lap belt to a suitable position with a simple configuration. Specifically, the lap belt can be moved to a suitable position so as to suppress a phenomenon (submarine phenomenon) in which the occupant slips under the seat belt and moves forward in the event of a frontal collision of the vehicle. In addition, the submarine phenomenon can be suitably suppressed even in a state where the seat back is tilted backward (relax state).

In addition, according to the present invention, the movable member can be attached at a suitable position using the existing frame in the seat cushion. In addition, the movable member can be disposed at an empty position, and interference between the movable member and the existing components can be suppressed.

In addition, according to the present invention, the belt anchor (lap belt) can be moved to the seat front side in response to the backward tilting motion of the seat back. By doing so, the submarine phenomenon can be suitably suppressed even in a state where the seat back is tilted backward by the seat main body (relax state) in the event of a frontal collision of the vehicle.

In addition, according to the present invention, interference between the transmission cable and the main body portion of the reclining device can be suppressed when the seat back is pivoted by the reclining device.

In addition, according to the present invention, the control device controls the drive of the anchor moving device in accordance with the backward tilt angle of the seat back, and the belt anchor (lap belt) can be suitably moved in the seat front to back direction.

In addition, according to the present invention, the control device controls the drive of the anchor moving device when a frontal collision of the vehicle is detected or detected in advance, and the belt anchor (lap belt) can be suitably moved in the seat front to back direction.

DESCRIPTION OF EMBODIMENTS

Hereinafter, embodiments according to the present invention will be described with reference to FIGS. 1 to 37A, 37B, and 37C.

The present embodiment relates to an invention of a vehicle seat device including a reclining device connecting a seat back to a seat cushion so as to be pivotable and a seat belt device restraining an occupant seated on a seat main body. The seat belt device includes a lap belt restraining the occupant's lumbar or thighs, a belt anchor having a belt engaging portion engaging with an engaged portion provided in a tip portion of the lap belt, and an anchor moving device capable of moving the belt engaging portion of the belt anchor in a seat front to back direction with respect to the seat main body.

It should be noted that the side where the occupant (seated occupant) sits with respect to the seat back of the vehicle seat device is the front side of the seat.

First Embodiment

First, a vehicle seat device S1 of a first embodiment will be described with reference to FIGS. 1 to 5A and 5B.

Figure 1:
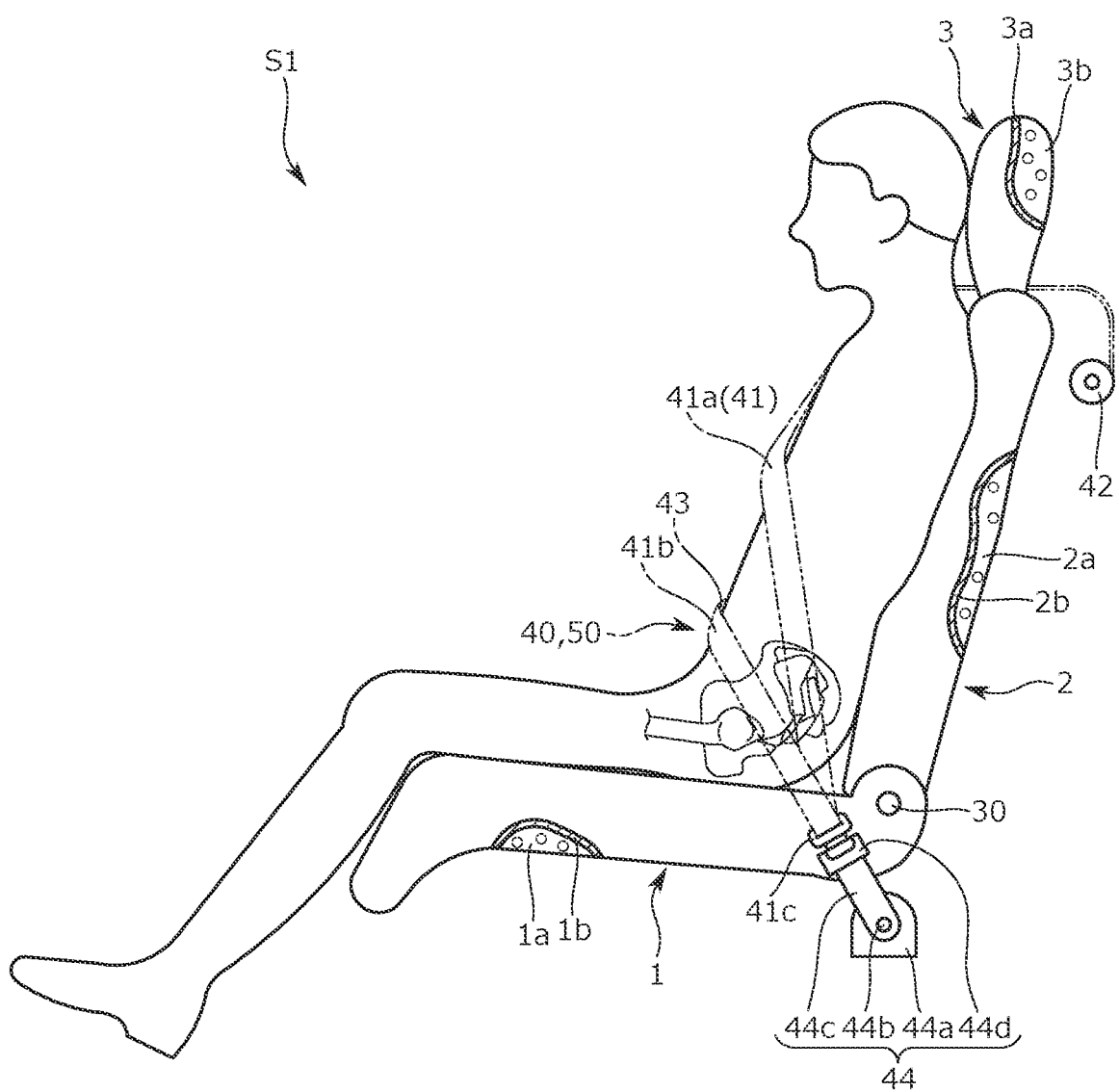
FIG. 1 is a side view of a vehicle seat device of a first embodiment, illustrating a state where a seat main body is at "normal position".
Figure 2:
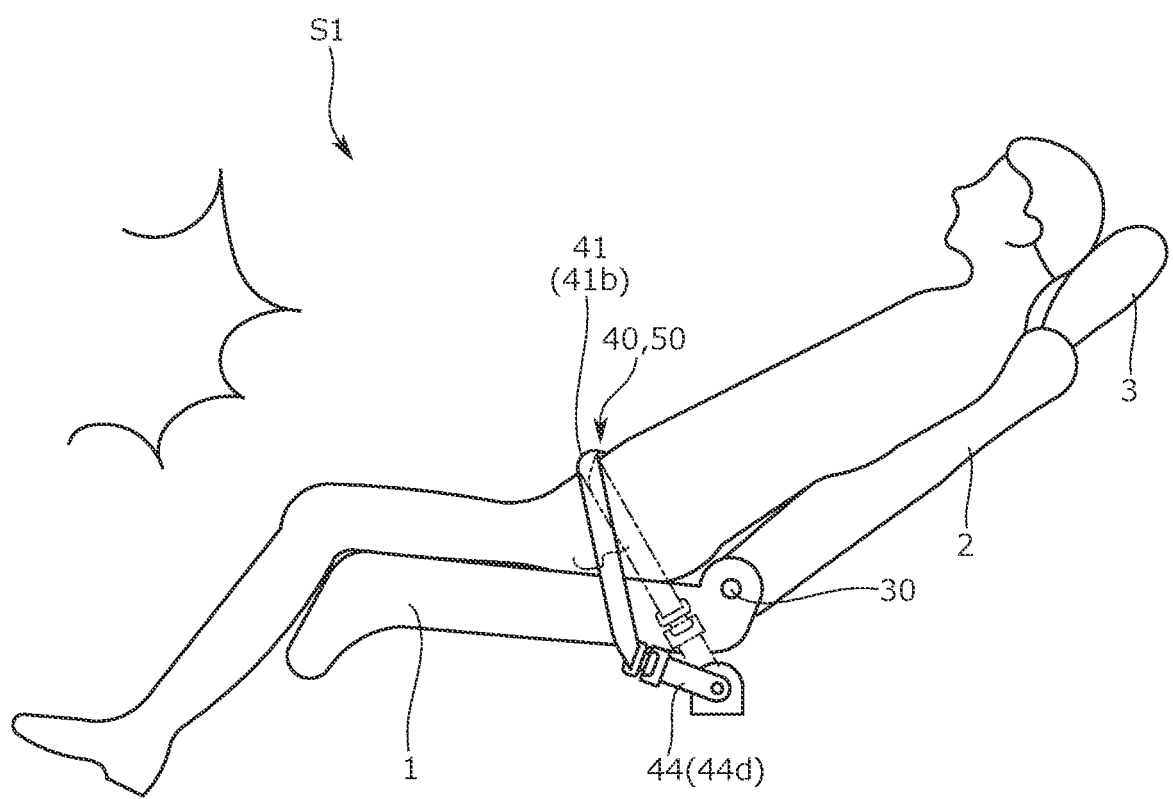
FIG. 2 is a side view of the vehicle seat device, illustrating a state where the seat main body is at "relax position".

As illustrated in FIGS. 1 and 2, the vehicle seat device S1 includes a seat main body having a seat cushion 1, a seat back 2, and a headrest 3, a reclining device 30 connecting the seat back 2 to the seat cushion 1 so as to be pivotable and capable of locking the pivoting motion of the seat back 2, and a seat belt device 40 for restraining an occupant seated on the seat main body.

As for the vehicle seat device S1, by means of the reclining device 30, seat arrangement of the seat main body is possible between "normal position" illustrated in FIG. 1 and "relax position" illustrated in FIG. 2, at which the seat back 2 of the seat main body is tilted backward up to a predetermined position.

In addition, as for the vehicle seat device S1, by means of the seat belt device 40, the seat belt (lap belt) can be moved in the seat front to back direction.

Figure 3:
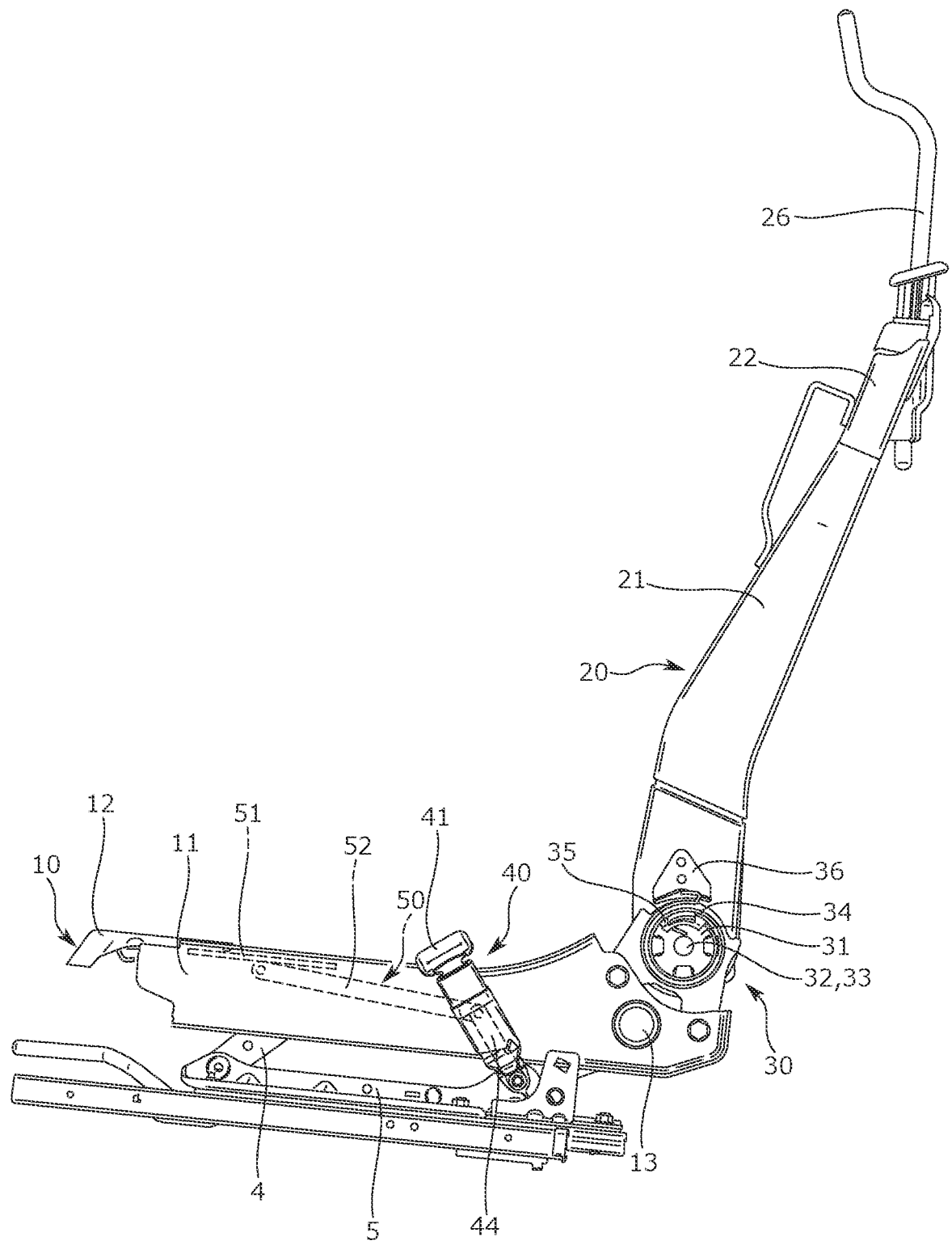
FIG. 3 is a side view of a seat frame, illustrating a movable member and a connecting member.

As illustrated in FIGS. 1 to 3, the seat cushion 1 is a seating portion supporting the seated occupant from below and is configured by placing a pad material 1a on a cushion frame 10 as a skeleton and being covered with a skin material 1b.

The seat back 2 is a backrest portion supporting the seated occupant's back from behind and is configured by placing a pad material 2a on a back frame 20 as a skeleton and being covered with a skin material 2b.

The headrest 3 is a head portion supporting the seated occupant's head from behind and is configured by placing a pad material 3a on a pillar 3c as a core material and being covered with a skin material 3b.

It should be noted that a pillar attachment member 26 for attaching the pillar 3c supporting the main body of the headrest 3 is assembled to the upper portion of the back frame 20.

Figure 4:
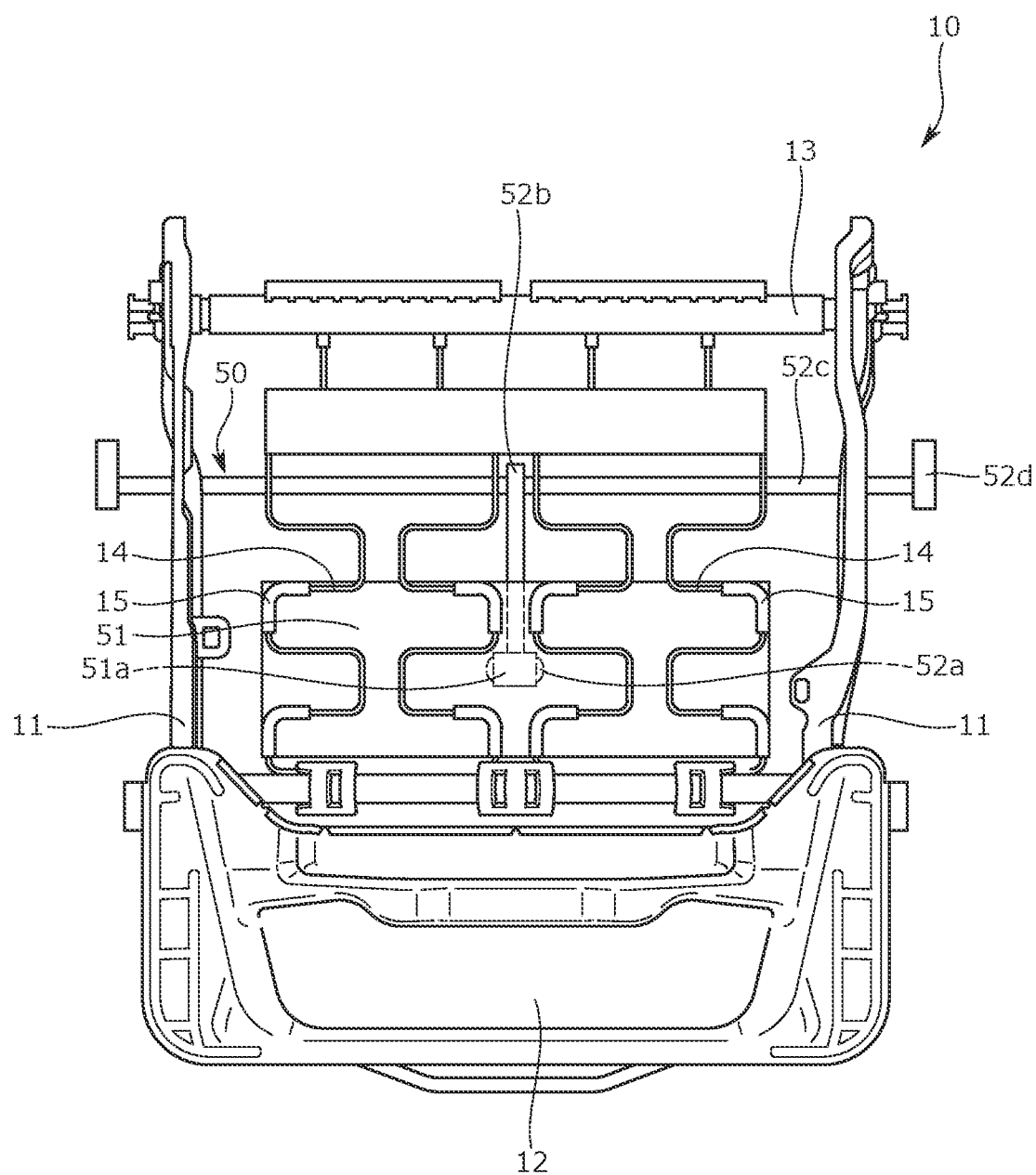
FIG. 4 is a top view of a cushion frame, illustrating the movable member and the connecting member.

As illustrated in FIGS. 3 and 4, the cushion frame 10 as a rectangular frame-shaped body is configured mainly from side frames 11 disposed on the right and left sides, a plate-shaped pan frame 12 (front connecting frame) provided to serve as a bridge between the front end parts of the side frames 11, a rear connecting frame 13 interconnecting the rear parts of the side frames 11, and a plurality of support members 14 (elastic springs) hooked on the pan frame 12 and the rear connecting frame 13 and extending in the seat front to back direction.

The support member 14 is a member supporting the seated occupant from below and is elastically deformable in the up to down direction by receiving the seating load of the occupant.

The side frame 11 is a plate-shaped frame elongated in the seat front to back direction.

It should be noted that the reclining device 30 is attached to the rear part of the side frame 11 and a rail device 5 is attached to the lower part of the side frame 11 via a height link device 4.

As illustrated in FIG. 2, the back frame 20 as a rectangular frame-shaped body is configured mainly from back side frames 21 disposed on the right and left sides, an inverted U-shaped upper frame 22 interconnecting the upper end parts of the back side frames 21, a plate-shaped lower frame 23 interconnecting the lower end parts of the back side frames 21, a plurality of wire members (elastic wires) respectively hooked on the back side frames 21 and extending in the seat width direction, and a support plate held by the plurality of wire members and supporting the seated occupant.

It should be noted that the back frame 20 further includes the pillar attachment member 26 attached to the middle part of the upper frame 22 in the seat width direction in order to attach the pillar 3c of the headrest 3.

The back side frame 21 is a sheet metal member extending in the up to down direction and having a substantially C-shaped cross section. The lower end part of the back side frame 21 is connected to the rear end part of the side frame 11 via the reclining device 30.

By means of the reclining device 30, the back frame 20 is capable of pivoting relative to the cushion frame 10.

As illustrated in FIGS. 1 to 4, the reclining device 30 is a device connecting the back frame 20 to the cushion frame 10 so as to be pivotable.

The reclining device 30 includes a reclining main body 31 disposed on the left side in the seat width direction and driven when the back frame 20 is pivoted, pivot shafts 32 disposed on the right and left sides in the seat width direction and serving as the center of pivoting of the back frame 20, and a connecting member 33 extending in the seat width direction and connecting the right and left pivot shafts 32.

In addition, the reclining device 30 further includes a spiral spring 34 disposed on the left side in the seat width direction and biasing the back frame 20 so as to rotate forward and an operating lever (not illustrated) operated in order to release the lock state of the back frame 20.

The reclining main body 31 has a known lock mechanism and is capable of switching the state of the back frame 20 between a lock state where the back frame 20 is fixed to the cushion frame 10 and an unlock state where the back frame 20 is pivotable with respect to the cushion frame 10.

The reclining main body 31 has a configuration in which the normal state of the back frame 20 is the lock state and, when the operating lever is operated, the operation results in rotation of the pivot shaft 32 and the state of the back frame 20 is switched to the unlock state.

Then, while the state of the back frame 20 is the unlock state, the occupant can tilt the seat back 2 backward. The back frame 20 returns to the lock state by the operating lever being released at the point in time when a desired backward tilt angle is reached.

The pivot shafts 32 are axially supported on the cushion frame 10 side and the back frame 20 side in the seat width direction, and the extending end portions (inside end portions) of the pivot shafts 32 are attached to the connecting member 33.

The spiral spring 34 is a biasing spring biasing the back frame 20 to the seat front side and has a configuration in which one end portion of the spiral spring 34 is locked by a spring locking bracket 35 attached to the outside surface of the back side frame 21 and the other end portion of the spiral spring 34 is locked by a spring locking member 36 attached to the outside surface of the side frame 11.

As illustrated in FIGS. 1 to 3, the seat belt device 40 is a device restraining the occupant seated on the seat main body.

The seat belt device 40 includes a seat belt 41 (webbing) restraining the occupant, belt retractors 42 and 43 attached at positions behind and beside the seat main body and winding the seat belt 41 such that the seat belt 41 can be pulled out, and a belt anchor 44 attached on the side opposite to the belt retractor 43 side at a position beside the seat main body and detachably engaging the tip portion of the seat belt 41.

In addition, the seat belt device 40 further includes an anchor moving device 50 capable of moving the belt anchor 44 (anchor buckle 44d) in the seat front to back direction with respect to the seat main body.

The seat belt 41 has a shoulder belt 41a pulled out of the belt retractor 42 at a position behind the seat main body and restraining the occupant's shoulder and chest, a lap belt 41b pulled out of the belt retractor 43 positioned to the right of the seat main body and restraining the occupant's lumbar or thighs, and a tongue plate 41c attached in a state where the tip portion of the shoulder belt 41a and the tip portion of the lap belt 41b are bundled.

The belt anchor 44 has an anchor bracket 44a fixed at a position to the left of the seat main body, an anchor extending portion 44c attached to the anchor bracket 44a via an anchor pivot shaft 44b and extending upward from the anchor bracket 44a, and the anchor buckle 44d attached to the extending end portion of the anchor extending portion 44c.

The anchor buckle 44d is a belt engaging portion detachably engaging with the tongue plate 41c (engaged portion) in the tip portion of the seat belt 41.

As illustrated in FIGS. 3 to 5A and 5B, the anchor moving device 50 includes a movable member 51 attached to the seat cushion 1 and movable in order to move the anchor buckle 44d to the seat front side beyond "normal position" and a connecting member 52 interposed between the movable member 51 and the belt anchor 44 and operating in order to convert the movable motion of the movable member 51 into the pivoting motion of the belt anchor 44.

The movable member 51 is a plate-shaped movable plate attached in the seat cushion 1 so as to be movable to the seat front side and the lower side in response to the seated occupant's behavior.

It should be noted that the movable member may be a bar-shaped movable bar or the like.

The movable member 51 is a rectangular movable plate elongated in the seat width direction and is attached to the bottom surfaces of the plurality of support members 14 in the frame of the cushion frame 10.

Specifically, the movable member 51 is attached to the bottom surfaces of the front parts of the plurality of support members 14 via attachment members 15 (attachment clips).

With the above configuration, the movable member 51 supports the occupant from below together with the support member 14 and is capable of receiving the seating load of the occupant and being movable toward the seat front and downward.

It should be noted that the movable member 51 is not limited to the above and may be configured to be movable only to the seat front side or may be configured to be movable only to the lower side.

The connecting member 52 is a connecting link (connecting link mechanism) pivoting in order to convert the movable motion of the movable member 51 into the pivoting motion of the belt anchor 44.

Specifically, the connecting member 52 has an elongated link 52b attached via a first link pivot shaft 52a to a fixed bracket 51a fixed to the bottom surface of the movable member 51 and elongatedly extending in the seat front to back direction and short links 52d attached via a second link pivot shaft 52c attached to the rear end portion of the elongated link 52b and connected to the belt anchor 44 (anchor extending portion 44c).

The elongated link 52b is disposed at the middle part of the cushion frame 10 in the seat width direction and is disposed between the plurality of support members 14.

The front end portion of the elongated link 52b is connected to the movable member 51 via the first link pivot shaft 52a elongated in the seat width direction.

In addition, the rear end portion of the elongated link 52b is connected to the short links 52d via the second link pivot shaft 52c elongated in the seat width direction.

The short links 52d are disposed at positions outside the cushion frame 10 in the seat width direction.

The front end portion of the short link 52d is connected to the elongated link 52b and the belt anchor 44 (anchor extending portion 44c) via the second link pivot shaft 52c.

The rear end portion of the short link 52d is connected to the anchor extending portion 44c and the anchor bracket 44a via the anchor pivot shaft 44b.

The short link 52d on the left side is connected to the belt anchor 44, and the short link 52d on the right side is connected to a link support bracket (not illustrated). It should be noted that the short link 52d on the right side may be connected to the belt retractor 43 and the belt retractor 43 may also be moved to the seat front position.

Figure 5A:
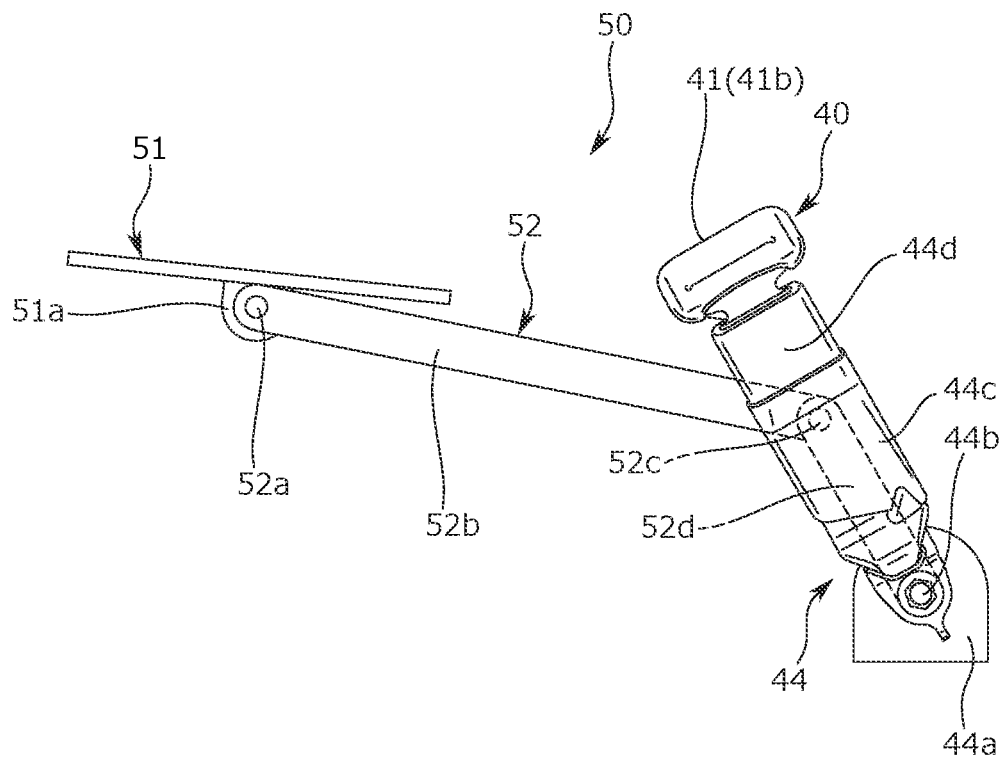
FIG. 5A is a side view of the movable member and the connecting member, illustrating a state where the movable member is at "normal position".
Figure 5B:
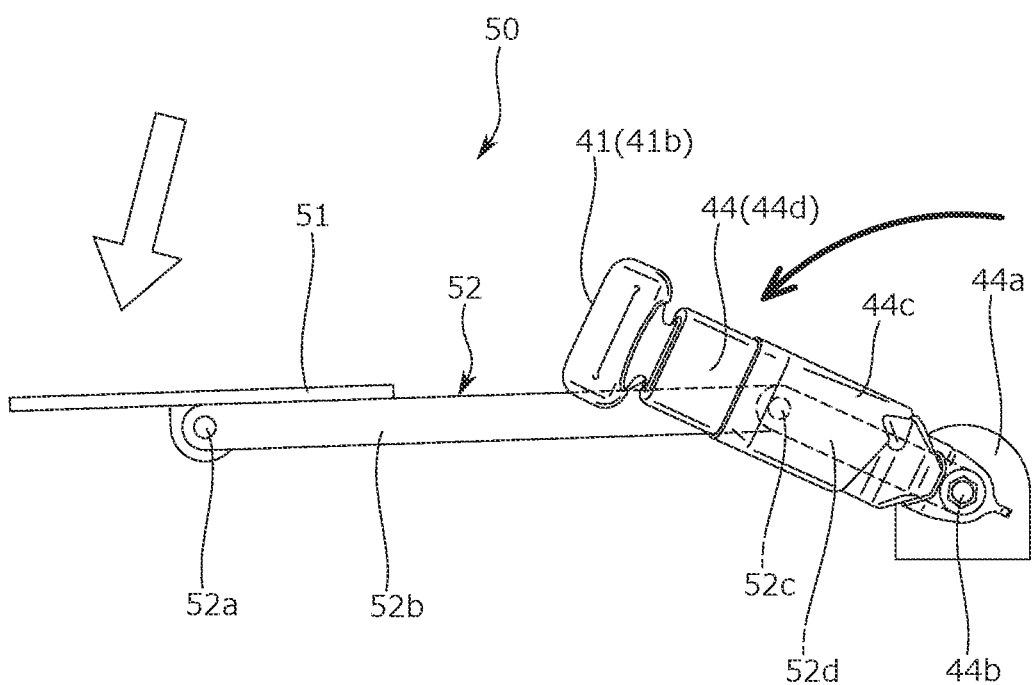
FIG. 5B is a diagram illustrating a state where the movable member of FIG. 5A is at "movable position".

With the above configuration, as illustrated in FIGS. 5A and 5B, the anchor moving device 50 is capable of receiving a seating load corresponding to the seated occupant's behavior (sitting posture) and pivoting the anchor buckle 44d of the belt anchor 44 to the seat front with respect to the seat main body. Further, by pivoting the anchor buckle 44d to the seat front, the position of the lap belt 41b can be moved to the seat front position. In other words, an appropriate lap belt position can be set in accordance with the occupant's seating load (sitting posture).

It should be noted that the link mechanism based on the connecting member 52 is not limited to the above configuration and may be configured by another link mechanism. Alternatively, a known transmission mechanism other than a link mechanism may be employed.

In addition, with the above configuration, it is possible to set an appropriate position of the belt anchor 44 (anchor buckle 44d) corresponding to the seated occupant's behavior and move the lap belt 41b to a suitable position with a simple configuration.

For example, the anchor moving device 50 is capable of moving the lap belt 41b to a suitable position so as to suppress a phenomenon (submarine phenomenon) in which the occupant slips under the seat belt 41 and moves forward in the event of a frontal collision of the vehicle. It should be noted that in order to suppress the submarine phenomenon, it is preferable to move the lap belt 41b to the seat front position beyond the normal position in the event of a frontal collision of the vehicle. By doing so, the lap belt 41b is capable of pressing the occupant's thighs downward and, as a result, the occupant's pelvis can be raised from a state where the pelvis is laid down.

In addition, with the above configuration, it is possible to realize the vehicle seat device S1 capable of suitably suppressing the submarine phenomenon even in a state where the seat back 2 is tilted backward by the reclining device 30 (relax state).

Second Embodiment

Next, a vehicle seat device S2 of a second embodiment will be described with reference to FIGS. 6 to 8A and 8B.

It should be noted that description of content that overlaps with the vehicle seat device S1 described above will be omitted.

The vehicle seat device S2 includes a seat main body having a seat cushion 101 and a seat back 102, a reclining device 130, and a seat belt device 140.

As for the vehicle seat device S1, by means of the reclining device 130, seat arrangement of the seat main body is possible between "normal position" and "relax position".

In addition, as for the vehicle seat device S2, by means of the seat belt device 140, a seat belt 141 (lap belt 141b) can be moved in the seat front to back direction.

The seat belt device 140 includes an anchor moving device 150 capable of moving a belt anchor 144 (anchor buckle 144d) in the seat front to back direction with respect to the seat main body.

The anchor moving device 150 includes a drive member 151 attached at a position to the left of the seat main body and driving the belt anchor 144 in order to move the belt anchor 144 to the seat front side beyond the normal position and a transmission gear 152 interposed between the drive member 151 and the reclining device 130 and operating in order to convert the movable motion of the reclining device 130 into the driving motion of the drive member 151.

The transmission gear 152 has a wheel gear 152a connected to a pivot shaft 132 of the reclining device 130 and pivoting around the axis of the pivot shaft 132 in conjunction with the pivoting motion of the pivot shaft 132, a worm 152b meshing with the wheel gear 152a and pivoting around an axis along the seat width direction, and a worm wheel 152c pivoting around an axis along the seat front to back direction in response to the pivoting motion of the worm 152b.

The drive member 151 has a drive shaft 151a having a drive gear portion 151aa meshing with the worm wheel 152c and performing a driving motion in the seat front to back direction in response to the pivoting motion of the worm wheel 152c, a connecting shaft 151b connecting the drive shaft 151a and the belt anchor 144 (anchor bracket 144a), and stoppers (regulating members) 151c and 151d regulating the moving motion of the drive shaft 151a.

Figure 6:
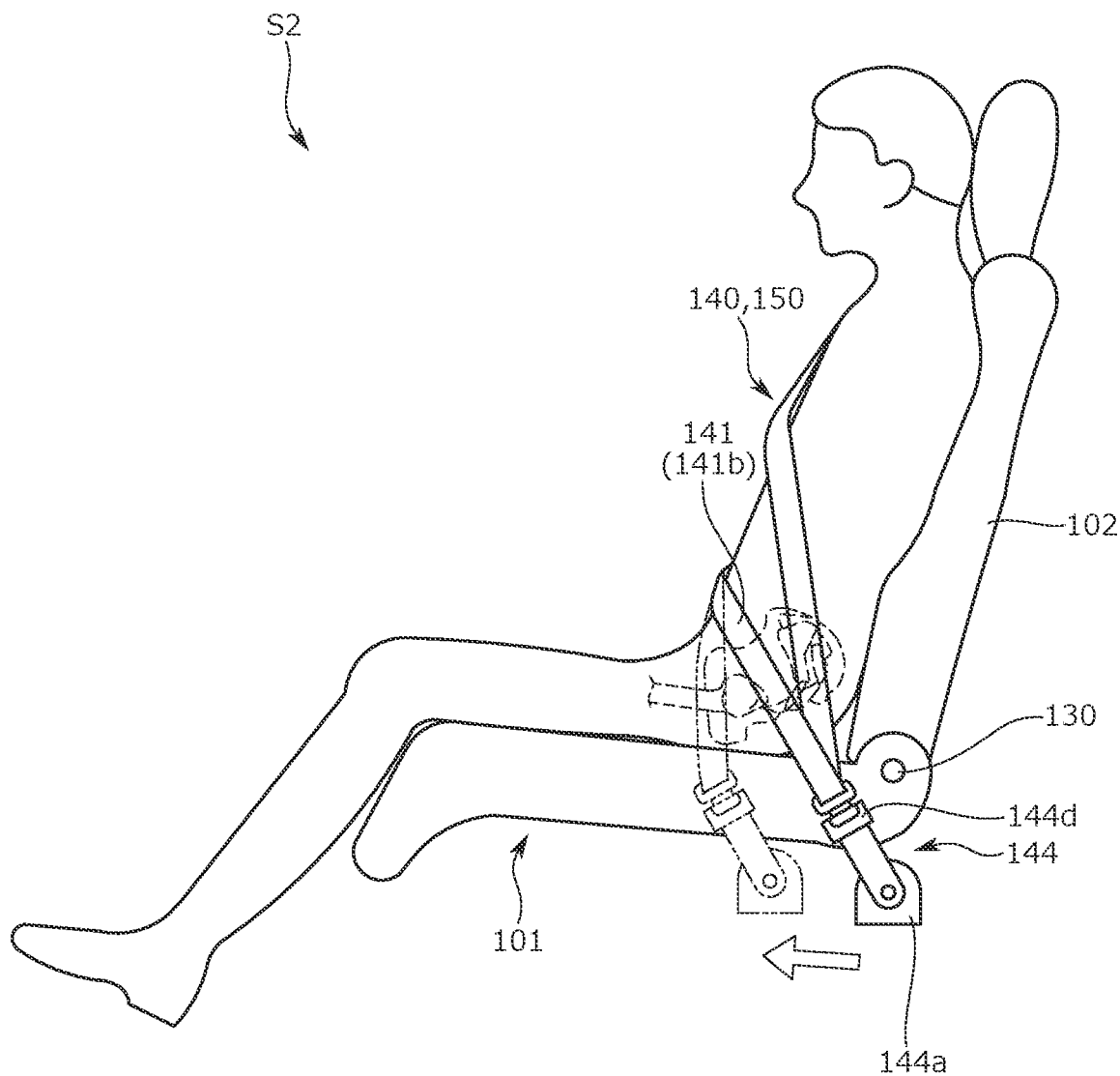
FIG. 6 is a side view of a vehicle seat device of a second embodiment, illustrating a state where a seat main body is at "normal position".
Figure 7:
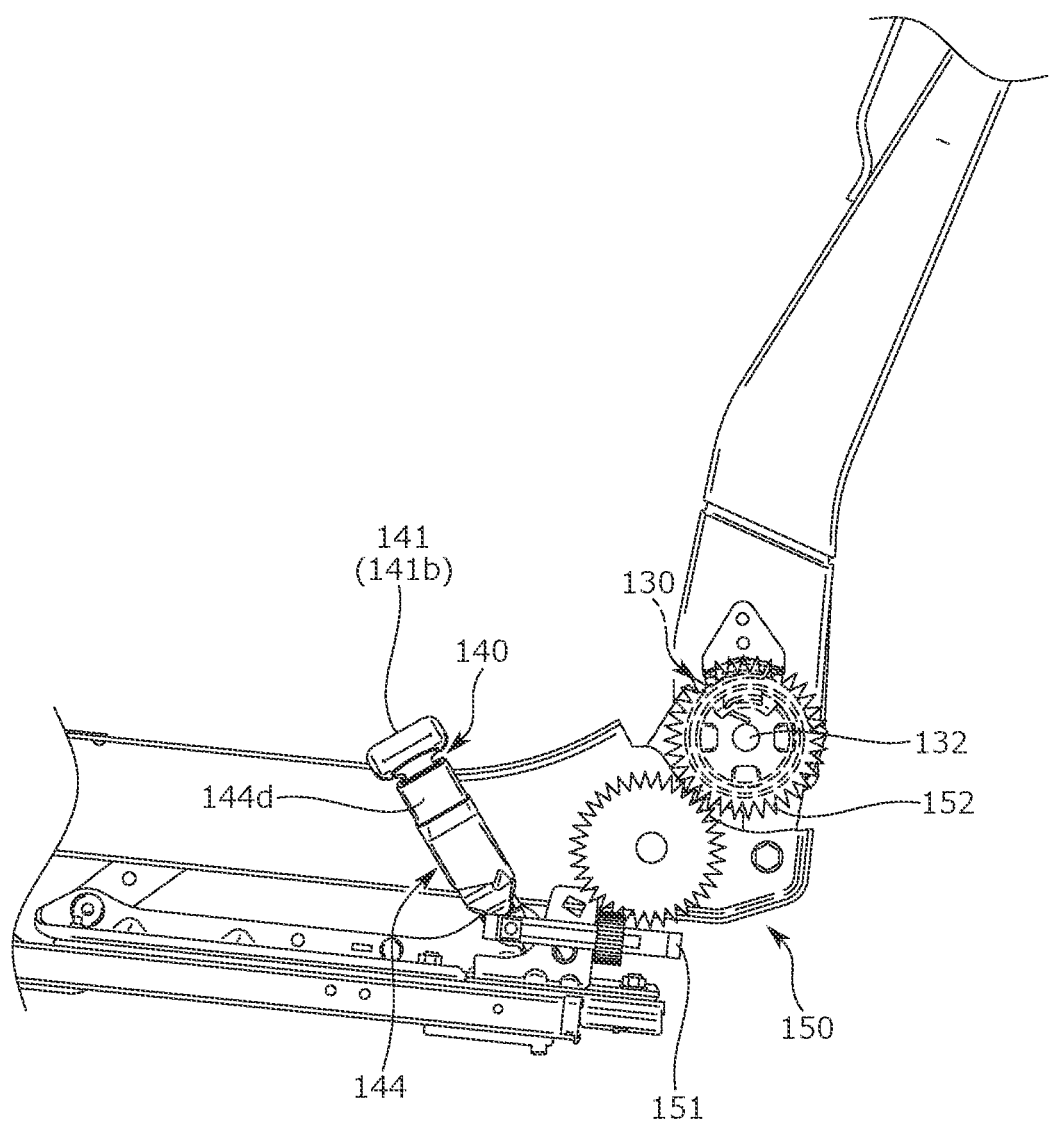
FIG. 7 is a side view of a seat frame, illustrating a drive member and a transmission member.
Figure 8A:
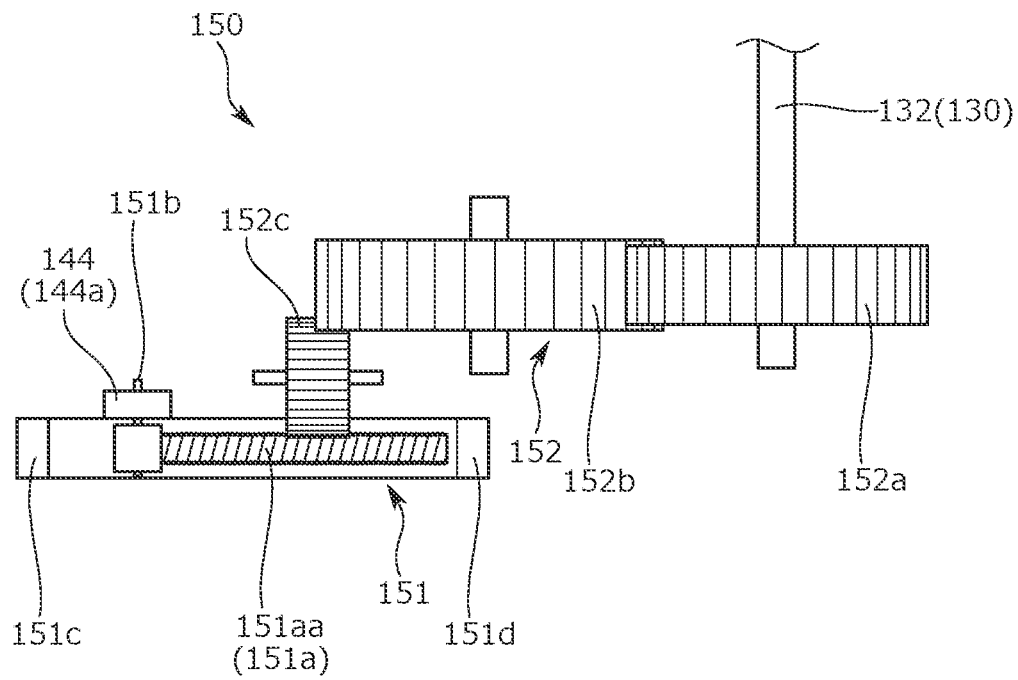
FIG. 8A is a top view of the drive member and the transmission member, illustrating a state where the drive member is at "normal position".
Figure 8B:
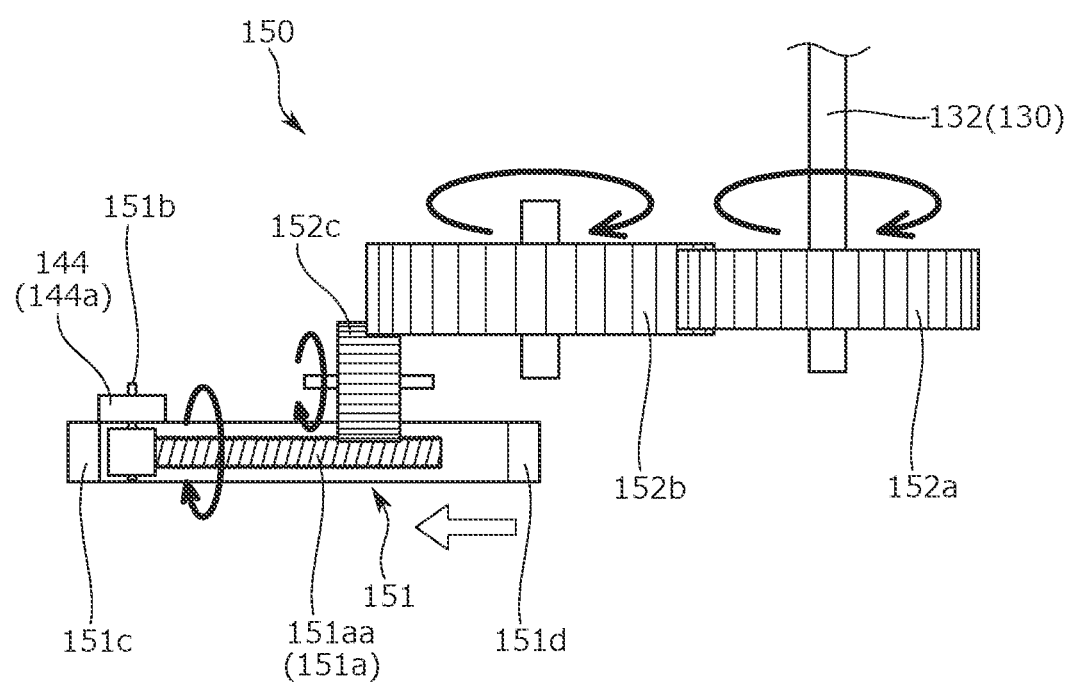
FIG. 8B is a diagram illustrating a state where the drive member of FIG. 8A is at "drive position".
Figure 9:
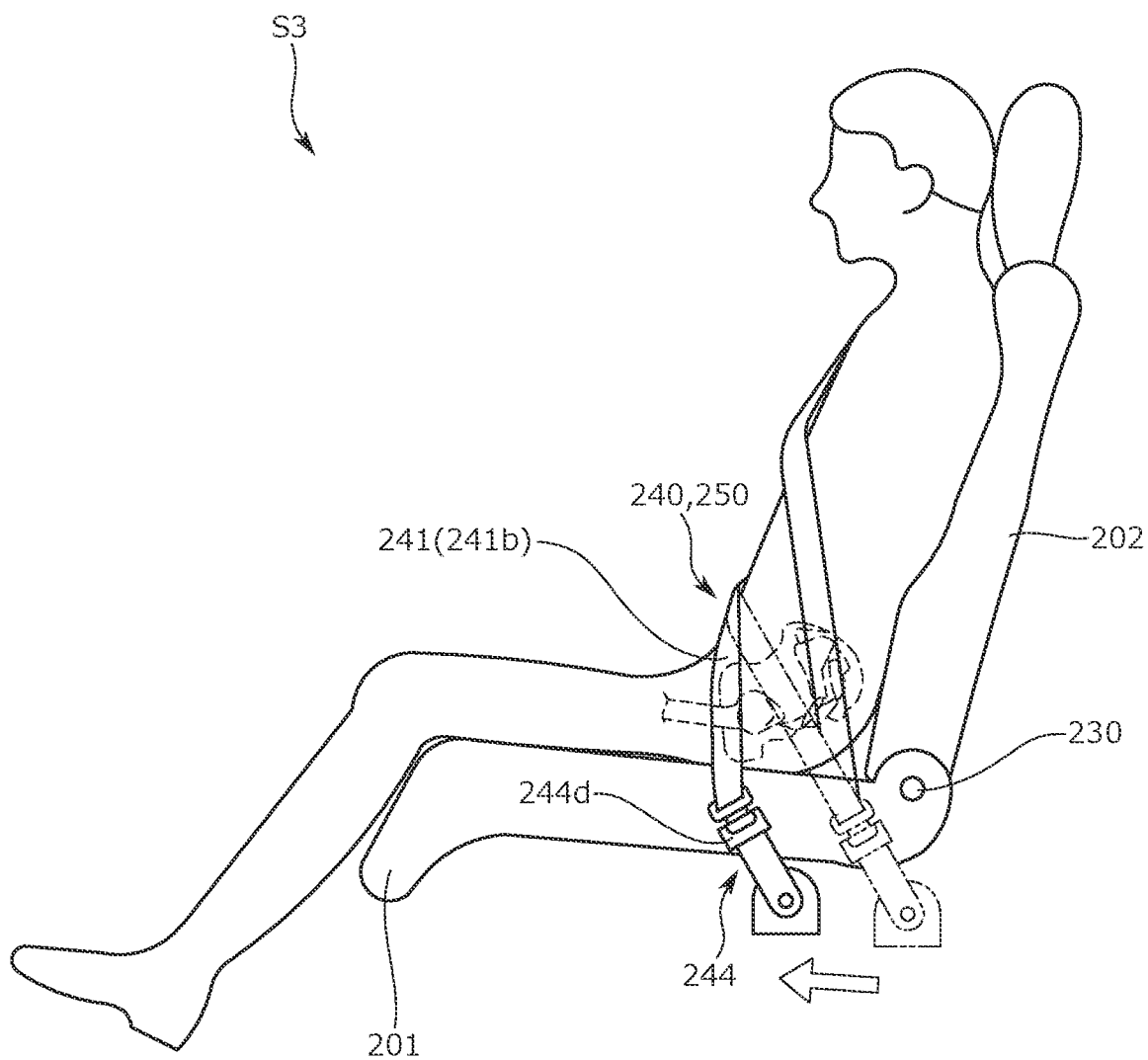
FIG. 9 is a side view of a vehicle seat device of a third embodiment, illustrating a state where a seat main body is at "normal position".

With the above configuration, as illustrated in FIG. 6, the anchor moving device 150 is capable of moving the belt anchor 144 (anchor buckle 144c) to the seat front side in response to the backward tilting motion of the seat back 102. Then, the position of the lap belt 141b can be moved to the seat front position. In other words, an appropriate position of the lap belt 141*b* can be set in accordance with the occupant's behavior (sitting posture).

By doing so, the submarine phenomenon can be suitably suppressed even in a state where the seat back 102 is tilted backward by the seat main body (relax state) in the event of a frontal collision of the vehicle.

Third Embodiment

Next, a vehicle seat device S3 of a third embodiment will be described with reference to FIGS. 9 to 10A and 10B.

It should be noted that description of content that overlaps with the vehicle seat devices S1 and S2 described above will be omitted.

The vehicle seat device S3 includes a seat main body having a seat cushion 201 and a seat back 202, a reclining device 230, and a seat belt device 240.

As for the vehicle seat device S3, by means of the reclining device 230, seat arrangement of the seat main body is possible between "normal position" and "relax position".

In addition, as for the vehicle seat device S2, by means of the seat belt device 240, a seat belt 241 (lap belt 241*b*) can be moved in the seat front to back direction.

The seat belt device 240 includes an anchor moving device 250 capable of moving a belt anchor 244 (anchor buckle 244*d*) in the seat front to back direction with respect to the seat main body.

The anchor moving device 250 has a transmission cable 251 connecting the belt anchor 244 and the seat back 202 and moving the belt anchor 244 to the seat front side beyond the normal position in response to the backward tilting motion of the seat back 202 and a biasing spring 252 biasing the belt anchor 244 movable in the seat front to back direction to one side in the seat front to back direction.

One end portion of the transmission cable 251 is attached to the back surface of the lower part of a back frame 220.

The transmission cable 251 extends downward from one end portion thereof, bends, further extends toward the seat front, and extends so as to pass through positions behind and below a reclining main body 231 of the reclining device 230.

Specifically, the transmission cable 251 extends toward the belt anchor 244 while being guided by a plurality of guide members 251*a*, 251*b*, and 251*c*.

The other end portion of the transmission cable 251 is attached to the belt anchor 244.

Figure 10A:
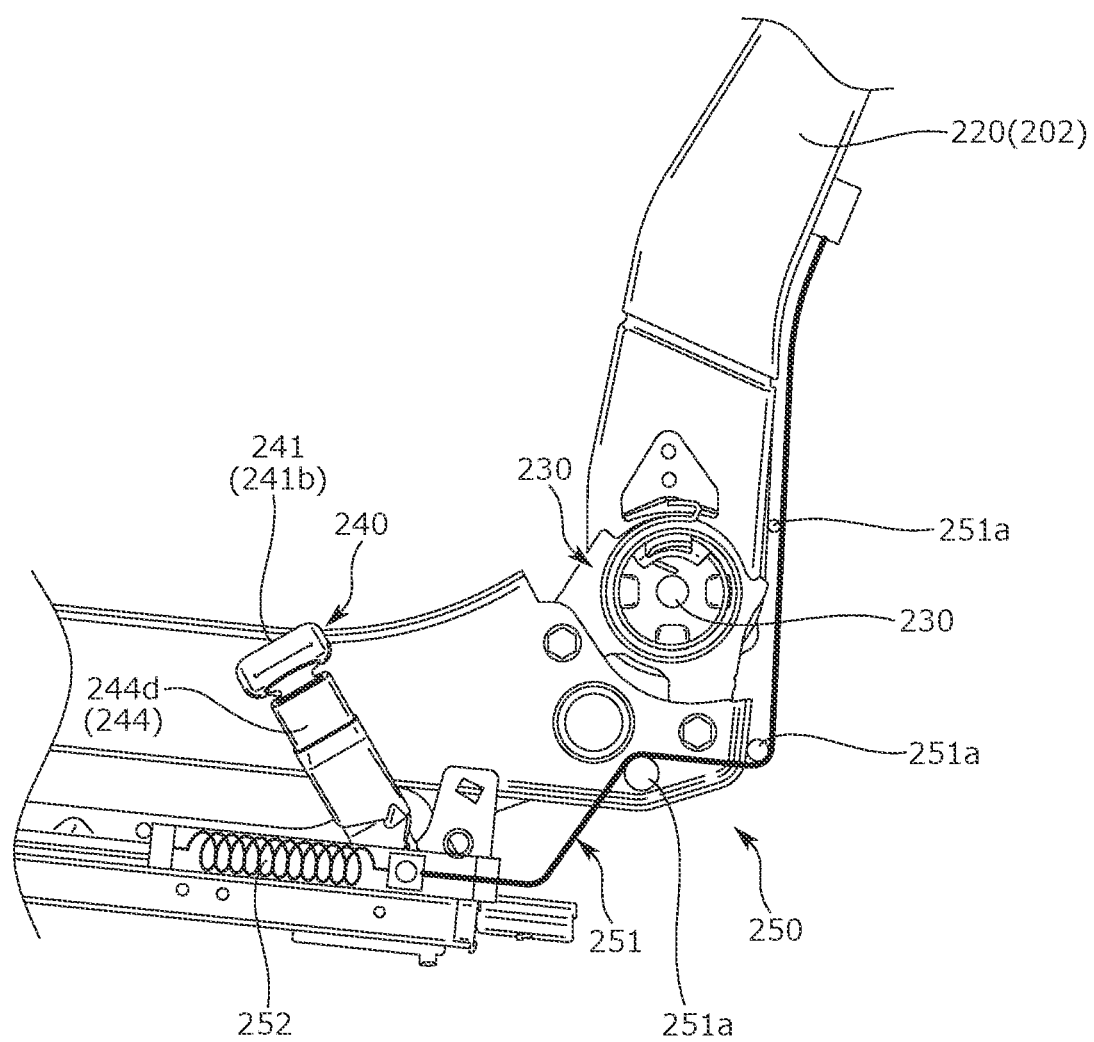
FIG. 10A is a side view of a seat frame, illustrating a state where a back frame is at "normal position".
Figure 10B:
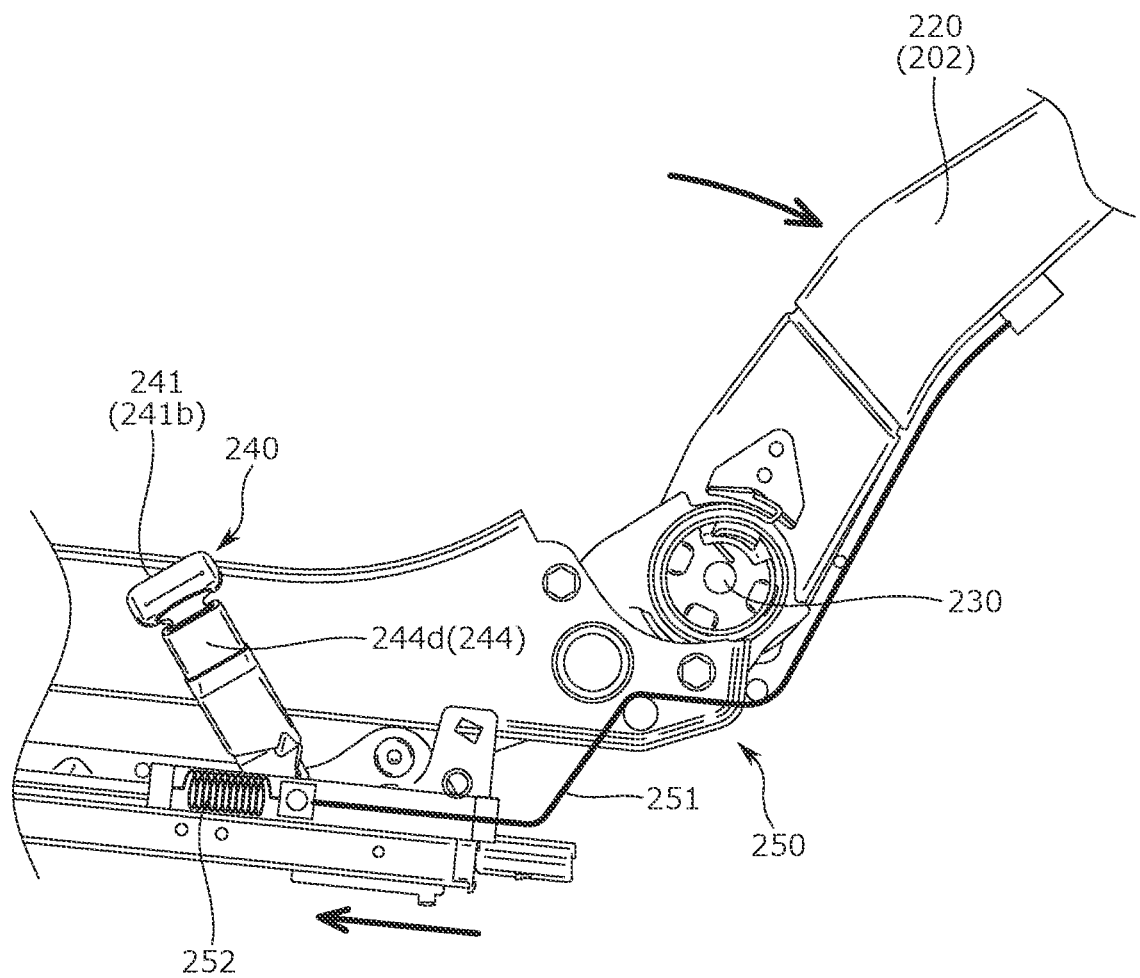
FIG. 10B is a diagram illustrating a state where the back frame is at "relax position" and is a diagram for describing a state where a belt anchor is moved forward by a transmission cable.
Figure 11:
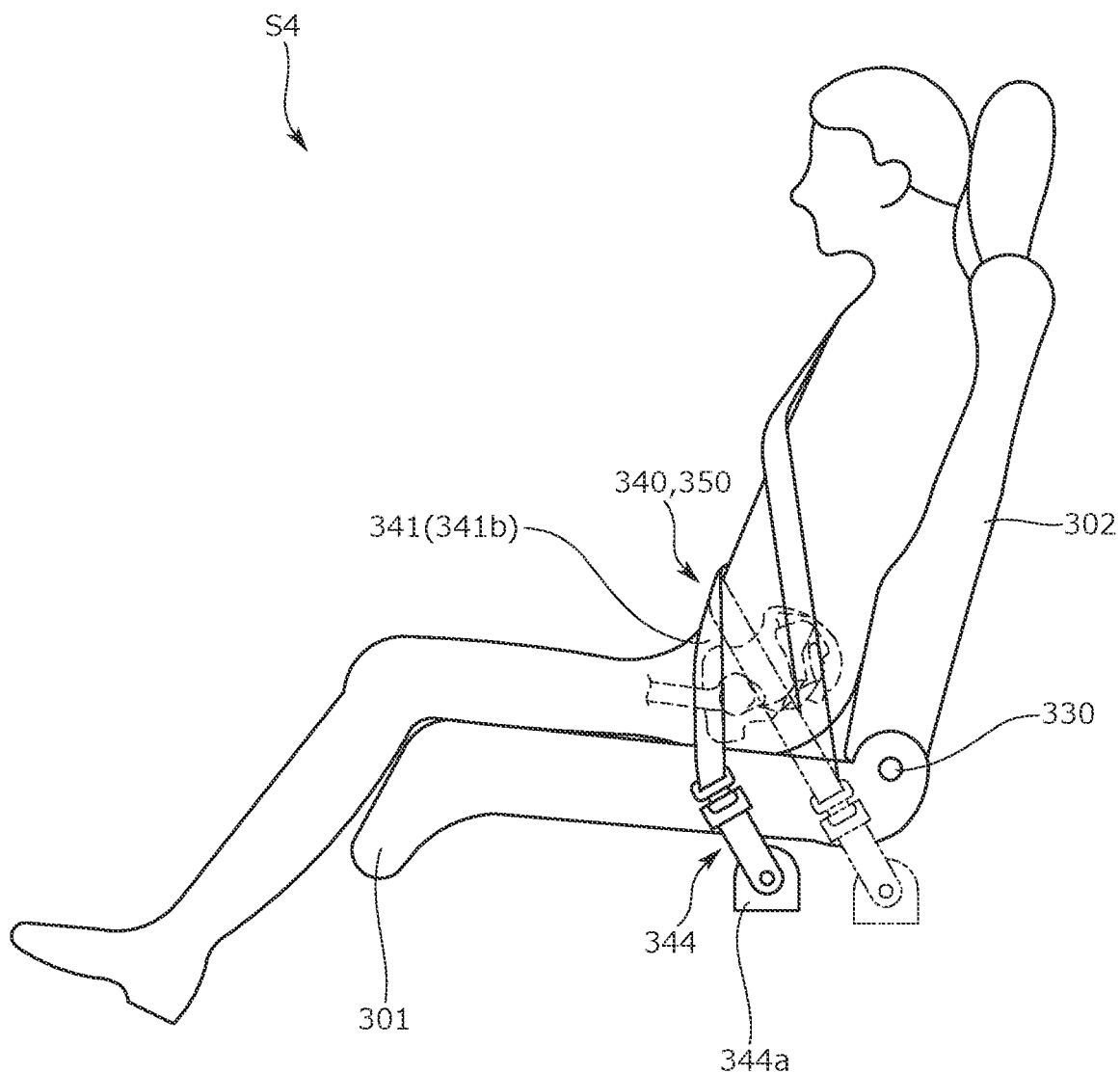
FIG. 11 is a side view of a vehicle seat device of a fourth embodiment, illustrating a state where a seat main body is at "normal position".

With the above configuration, as illustrated in FIGS. 10A and 10B, the anchor moving device 250 is capable of moving the belt anchor 244 (anchor buckle 244*d*) to the seat front side in response to the backward tilting motion of the seat back 202 and by means of the biasing force of the biasing spring 252. Then, the position of the lap belt 241*b* can be moved to the seat front position.

In other words, an appropriate position of the lap belt 241*b* can be set in accordance with the occupant's behavior (sitting posture).

By doing so, the submarine phenomenon can be suitably suppressed even in a state where the seat back 202 is tilted backward by the seat main body (relax state) in the event of a frontal collision of the vehicle.

Fourth Embodiment

Next, a vehicle seat device S4 of a fourth embodiment will be described with reference to FIGS. 11 to 14.

It should be noted that description of content that overlaps with the vehicle seat devices S1 to S3 described above will be omitted.

The vehicle seat device S4 includes a seat main body having a seat cushion 301 and a seat back 302, a reclining device 330, a seat belt device 340, and an anchor moving device 350.

In addition, the vehicle seat device S4 includes an angle detection sensor 360 (angle detection unit) detecting the backward tilt angle of the seat back 302 with respect to the seat cushion 301 and a control device 380 controlling the drive of the anchor moving device 350 based on the backward tilt angle of the seat back 302 detected by the angle detection sensor 360.

In addition, the vehicle seat device S4 includes a collision detection sensor 370 (collision detection unit) detecting a frontal collision of the vehicle, and the control device 380 controls the drive of the anchor moving device 350 when a frontal collision of the vehicle is detected by the collision detection sensor 370.

The anchor moving device 350 is a device attached at a position beside the seat main body and driving a belt anchor 344 in order to move the belt anchor 344 to the seat front side beyond the normal position.

Specifically, the anchor moving device 350 is an electric actuator driven by receiving electric power from an electric power source P and includes a drive motor 351 and a telescopic rod 352 performing a telescopic motion in the seat front to back direction as the drive motor 351 is driven.

The belt anchor 344 (anchor bracket 344*a*) is attached to the tip portion of the telescopic rod 352.

By driving the anchor moving device 350 (drive motor 351), the telescopic rod 352 is capable of performing a telescopic motion so as to move the belt anchor 344 in the seat front to back direction.

The angle detection sensor 360 is a known angle sensor attached to a reclining main body 331 or a pivot shaft 332 of the reclining device 330 and detecting the backward tilt angle of the seat back 302. The angle detection sensor 360 may be an optical sensor, a magnetic sensor, an inductive sensor, or a potentiometer-type sensor.

The collision detection sensor 370 is an in-vehicle sensor. A plurality of the collision detection sensors 370 are attached outside or inside the vehicle, detect the external environment around the vehicle, and detect a collision (frontal collision) of the vehicle.

Specifically, the collision detection sensor 370 detects moving objects (such as other vehicles and pedestrians) around the vehicle, various structures, road shapes, and so on as the external environment around the vehicle.

For example, the collision detection sensors 370 may be a plurality of cameras, a plurality of radars, or a plurality of lidars.

It should be noted that although the collision detection sensor 370 is a vehicle collision (frontal collision) detection sensor, the collision detection sensor 370 is not particularly limited and may be a sensor detecting a vehicle collision in advance. The collision detection sensor 370 is capable of detecting a vehicle collision in advance by being configured from a plurality of cameras, a plurality of radars, and a plurality of lidars.

Figure 12:
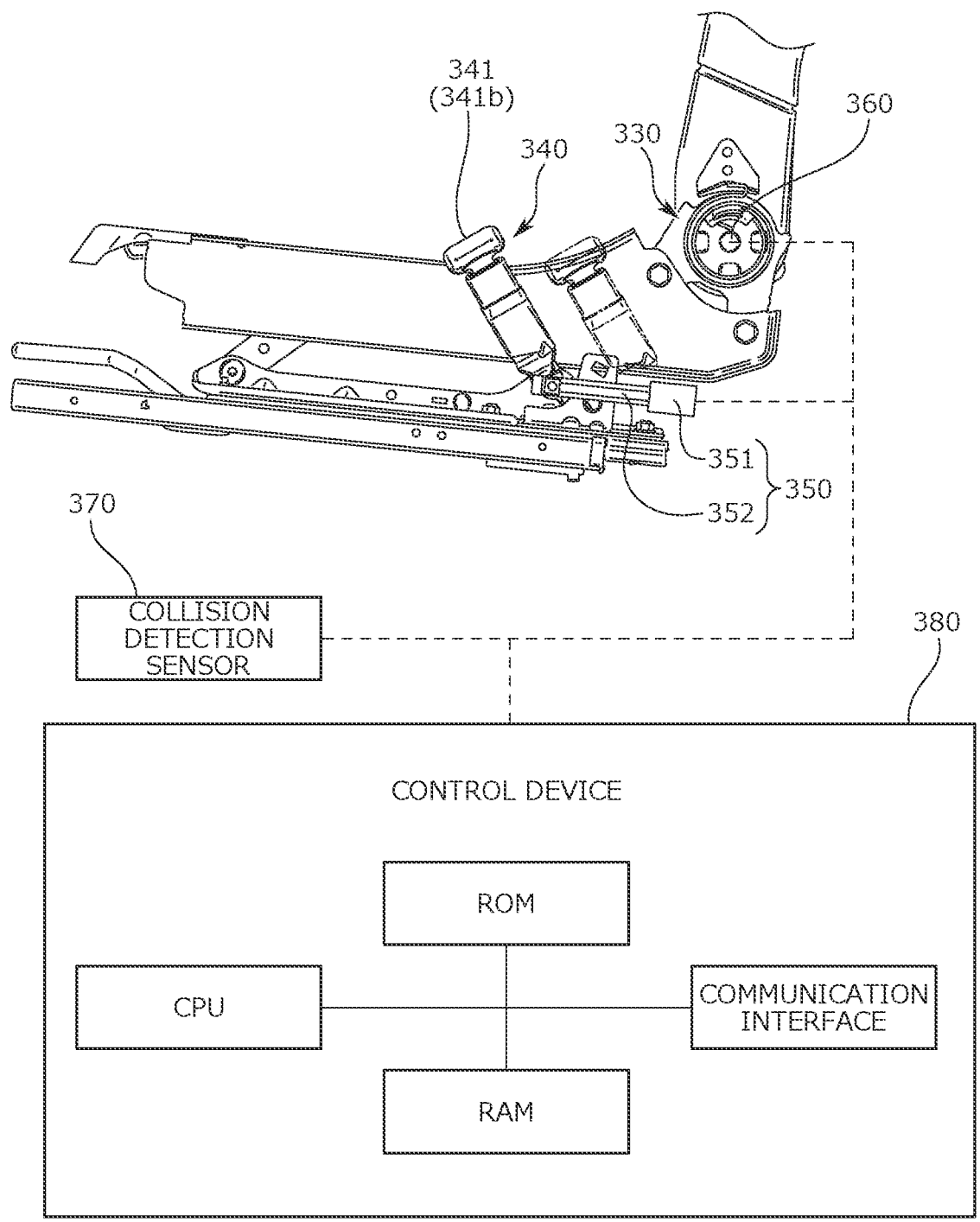
FIG. 12 is a side view of a seat frame, illustrating an anchor moving device, an angle detection sensor, a collision detection sensor, and a control device.
Figure 13:
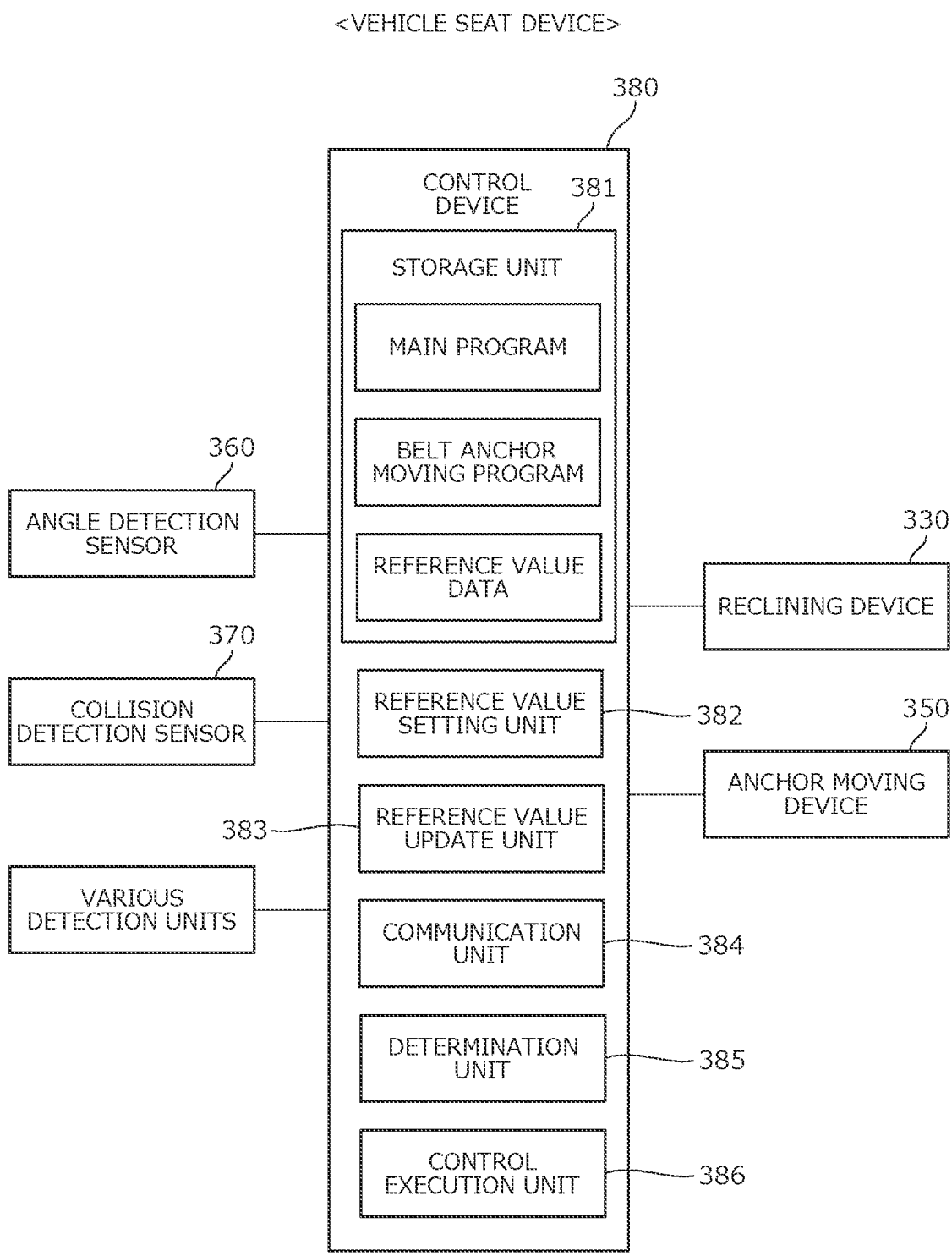
FIG. 13 is a block diagram illustrating hardware and functions of the vehicle seat device.

As illustrated in FIGS. 12 and 13, the control device 380 is an election control unit (ECU) comprehensively performing electrical control of the anchor moving device 350 and is connected to the anchor moving device 350, the angle detection sensor 360, the collision detection sensor 370, and various detection sensors (detection units) through an in-vehicle network.

The control device 380 is a computer including a central processing unit (CPU) as a data arithmetic and control processing device, a ROM and a RAM as storage devices, and a communication interface for transmitting and receiving information data through the in-vehicle network. The control device 380 may be realized by a CPU-mounted semiconductor integrated circuit or field-programmable gate array (FPGA).

The storage device of the control device 380 stores, for example, a belt anchor moving program in addition to a main program fulfilling a function required as a computer. The function of the anchor moving device 350 is exhibited by the CPU executing these programs.

As illustrated in FIG. 13, functionally, the control device 380 includes, as main components, a storage unit 381 storing various programs and various data, a reference value setting unit 382, a reference value update unit 383, a communication unit 384, a determination unit 385, and a control execution unit 386.

These are configured by a CPU, a ROM, a RAM, a communication interface, various programs, and so on.

The function of the control device 380 will be described in detail below.

The storage unit 381 stores "reference value data". "Reference value data" is table data indicating the correspondence relationship between the backward tilt angle of the seat back 302 and the position of the belt anchor 344 in the seat front to back direction, is updated as needed, and is centrally managed and stored.

By referring to the reference value data, the control device 380 is capable of executing belt anchor movement processing corresponding to the backward tilt angle of the seat back 302.

The reference value setting unit 382 initially sets the reference position of the belt anchor 344 in accordance with the backward tilt angle of the seat back 302 and creates "reference value data". For example, different reference values may be set depending on the vehicle type of the vehicle or the driver, passenger, and rear seats in the vehicle.

The reference value update unit 383 appropriately updates "reference value data" in accordance with, for example, revision of legal standards.

The communication unit 384 transmits and receives data between the control device 380 and the reclining device 330, the anchor moving device 350, the angle detection sensor 360, the collision detection sensor 370, and the various detection sensors (detection units) through the in-vehicle network.

For example, the communication unit 384 receives a detection result (detection result data) from the angle detection sensor 360. Then, control data (control signal) regarding the position of the belt anchor 344 based on the backward tilt angle of the seat back 302 is transmitted toward the anchor moving device 350.

In addition, for example, the communication unit 384 receives a detection result (detection result data) from the collision detection sensor 370. Then, when it is determined that a frontal collision of the vehicle is detected, control data (control signal) is transmitted toward the anchor moving device 350 so as to move the belt anchor 344 to the seat front beyond the normal position.

The determination unit 385 determines the presence or absence of a frontal collision of the vehicle based on the detection result of the collision detection sensor 370.

It should be noted that the determination unit 385 may determine not only a frontal collision of the vehicle but also a rear collision, a lateral collision, an overhead collision of the vehicle, a collision from directly below the vehicle, and so on.

The control execution unit 386 outputs predetermined control data (control signal) toward the reclining device 330, the anchor moving device 350, and so on through the in-vehicle network and controls the reclining device 330 and the anchor moving device 350 to execute predetermined operations.

Specifically, the control execution unit 386 determines the position of the belt anchor 344 from the detection result of the angle detection sensor 360 by referring to "reference value data" and controls the anchor moving device 350 to move the belt anchor 344 up to a predetermined position.

In addition, the control execution unit 386 controls the anchor moving device 350 to move the belt anchor 344 up to a predetermined position when it is determined that there has been a frontal collision of the vehicle based on the detection result of the collision detection sensor 370. Preferably, the predetermined position at this time is, for example, a position set in advance in accordance with the magnitude of the collision load entailed by the frontal collision of the vehicle. The setting may be performed in accordance with the vehicle type of the vehicle or the seat position in the vehicle.

Next, an example of the processing of a belt anchor movement processing program (belt anchor movement processing method) executed by the vehicle seat device S4 will be described with reference to FIG. 14.

The above program of the present embodiment is a program for realizing the above storage unit 381, reference value setting unit 382, reference value update unit 383, communication unit 384, determination unit 385, and control execution unit 386 as functional components of the control device 380 having the storage unit 381. The CPU of the control device 380 executes this program.

The execution of the above program is triggered by, for example, a user (occupant) sitting on the seat main body.

Figure 14:
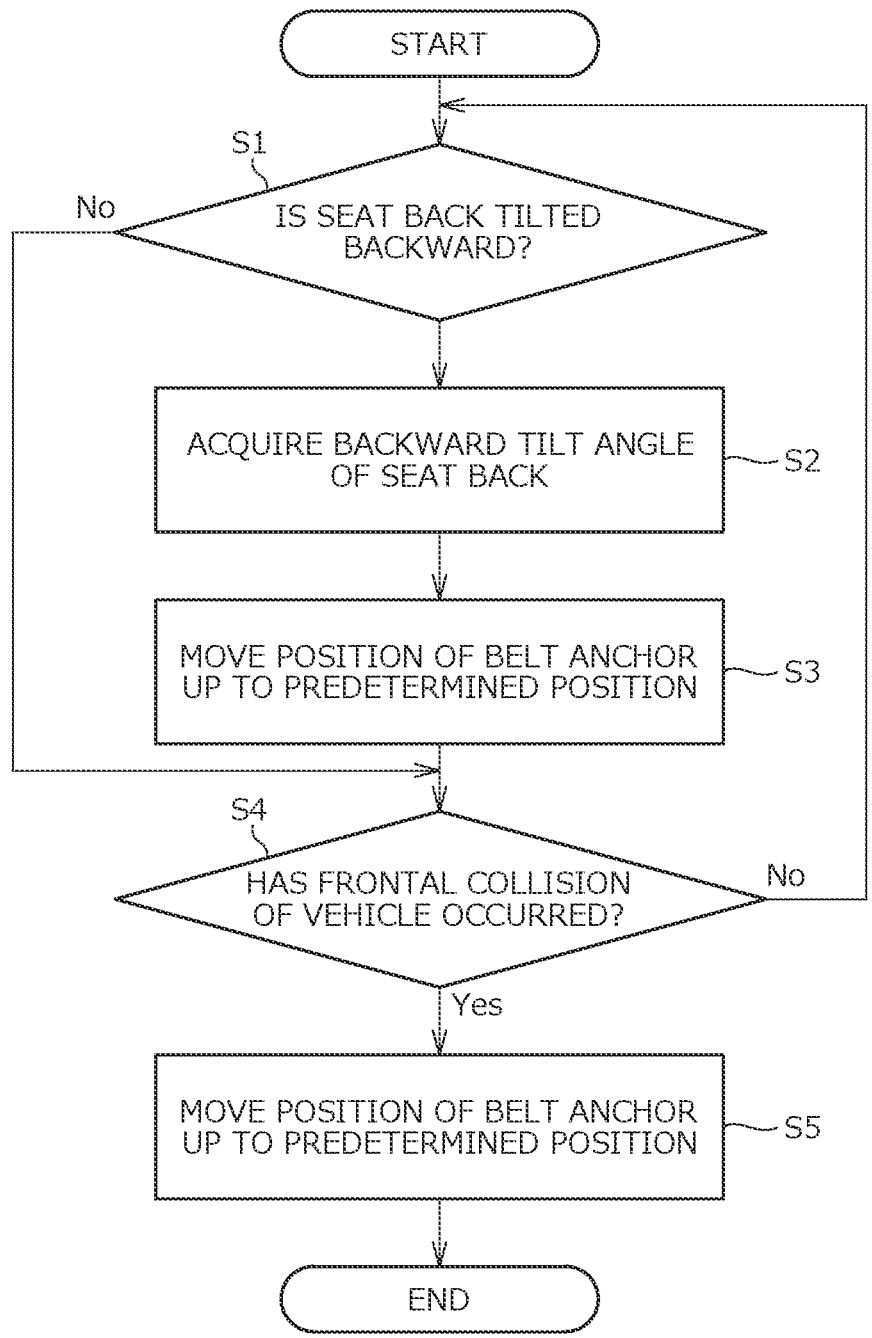
FIG. 14 is a flowchart illustrating an example of belt anchor movement processing.

The processing flow illustrated in FIG. 14 starts from step S1, in which the control device 380 first determines whether or not the seat back 302 is tilted backward by the reclining device 330.

Specifically, the control device 380 (determining unit) receives a detection result (detection result data) from a detection sensor (not illustrated) detecting the driving motion of the reclining device 330 and determines whether or not the seat back 302 is tilted backward by the reclining device 330. Alternatively, the control device 380 (determining unit) receives a detection result (detection result data) from the angle detection sensor 360 and determines whether or not the seat back 302 is tilted backward by the reclining device 330.

In a case where it is determined that the seat back 302 is tilted backward (step S1: Yes), the processing proceeds to step S2 and the control device 380 acquires information on the backward tilt angle of the seat back 302.

Specifically, the angle detection sensor 360 measures the backward tilt angle of the seat back 302, and the communication unit 384 receives the backward tilt angle measurement result (detection result) from the angle detection sensor 360.

It should be noted that the processing proceeds to step S4 in a case where it is determined that the seat back 302 is not tilted backward (step S1: No).

Then, in step S3, the control device 380 (control execution unit 386) determines the position of the belt anchor 344 from the measurement result of the angle detection sensor 360 by referring to "reference value data" and controls the anchor moving device 350 to move the belt anchor 344 up to a predetermined position.

Then, in step S4, the control device 380 determines whether or not a frontal collision of the vehicle has occurred.

Specifically, the collision detection sensor 370 detects a frontal collision of the vehicle, and the determination unit 385 determines the presence or absence of a frontal collision of the vehicle based on the detection result of the collision detection sensor 370.

The processing proceeds to step S5 in a case where it is determined that a frontal collision of the vehicle has occurred (step S4: Yes). On the other hand, the processing returns to step S1 in a case where it is determined that a frontal collision of the vehicle has not occurred (step S4: No).

Then, in step S5, the control device 380 (control execution unit 386) controls the anchor moving device 350 to move the belt anchor 344 up to a predetermined position.

The process of FIG. 14 ends through steps S1 to S5 described above.

With the configuration of the belt anchor movement processing program described above, the belt anchor 344 (lap belt 341b) can be suitably moved in the seat front to back direction as the control device 380 controls the drive of the anchor moving device 350 in accordance with the backward tilt angle of the seat back 302.

In addition, the belt anchor 344 (lap belt 341b) can be suitably moved in the seat front to back direction as the control device 380 controls the drive of the anchor moving device 350 when a frontal collision of the vehicle is detected.

Fifth Embodiment

Next, a vehicle seat device S5 of a fifth embodiment will be described with reference to FIGS. 15A and 15B.

It should be noted that description of content that overlaps with the vehicle seat devices S1 to S4 described above will be omitted.

The vehicle seat device S5 includes a seat main body having a seat cushion 401 and a seat back 402, a height link device 404, a reclining device 430, a seat belt device 440, an anchor moving device 450, and a control device 480 controlling these devices.

Figure 15A:
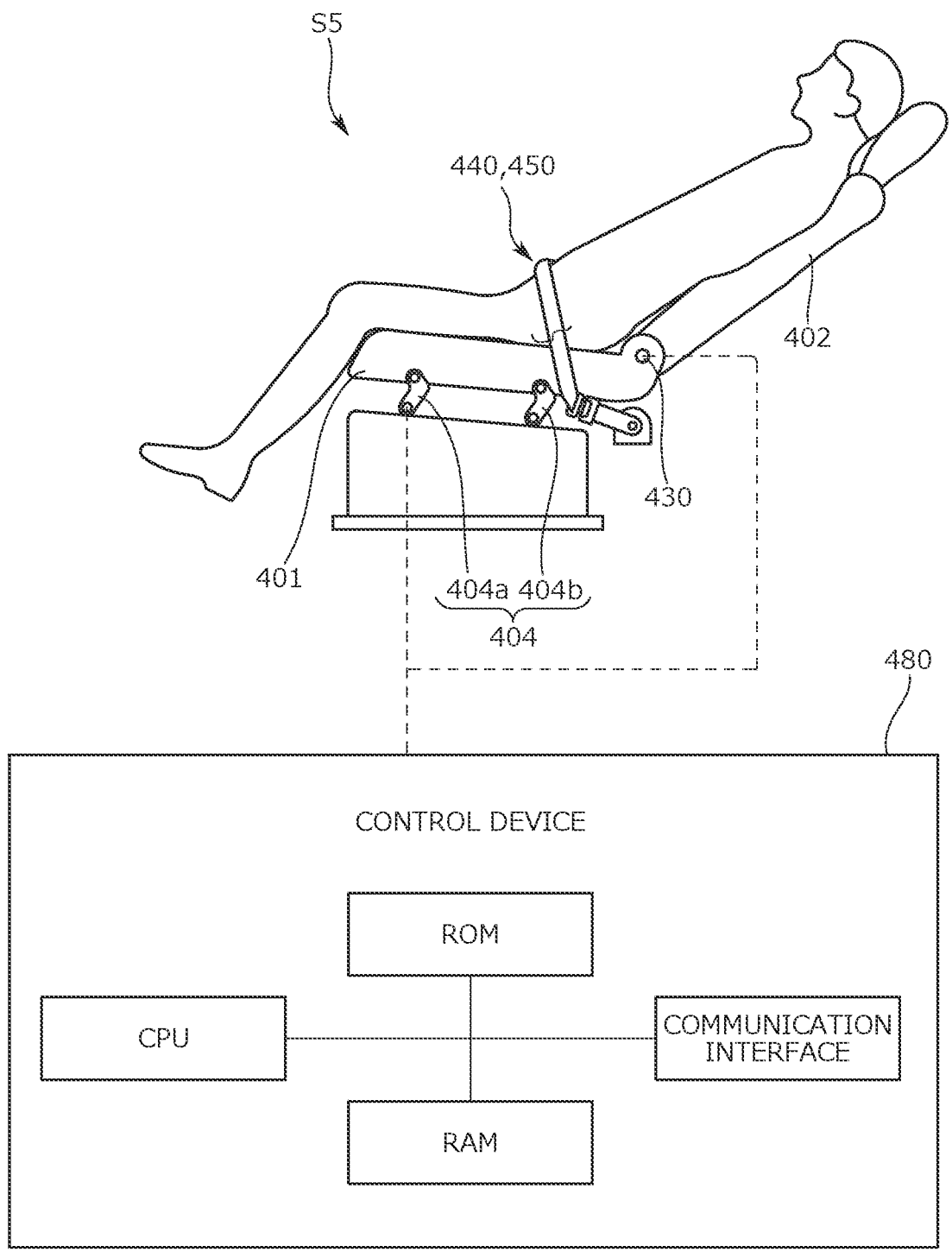
FIG. 15A is a side view of a vehicle seat device of a fifth embodiment, illustrating a state where a seat main body is at "relax position".

As illustrated in FIG. 15A, the vehicle seat device S5 is a seat device capable of switching the seat main body from "normal position" to "relax position".

The height link device 404 is configured mainly from right and left first links 404a attached between the vehicle body and the seat cushion 401 in the up to down direction and disposed on the seat front side, right and left second links 404b disposed on the seat rear side, a lock member (not illustrated) locking the seat main body so as to be incapable of moving up and down, and an operating lever (not illustrated) for releasing the lock state of the lock member. Further, each of the first link 404a and the second link 404b is independently driven as a drive link, and the height link device 404 is capable of appropriately adjusting the height of the seat main body.

Figure 15B:
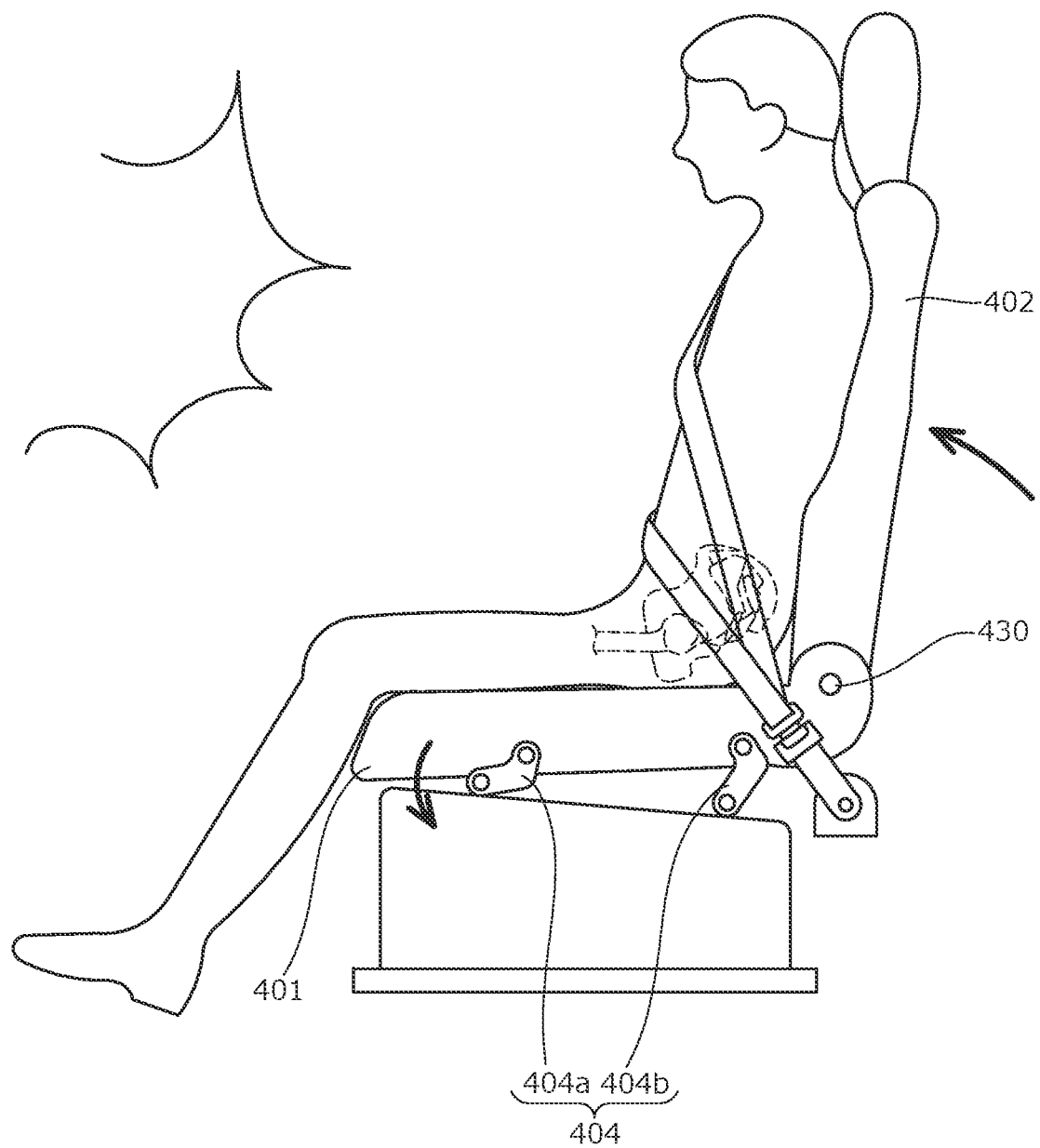
FIG. 15B is a diagram illustrating a state where a seat back and a seat cushion are tilted forward in the seat main body of FIG. 15A.

In the above configuration, as illustrated in FIG. 15B, the control device 480 controls the drive of the height link device 404 and the reclining device 430 when a frontal collision of the vehicle is detected or when a frontal collision of the vehicle is detected in advance.

Specifically, the control device 480 controls the drive of the height link device 404 so as to lower the front part of the seat cushion 401. In other words, the second link 404b is kept on standby as it is and the drive of the first link 404a is controlled.

In addition, the control device 480 controls the drive of the reclining device 430 such that the seat back 402 is returned from "relax position" to "normal position".

By doing so, the occupant's state can be raised in the event of a frontal collision of the vehicle, and the submarine phenomenon can be suppressed suitably.

Sixth Embodiment

Figure 16A:
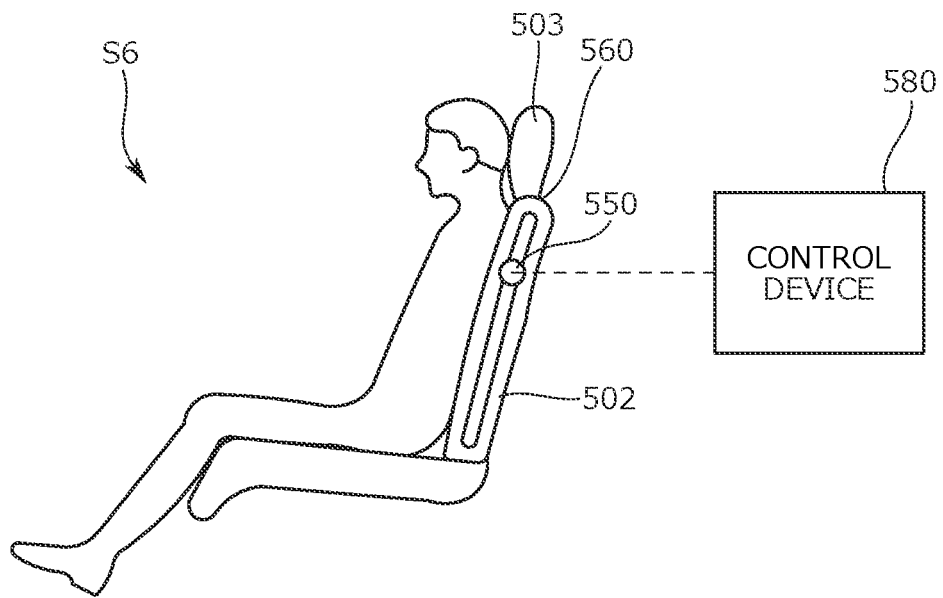
FIG. 16A is a side view of a vehicle seat device of a sixth embodiment, illustrating a state where a seat main body is at "normal position".

Next, a vehicle seat device S6 of a sixth embodiment will be described with reference to FIGS. 16A and 16B.

It should be noted that description of content that overlaps with the vehicle seat devices S1 to S5 described above will be omitted.

The vehicle seat device S6 includes a seat main body having a seat back 502 and a headrest 503, a seat back movable device 550, a headrest movable device 560, an airbag device 570, and a control device 580 controlling these devices.

The seat back movable device 550 is a device capable of pivoting the upper part of the seat back 502 forward.

The headrest movable device 560 is a device capable of pivoting the headrest 503 forward.

The airbag device 570, which is provided at the middle position at the upper part of the seat back 502 in the seat width direction, is a device capable of forward inflation deployment of an airbag 571.

Figure 16B:
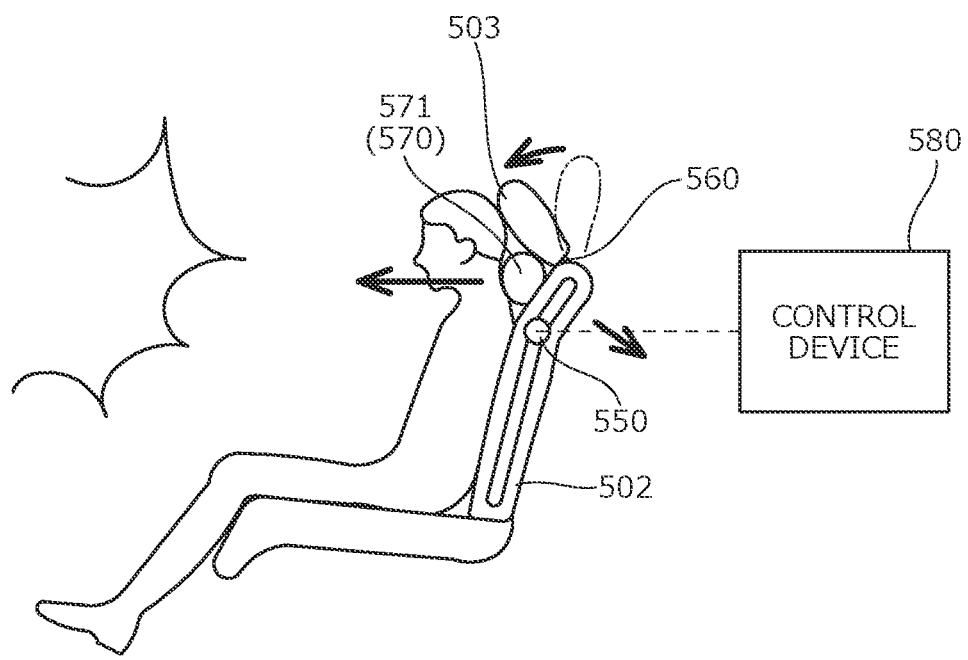
FIG. 16B is a diagram illustrating a state where a seat back is partially tilted backward, a headrest is tilted forward, and an airbag is deployed in the seat main body of FIG. 15A.
Figure 17:
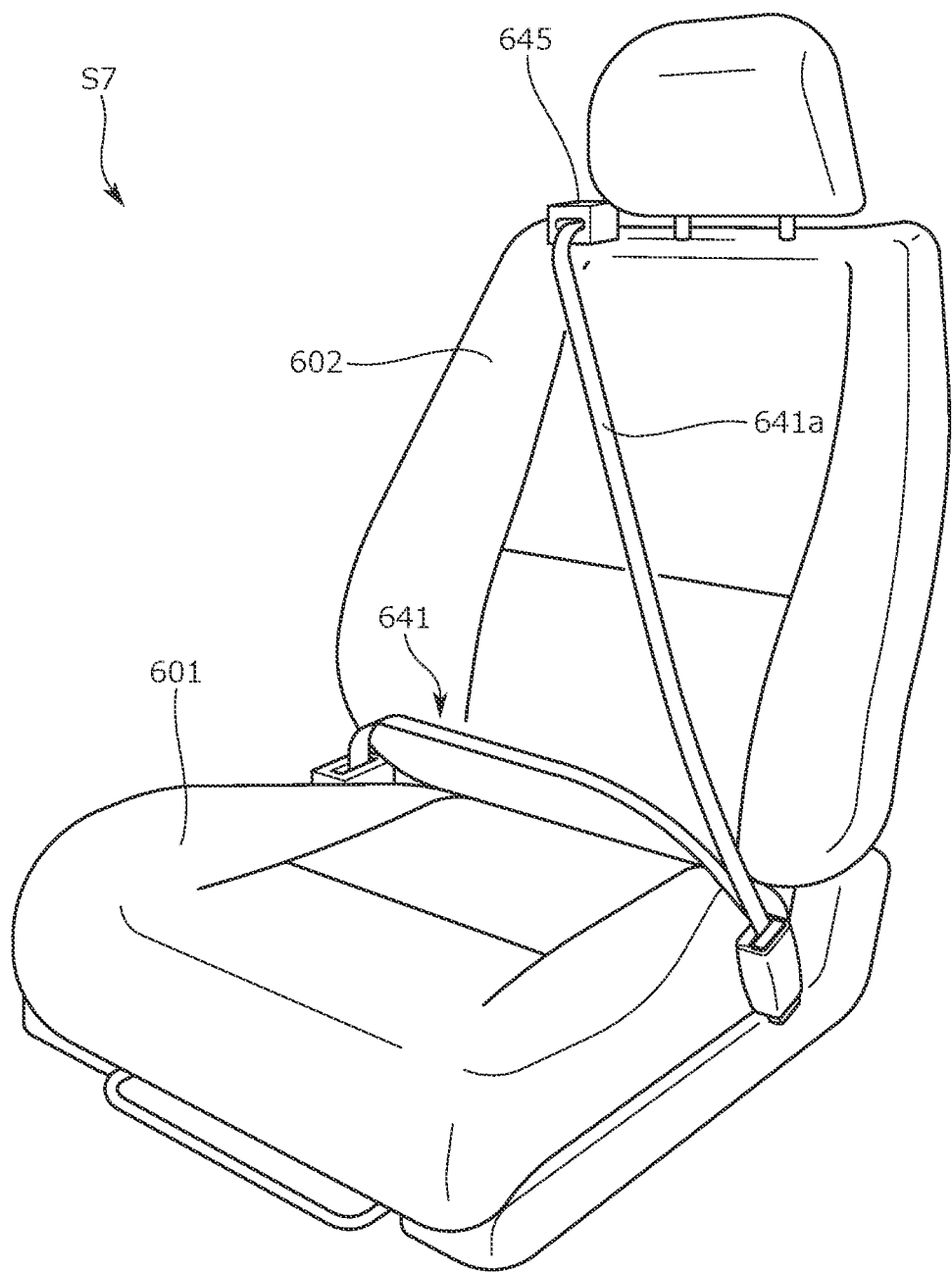
FIG. 17 is a perspective view of a vehicle seat device of a seventh embodiment, illustrating a seat belt device and a belt guide.

In the above configuration, as illustrated in FIG. 16B, when a frontal collision of the vehicle is detected or detected in advance, the control device 580 first controls the drive of the airbag device 570 to cause forward inflation deployment of the airbag 571 (step S1).

Further, simultaneously with the inflation deployment of the airbag 571 or immediately after the inflation deployment of the airbag 571, the control device 580 controls the drive of the seat back movable device 550 to pivot the upper part of the seat back 502 forward.

Further, simultaneously with the pivoting motion of the seat back 502 or immediately after the pivoting motion of the seat back 502, the control device 580 controls the drive of the headrest movable device 560 to pivot the headrest 503 forward.

By doing so, the occupant's posture can be set to a suitable position in the event of a frontal collision of the vehicle, and the submarine phenomenon can be suppressed suitably. In other words, the occupant's head and torso can be raised at the same time, and thus unintended load application to the occupant can be prevented.

Seventh Embodiment

Next, a vehicle seat device S7 of a seventh embodiment will be described with reference to FIGS. 17 to 19A and 19B.

It should be noted that description of content that overlaps with the vehicle seat devices S1 to S6 described above will be omitted.

The vehicle seat device S7 includes a seat main body having a seat cushion 601 and a seat back 602 and a seat belt device 640.

The seat belt device 640 includes a belt guide 645 attached to the upper end portion of the seat back 602 or around the upper end portion of the seat back 602 to guide the extension direction of a seat belt 641 (shoulder belt 641a).

Figure 18:
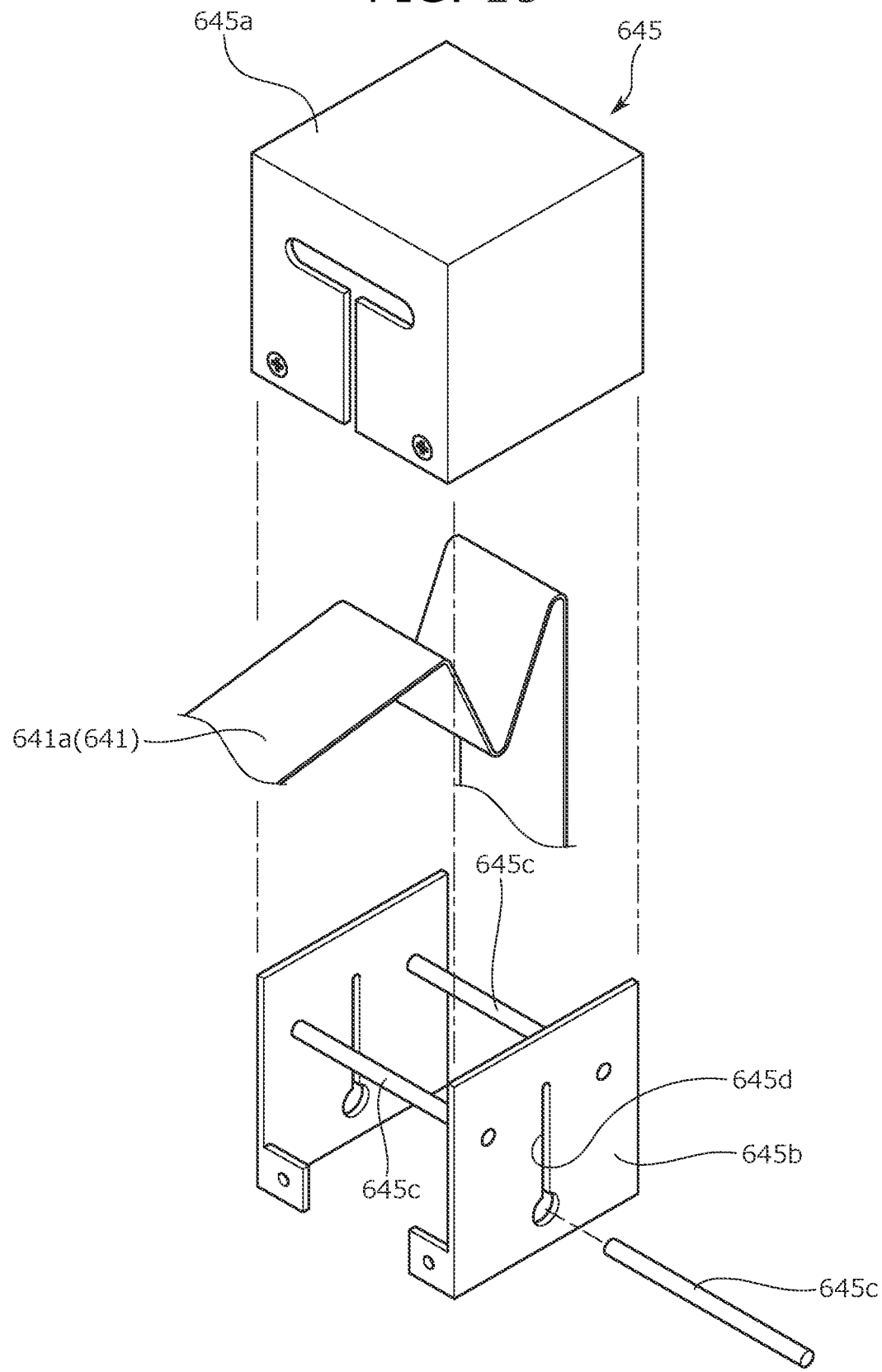
FIG. 18 is an exploded perspective view of the belt guide.
Figure 19A:
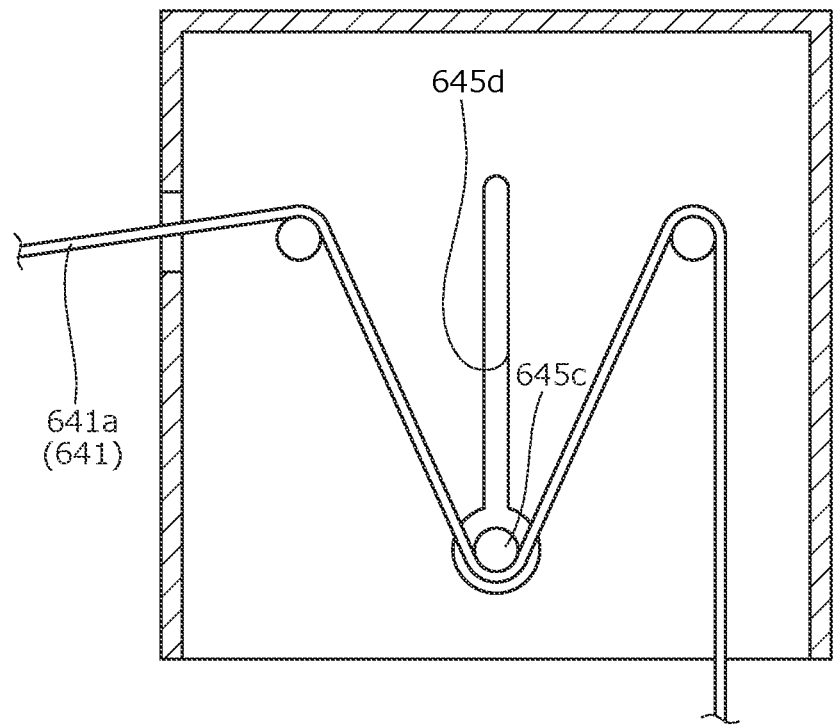
FIG. 19A is a cross-sectional view of the belt guide and is a diagram for describing a state where a seat belt is guided by the belt guide.
Figure 19B:
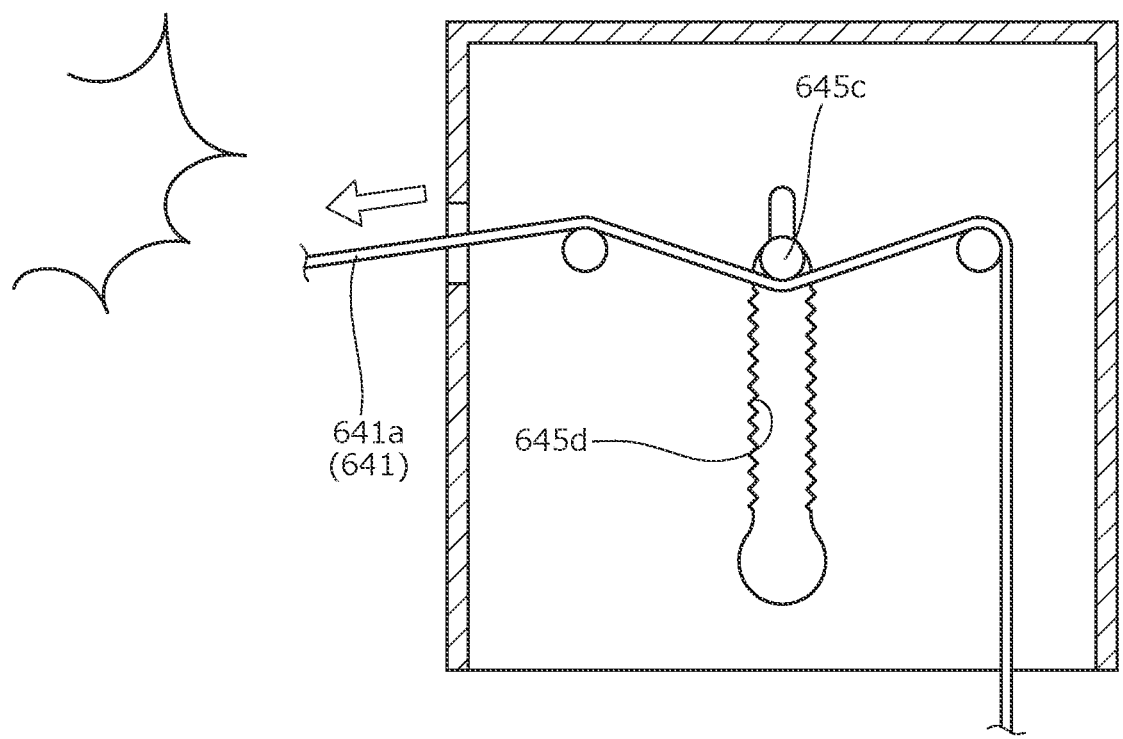
FIG. 19B is a diagram for describing a state where a fragile portion of the belt guide is deformed due to a frontal collision of a vehicle.
Figure 20:
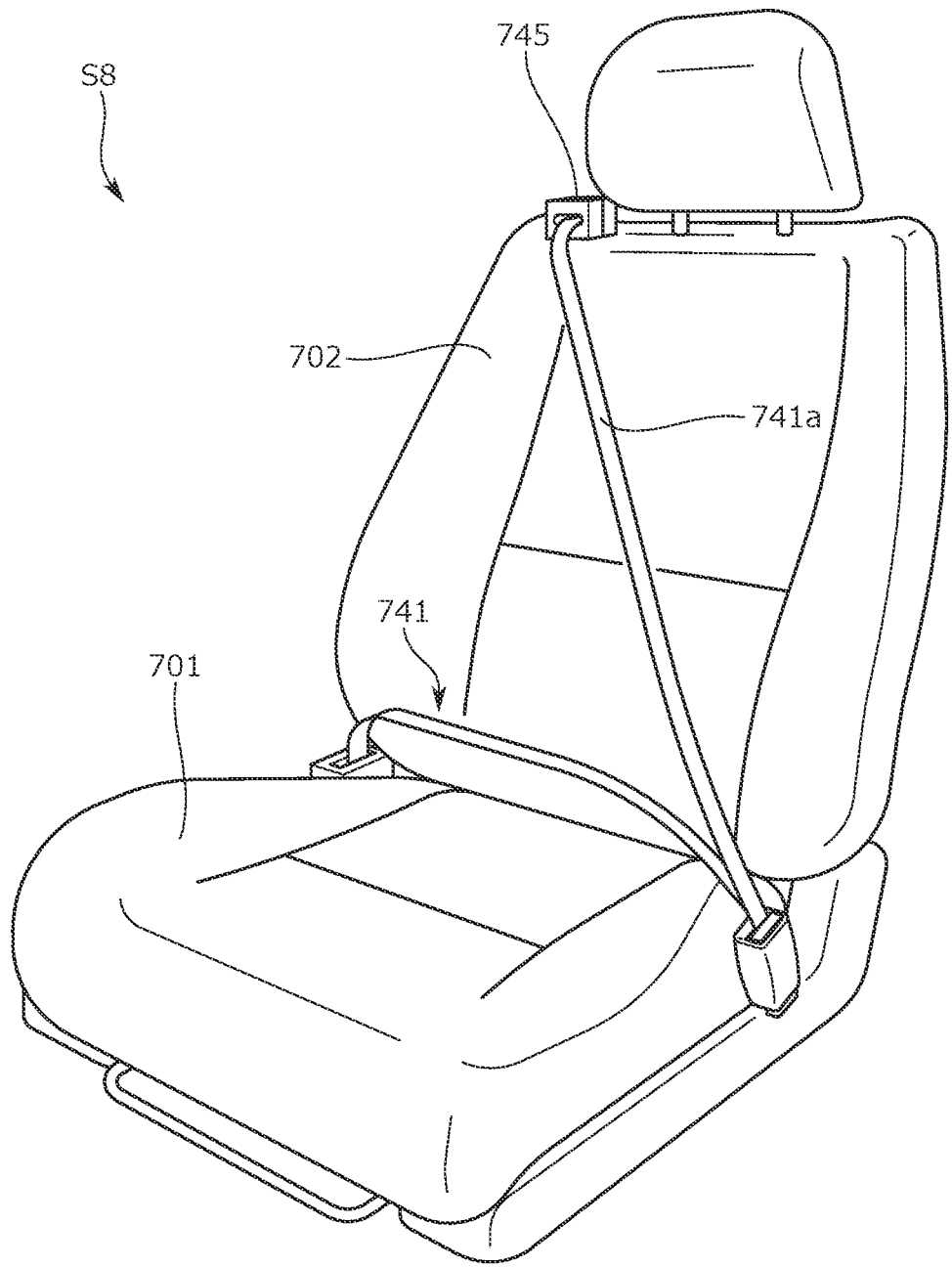
FIG. 20 is a perspective view of a vehicle seat device of an eighth embodiment, illustrating a seat belt device and a belt guide.
Figure 21:
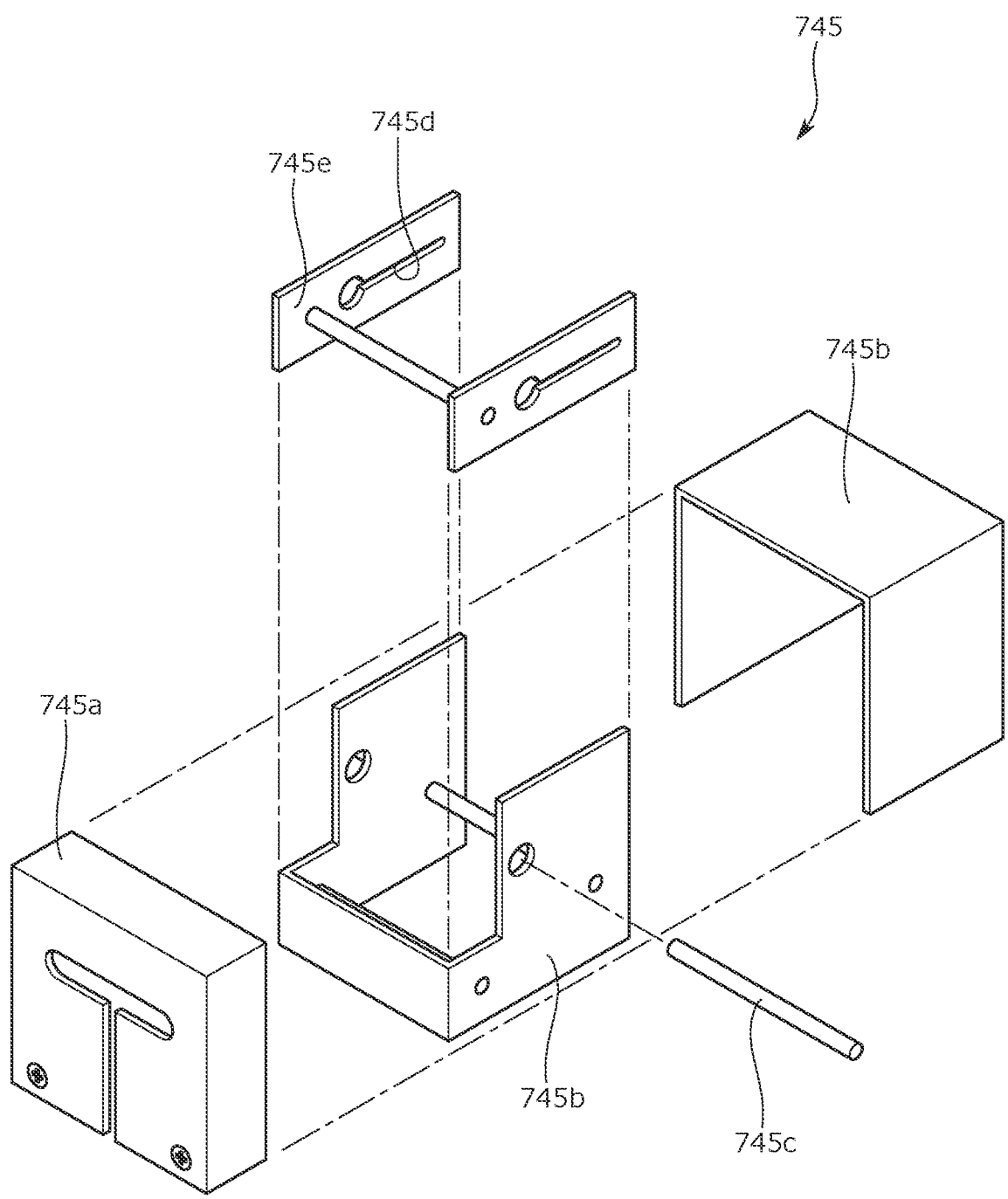
FIG. 21 is an exploded perspective view of the belt guide.

As illustrated in FIGS. 18, 19A, and 19B, the belt guide 645 has a first housing 645a having a front opening portion for sending out the seat belt 641 to a position in front of the seat main body and a second housing 645b accommodated in the first housing 645a in order to hold the seat belt 641.

The second housing 645b has a plurality of belt holding portions 645c (belt holding shafts) and a fragile portion 645d formed at a position adjacent to the belt holding portions 645c.

In the above configuration, as illustrated in FIG. 19B, in the event of a frontal collision of the vehicle, the belt holding portion 645c of the belt guide 645 breaks the fragile portion 645d and the holdability of the seat belt 641 becomes loose. In other words, the seat belt 641 is stretched more than usual, and the occupant restraining force of the seat belt 641 is slightly loosened. As a result, the occupant is likely to fall forward.

By doing so, the occupant's posture can be set to a suitable position in the event of a frontal collision of the vehicle, and the submarine phenomenon can be suppressed suitably.

Eighth Embodiment

Next, a vehicle seat device S8 of an eighth embodiment will be described with reference to FIGS. 20 to 22A and 22B.

It should be noted that description of content that overlaps with the vehicle seat devices S1 to S7 described above will be omitted.

The vehicle seat device S8 includes a seat main body having a seat cushion 701 and a seat back 702 and a seat belt device 740.

The seat belt device 740 includes a belt guide 745 attached to the upper end portion of the seat back 702 or around the upper end portion of the seat back 702 to guide the extension direction of a seat belt 741 (shoulder belt 741a).

The belt guide 745 has a first housing 745a having a front opening portion for sending out the seat belt 741 to a position in front of the seat main body, a second housing 745b attached to the rear of the first housing 745a in order to hold the seat belt 741, and a connecting body 745e connecting the first housing 745a and the second housing 745b.

The second housing 745b has a plurality of belt holding portions 745c (belt holding shafts).

The connecting body 745e has a fragile portion 745d formed at a position adjacent to the belt holding portion 745c.

Figure 22A:
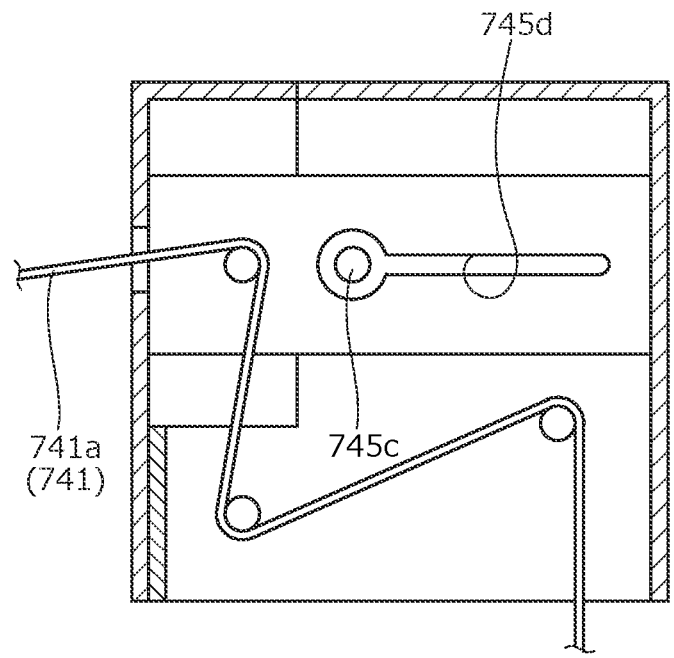
FIG. 22A is a cross-sectional view of the belt guide and is a diagram for describing a state where a seat belt is guided by the belt guide.
Figure 22B:
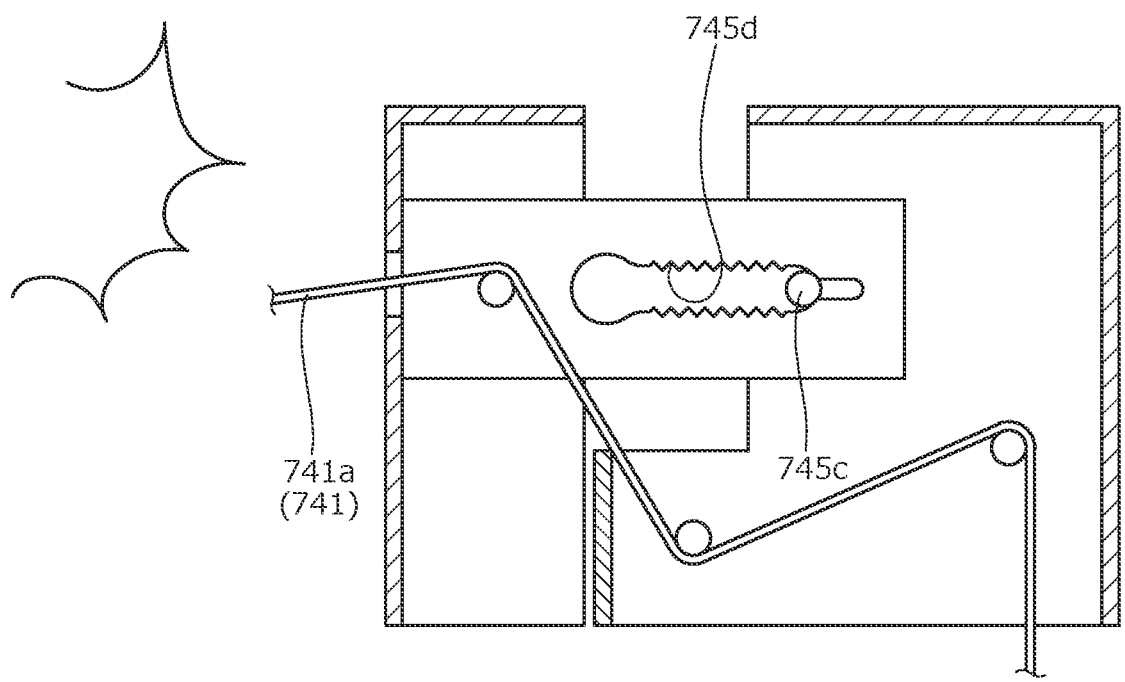
FIG. 22B is a diagram for describing a state where a fragile portion of the belt guide is deformed due to a frontal collision of a vehicle.
Figure 23A:
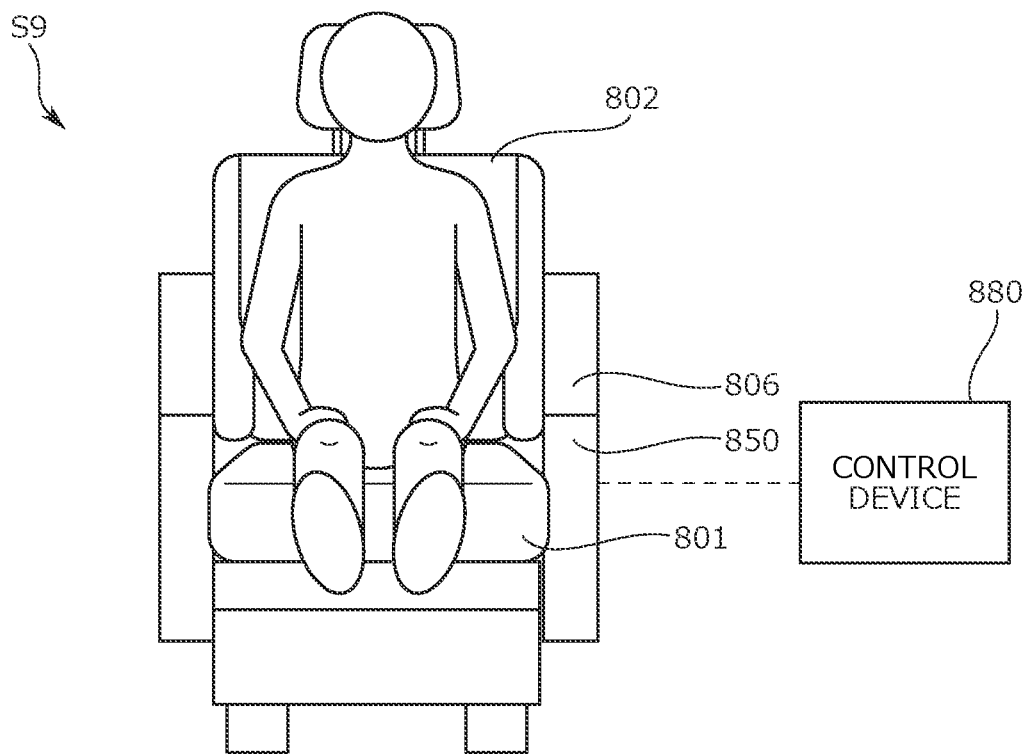
FIG. 23A is a front view of a vehicle seat device of a ninth embodiment, illustrating a state where an armrest is at "normal position".
Figure 23B:
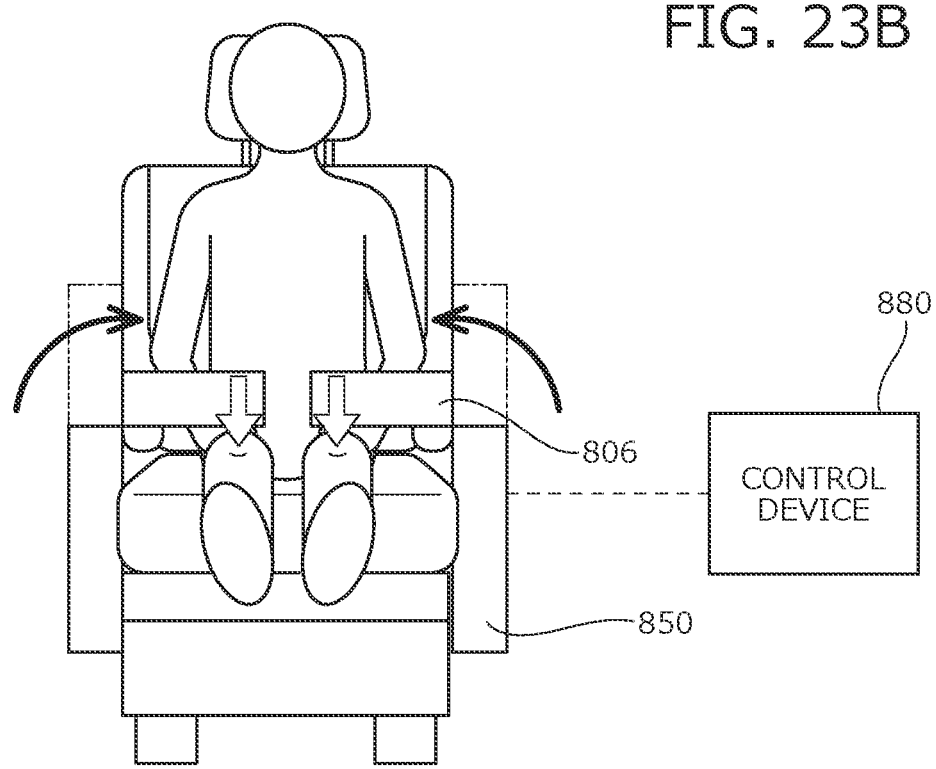
FIG. 23B is a diagram illustrating a state where the armrest of FIG. 23A folded in portion.

In the above configuration, as illustrated in FIG. 22B, in the event of a frontal collision of the vehicle, the belt holding portion 745c of the belt guide 745 breaks the fragile portion 745d and the holdability of the seat belt 741 becomes loose. In other words, the occupant restraining force of the seat belt 741 is slightly loosened, and the occupant is likely to fall forward.

By doing so, the occupant's posture can be set to a suitable position in the event of a frontal collision of the vehicle, and the submarine phenomenon can be suppressed suitably.

Ninth Embodiment

Next, a vehicle seat device S9 of a ninth embodiment will be described with reference to FIGS. 23A and 23B to 25.

It should be noted that description of content that overlaps with the vehicle seat devices S1 to S8 described above will be omitted.

The vehicle seat device S9 includes a seat main body having a seat cushion 801, a seat back 802, and an armrest 806, an armrest movable device 850, and a control device 880 controlling the armrest movable device 850.

The armrest movable device 850 is a device capable of pivoting a portion of the upper part of the armrest 806 to the lower side toward the inside in the seat width direction.

Figure 24:
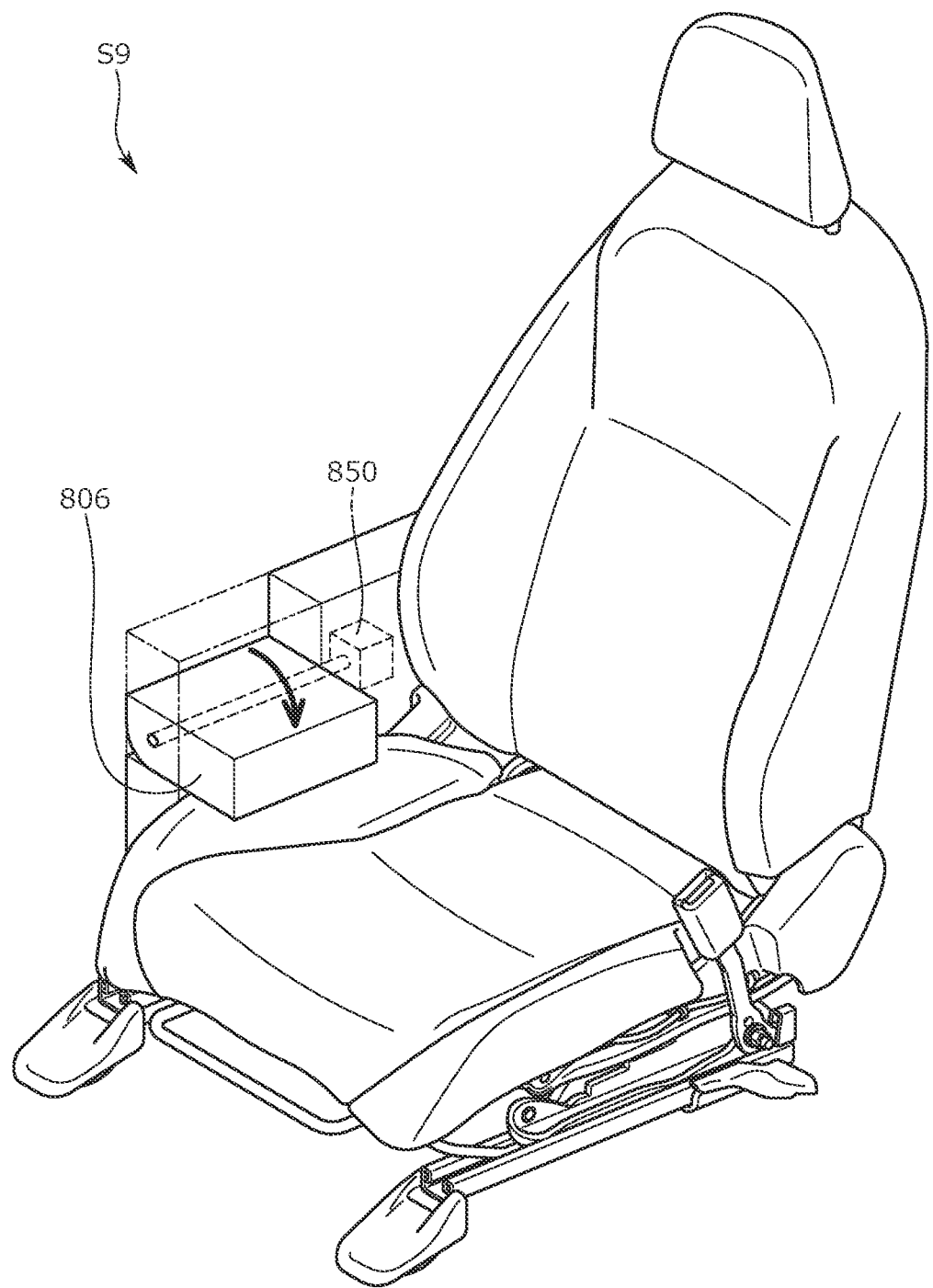
FIG. 24 is a diagram illustrating an armrest movable device.

For example, the armrest movable device 850 is an electric actuator attached in the armrest 806 as illustrated in FIG. 24.

Figure 25:
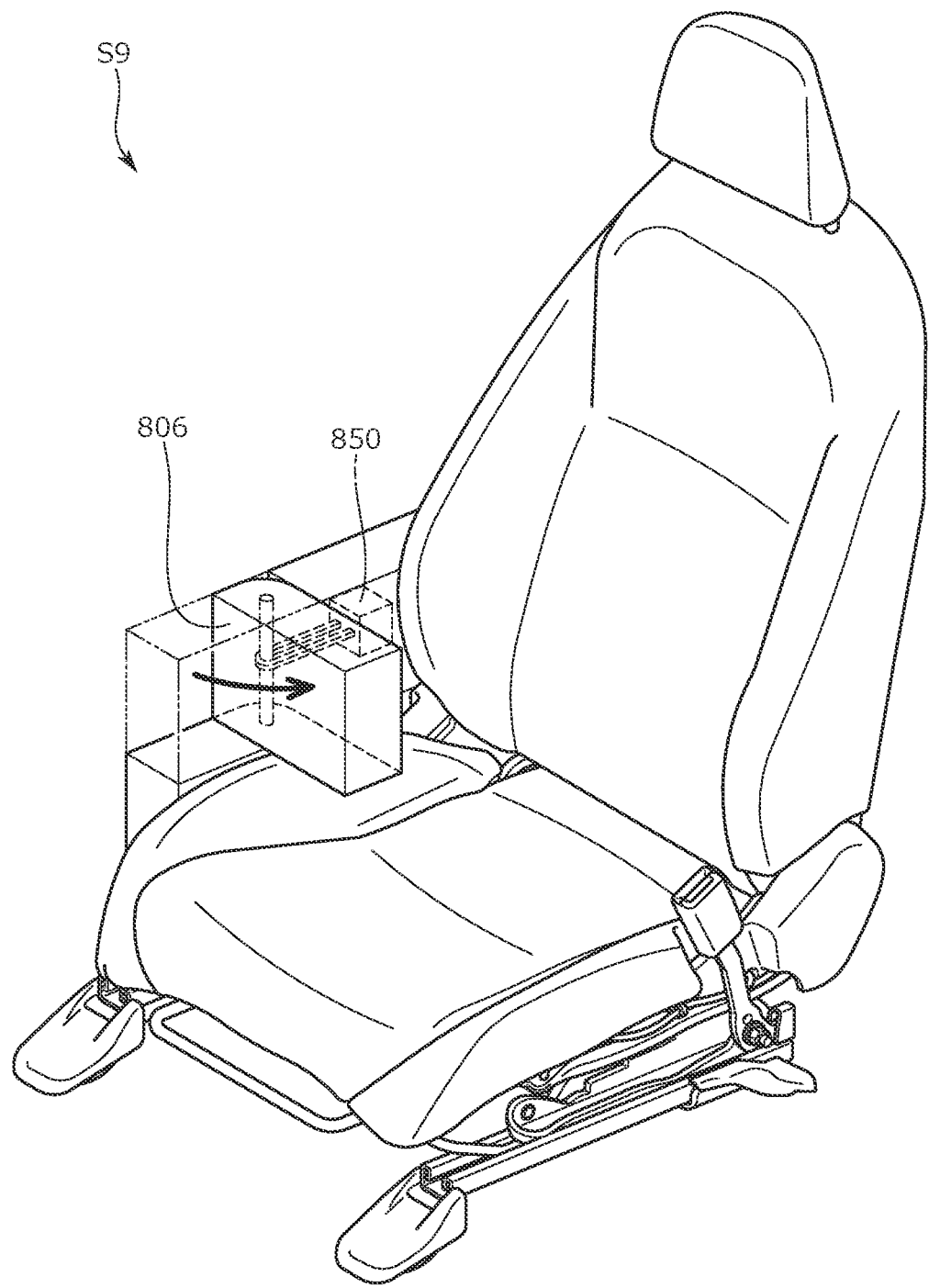
FIG. 25 is a diagram illustrating Modification Example 1 of the armrest movable device.

It should be noted that the armrest movable device 850 may be a device pivoting a portion of the upper part of the armrest 806 to the rear side toward the inside in the seat width direction as illustrated in FIG. 25.

For example, the armrest movable device 850 is a wire winding device attached in the armrest 806. The device is capable of using a wire to pivot a portion of the upper part of the armrest 806 about a winding axis.

In addition, the armrest movable device 850 is not limited to an electric mechanism, and a portion of the armrest 806 may be movable by a mechanism using an inflator.

In the above configuration, a portion of the armrest 806 can be folded toward the occupant as the control device 880 controls the drive of the armrest movable device 850 when a frontal collision of the vehicle is detected or detected in advance.

By doing so, the occupant's posture can be maintained at a suitable position in the event of a frontal collision of the vehicle, slipping of the occupant's lumbar can be suppressed, and the submarine phenomenon can be suppressed suitably.

Tenth Embodiment

Figure 26A:
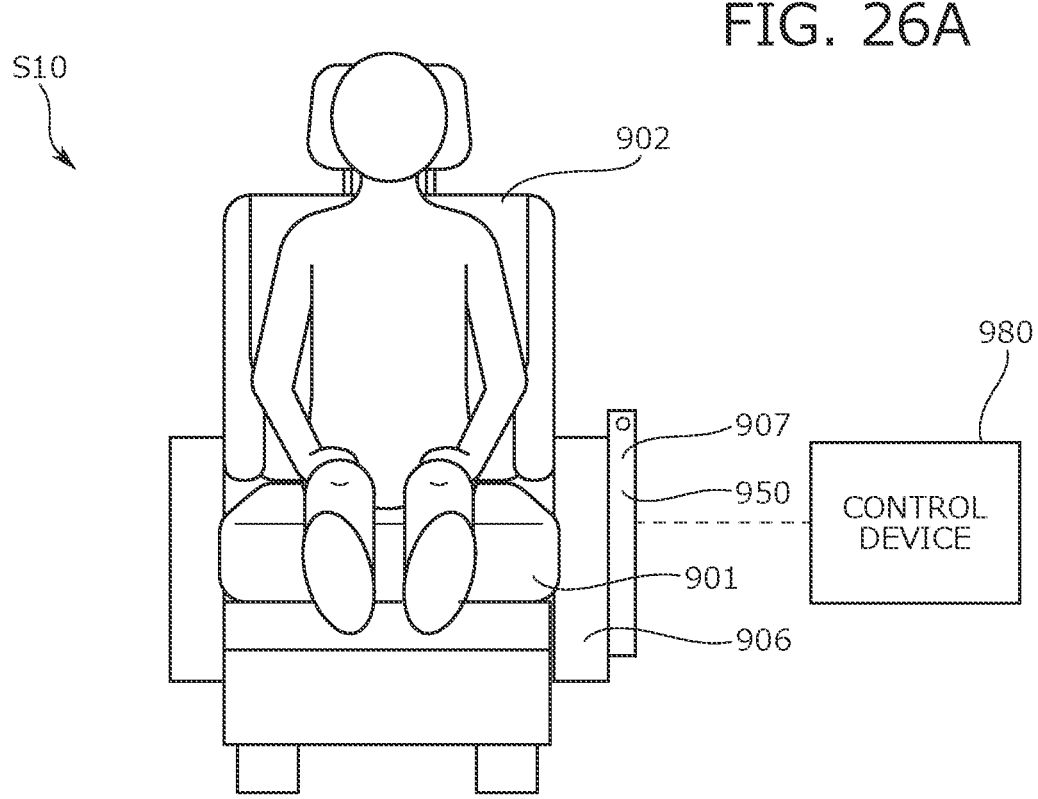
FIG. 26A is a front view of a vehicle seat device of a tenth embodiment, illustrating a state where a table is at "normal position".
Figure 26B:
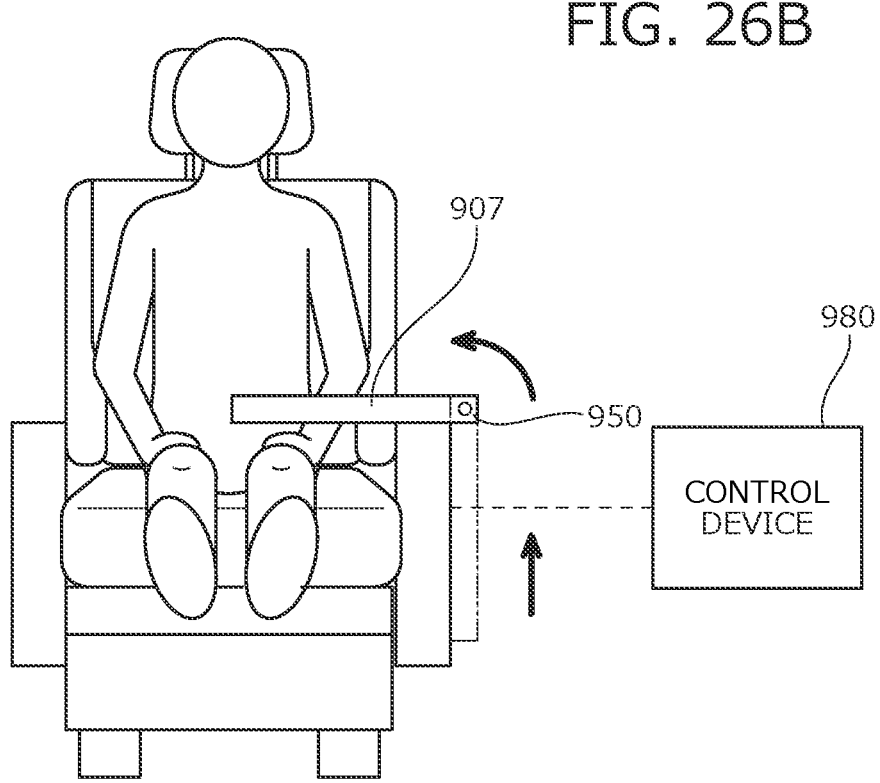
FIG. 26B is a diagram illustrating a state where the table of FIG. 26A has popped out.

Next, a vehicle seat device S10 of a tenth embodiment will be described with reference to FIGS. 26A and 26B.

It should be noted that description of content that overlaps with the vehicle seat devices S1 to S9 described above will be omitted.

The vehicle seat device S10 includes a seat main body having a seat cushion 901, a seat back 902, an armrest 906, and a table 907, a table movable device 950, and a control device 980.

The table movable device 950 is a device capable of causing the table 907 to protrude.

The table 907 is capable of popping out toward the occupant as the control device 980 controls the drive of the table movable device 950 when a frontal collision of the vehicle is detected or detected in advance.

By doing so, the occupant's posture can be maintained at a suitable position in the event of a frontal collision of the vehicle, and the submarine phenomenon can be suppressed suitably.

It should be noted that an airbag (not illustrated) instead of the table 907 may be inflation-deployed from the armrest 906 to hold the occupant's leg. Alternatively, a plate member or a table may protrude toward the occupant side from the inside of a vehicle door to hold the occupant's leg.

Eleventh Embodiment

Figure 27:
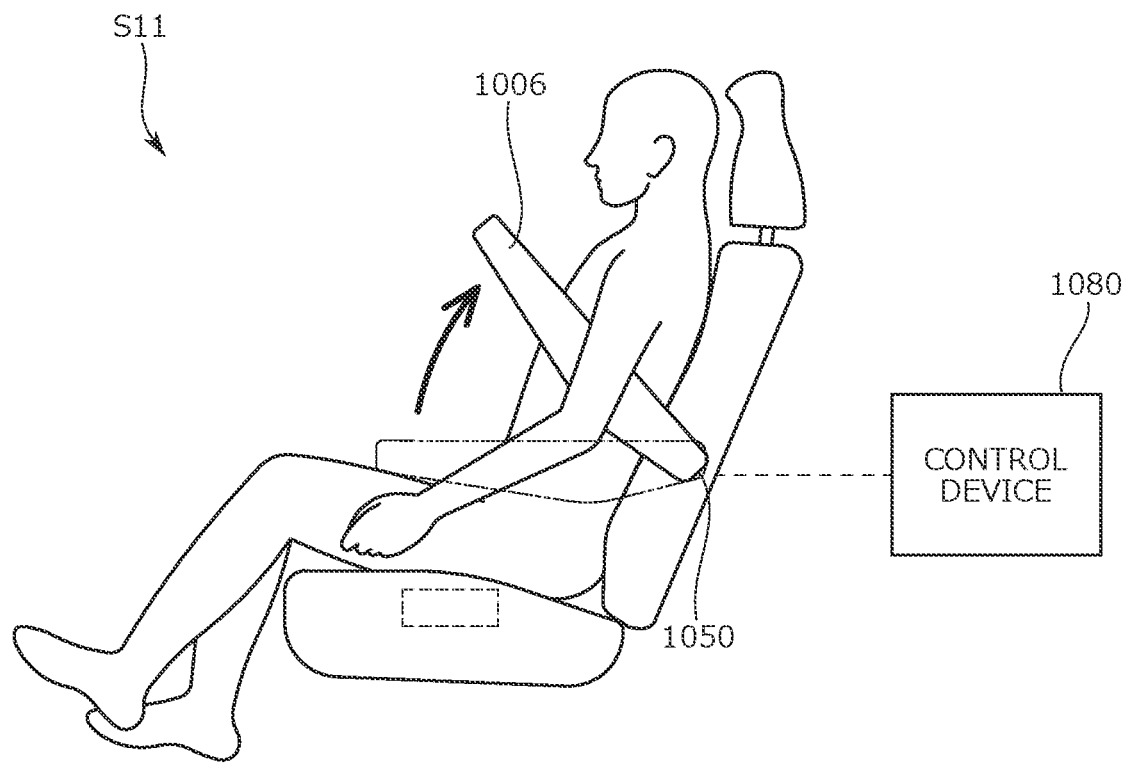
FIG. 27 is a side view of a vehicle seat device of an eleventh embodiment and is a diagram for describing a state where an occupant is restrained by an armrest.

Next, a vehicle seat device S11 of an eleventh embodiment will be described with reference to FIG. 27.

It should be noted that description of content that overlaps with the vehicle seat devices S1 to S10 described above will be omitted.

The vehicle seat device S11 includes a seat main body having an armrest 1006, an armrest movable device 1050, and a control device 1080.

The armrest 1006 can be pivoted upward toward the rear as the control device 1080 controls the drive of the armrest movable device 1050 when a frontal collision of the vehicle is detected or detected in advance.

By doing so, the occupant's posture can be maintained at a suitable position in the event of a frontal collision of the vehicle, and the submarine phenomenon can be suppressed suitably. Specifically, the armrest 1006 is capable of restraining the occupant's arm.

Twelfth Embodiment

Figure 28:
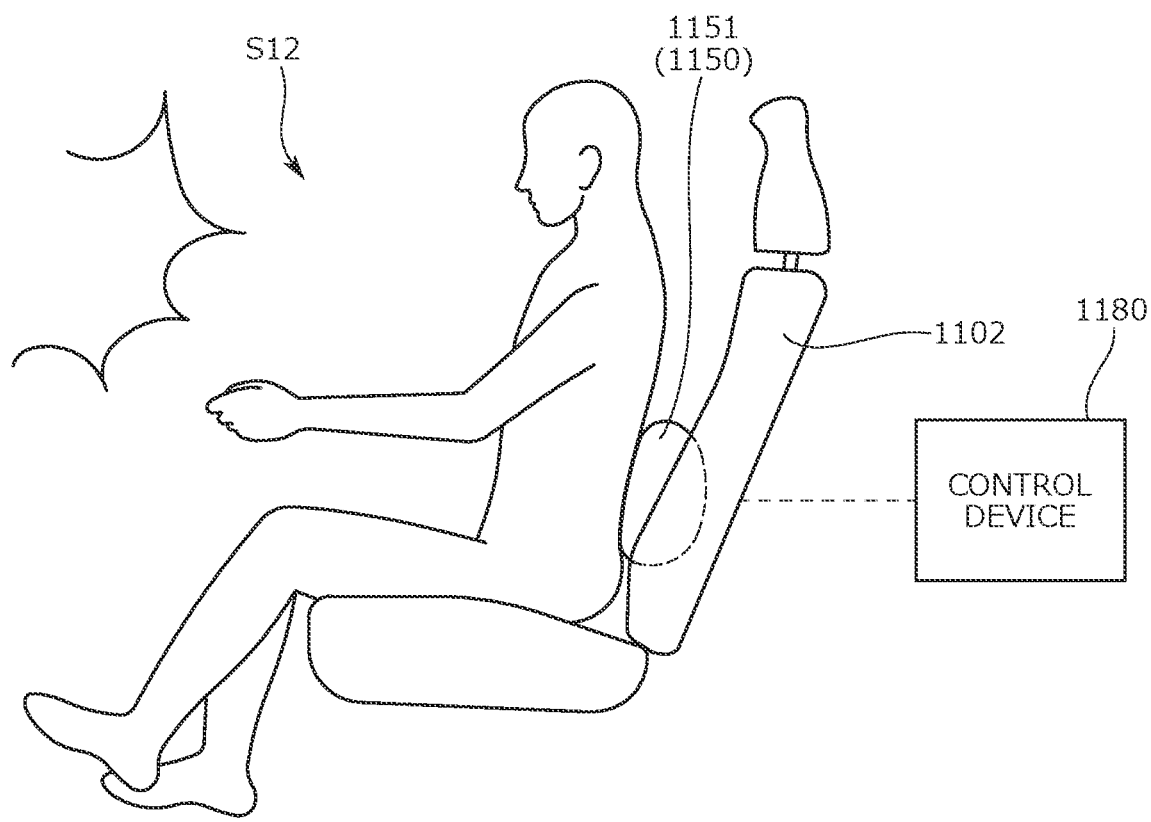
FIG. 28 is a side view of a vehicle seat device of a twelfth embodiment and is a diagram for describing a state where a lumbar support is inflated toward an occupant.

Next, a vehicle seat device S12 of a twelfth embodiment will be described with reference to FIG. 28.

It should be noted that description of content that overlaps with the vehicle seat devices S1 to S11 described above will be omitted.

The vehicle seat device S12 includes a seat main body having a seat back 1102, a lumbar support device 1150 provided in the seat back 1102, and a control device 1180.

A lumbar support 1151 is capable of protruding forward toward the occupant as the control device 1180 controls the drive of the lumbar support device 1150 when a frontal collision of the vehicle is detected or detected in advance.

It should be noted that the lumbar support 1151 may be a plate-shaped plate member or an air cell.

By doing so, the occupant's posture can be maintained at a suitable position in the event of a frontal collision of the vehicle, and the submarine phenomenon can be suppressed suitably. Specifically, the lumbar support can be operated to tilt the occupant's pelvis forward, and slipping of the occupant's buttocks can be suppressed.

Thirteenth Embodiment

Next, a vehicle seat device S13 of a thirteenth embodiment will be described with reference to FIGS. 29A, 29B, and 29C.

It should be noted that description of content that overlaps with the vehicle seat devices S1 to S12 described above will be omitted.

The vehicle seat device S13 includes a seat main body having a seat back 1202, a reclining device 1230, a seat belt device 1240, and a control device 1280.

The seat belt device 1240 includes a belt retractor 1243 winding a lap belt 1241$b$ of a seat belt 1241 such that the lap belt 1241$b$ can be pulled out.

The restraining force (tightening force) of the lap belt 1241$b$ can be adjusted in accordance with the backward tilt angle of the seat back 1202 as the control device 1280 controls the drive of the seat belt device 1240 (belt retractor 1243) when a frontal collision of the vehicle is detected or detected in advance.

Figure 29A:
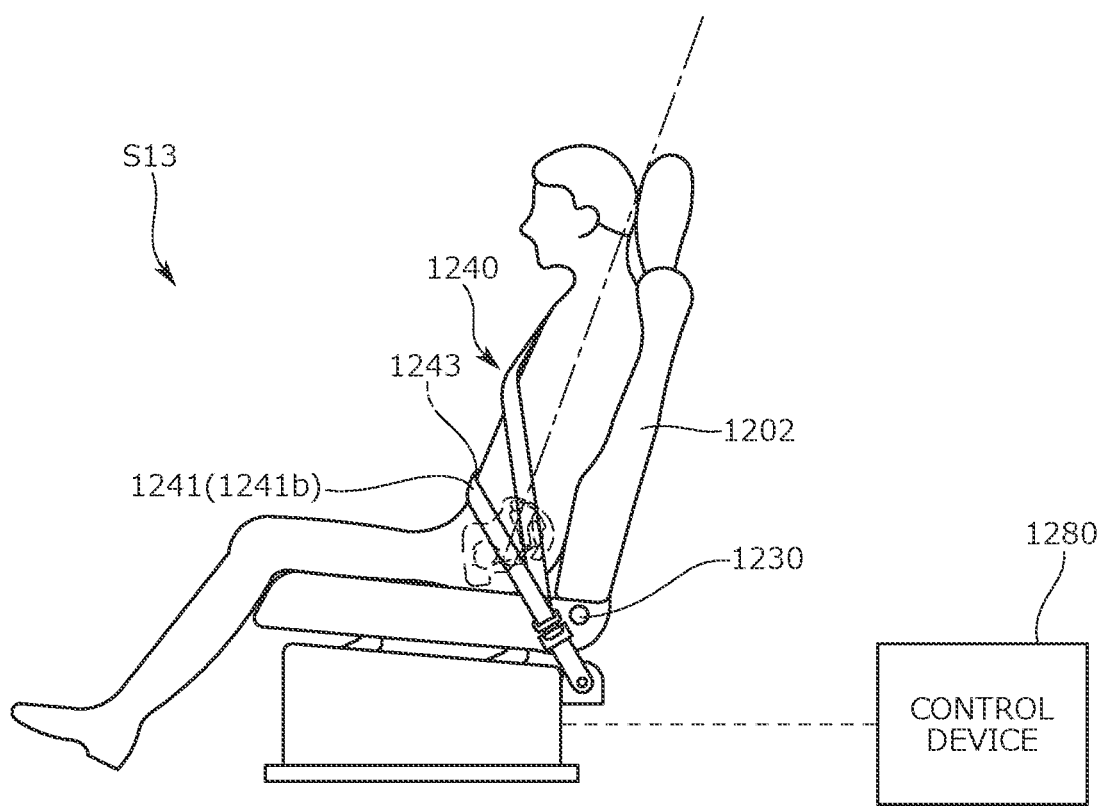
FIG. 29A is a side view of a vehicle seat device of a thirteenth embodiment, illustrating a state where a seat back is at "normal position".

Specifically, when the seat back 1202 is at "normal position" illustrated in FIG. 29A, that is, when the backward tilt angle of the seat back 1202 is $\beta$ degrees, the control device 1280 makes the restraining force of the lap belt 1241$b$ stronger than usual to strongly restrain the occupant.

Figure 29B:
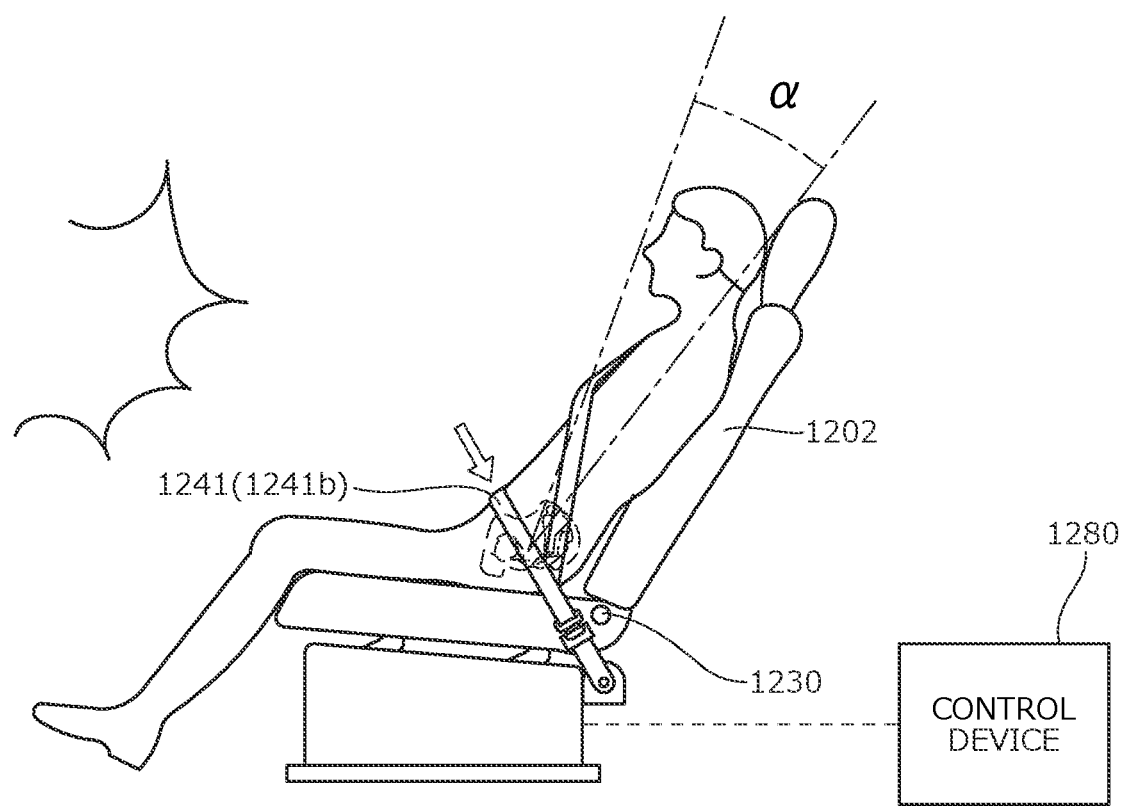
FIG. 29B is a diagram illustrating a state where the seat back is at "first backward tilt position" where the seat back is tilted backward up to a backward tilt angle α.

In addition, the control device 1280 makes the restraining force of the lap belt 1241$b$ stronger than usual to strongly restrain the occupant also when the seat back 1202 is at "first backward tilt position (intermediate position)" illustrated in FIG. 29B, that is, when the backward tilt angle of the seat back 1202 is $\alpha$ degrees.

Figure 29C:
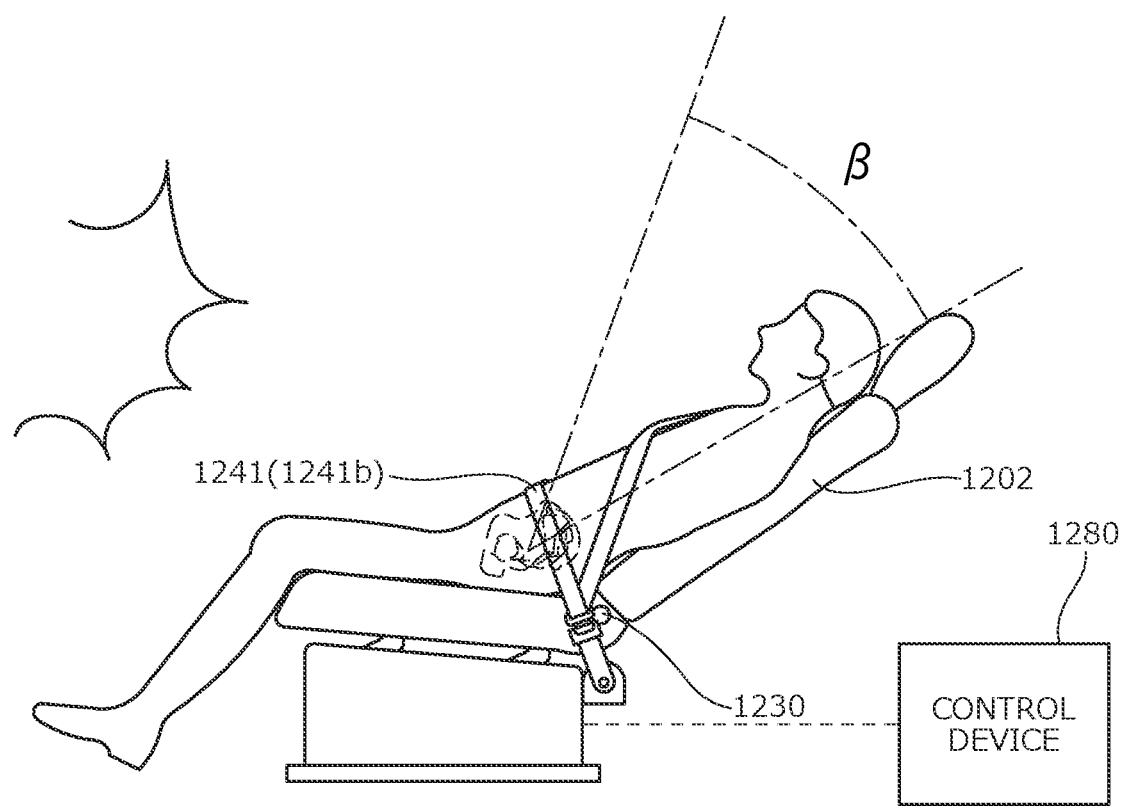
FIG. 29C is a diagram illustrating a state where the seat back is at "second backward tilt position" where the seat back is tilted backward up to a backward tilt angle β.

On the other hand, the control device 1280 keeps the normal restraining force of the lap belt 1241$b$ when the seat back 1202 is at "second backward tilt position (relax position)" illustrated in FIG. 29C, that is, when the backward tilt angle of the seat back 1202 is $\beta$ degrees.

If the restraining force of the lap belt 1241$b$ is made stronger than usual when the backward tilt angle is $\beta$ degrees or exceeds $\beta$ degrees, the lap belt 1241$b$ slips into the occupant's abdomen and it becomes difficult to hold the occupant at a suitable position.

Therefore, by the control device 1280 controlling the drive of the seat belt device 1240 as described above, the occupant's posture can be maintained at a suitable position in the event of a frontal collision of the vehicle, and the submarine phenomenon can be suppressed suitably.

It should be noted that $\beta$ degrees, which is a threshold of the backward tilt angle of the seat back 1202, can be appropriately set and changed based on occupant information such as the occupant's physique difference and body weight (obesity).

Fourteenth Embodiment (Vehicle Rear Collision Response)

Figure 30:
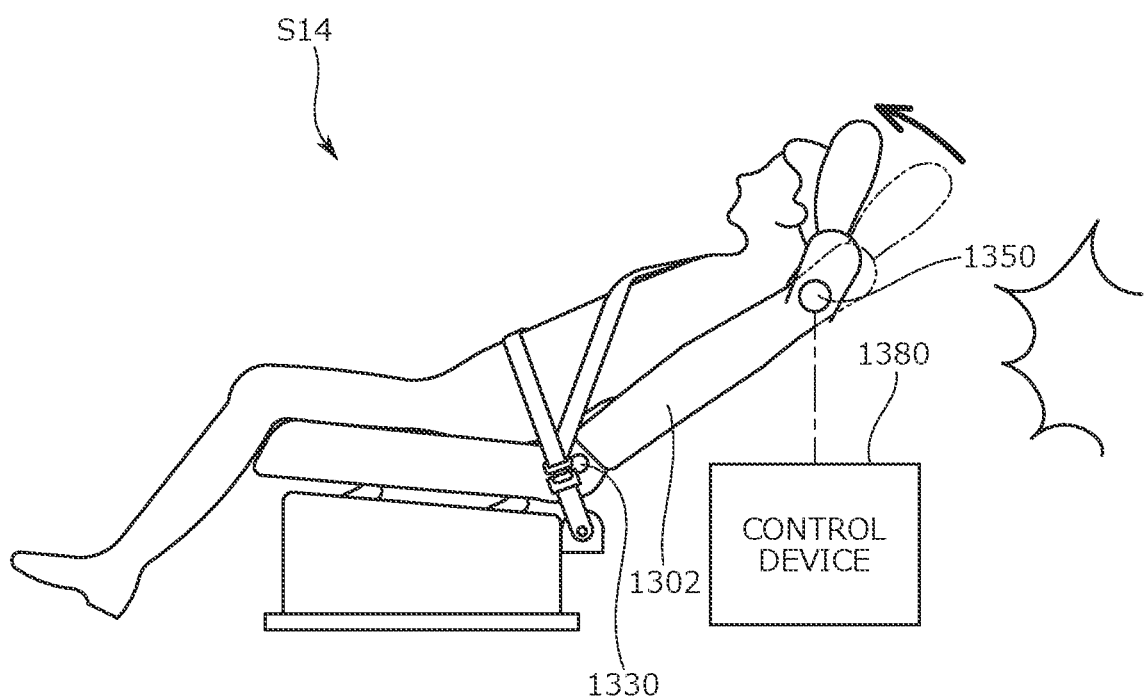
FIG. 30 is a side view of a vehicle seat device of a fourteenth embodiment, illustrating a state where a portion of a seat back and a headrest have moved forward due to a rear collision of a vehicle.

Next, a vehicle seat device S14 of a fourteenth embodiment will be described with reference to FIG. 30.

It should be noted that description of content that overlaps with the vehicle seat devices S1 to S13 described above will be omitted.

The vehicle seat device S14 includes a seat main body having a seat back 1302, a reclining device 1330, a seat back movable device 1350, and a control device 1380.

The seat back movable device 1350 is a device capable of pivoting the upper part of the seat back 1302 forward.

The upper part of the seat back 1302 is pivoted forward as the control device 1380 controls the drive of the seat back movable device 1350 when a rear collision of the vehicle is detected or detected in advance.

By doing so, the occupant's posture can be set to a suitable position in the event of a rear collision of the vehicle, and the occupant riding up can be suppressed suitably. In other words, the occupant's shoulder can be received by the upper portion of the seat back 1302 and the load on the occupant's neck can be reduced.

Fifteenth Embodiment (Vehicle Rear Collision Response)

Figure 31:
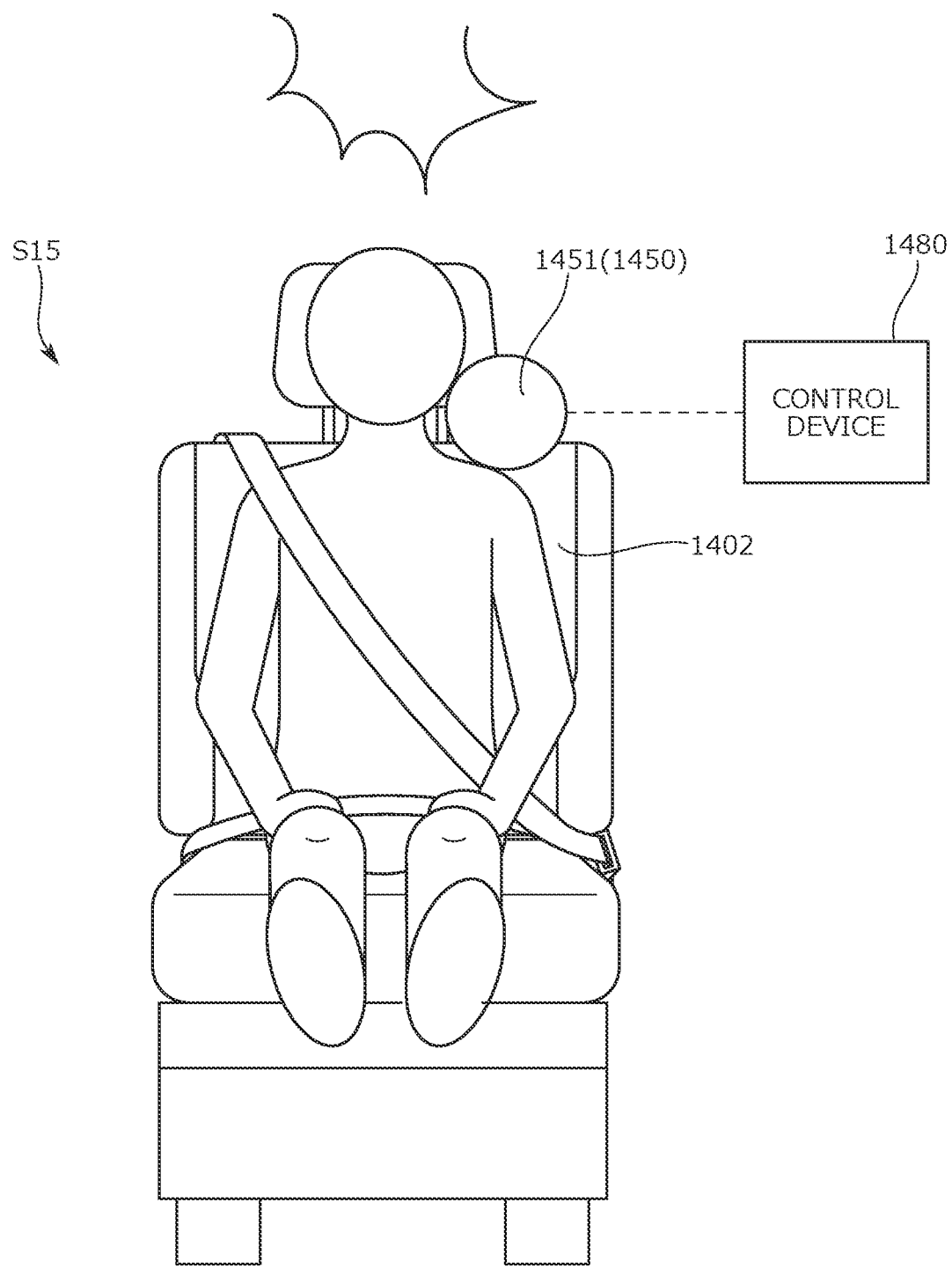
FIG. 31 is a front view of a vehicle seat device of a fifteenth embodiment, illustrating a state where an airbag on an upper portion of a seat back is inflated.

Next, a vehicle seat device S15 of a fifteenth embodiment will be described with reference to FIG. 31.

It should be noted that description of content that overlaps with the vehicle seat devices S1 to S14 described above will be omitted.

The vehicle seat device S15 includes a seat main body having a seat back 1402, a seat belt device 1440, an airbag device 1450, and a control device 1480.

The airbag device 1450 is attached to the upper portion (upper end portion) of the seat back 1402 and is capable of forward inflation deployment of an airbag 1451.

The airbag 1451 is inflation-deployed forward as the control device 1480 controls the drive of the airbag device 1450 when a rear collision of the vehicle is detected or detected in advance.

By doing so, the occupant's posture can be set to a suitable position in the event of a rear collision of the vehicle, and the occupant riding up can be suppressed suitably.

It should be noted that a plate-shaped member or the like may protrude instead of the airbag.

Sixteenth Embodiment (Vehicle Rear Collision Response)

Next, a vehicle seat device S16 of a sixteenth embodiment will be described with reference to FIGS. 32A, 32B, and 32C.

It should be noted that description of content that overlaps with the vehicle seat devices S1 to S15 described above will be omitted.

The vehicle seat device S16 includes a seat main body having a seat cushion 1501 and a seat back 1502, a reclining device 1530, a seat belt device 1540, an anchor moving device 1550, an ottoman device 1560, a tilt device 1570, and a control device 1580.

The reclining device 1530 is capable of switching the seat back 1502 between "normal position" and "relax position".

The anchor moving device 1550 is capable of moving a belt anchor 1544 in the seat front to back direction.

The ottoman device 1560 is capable of switching a leg support member 1561 between "normal position" and "footrest position" at which the leg support member 1561 is pivoted upward toward the front side beyond the normal position.

The tilt device 1570 is capable of moving the front part of the seat cushion 1501 in the up to down direction.

Figure 32A:
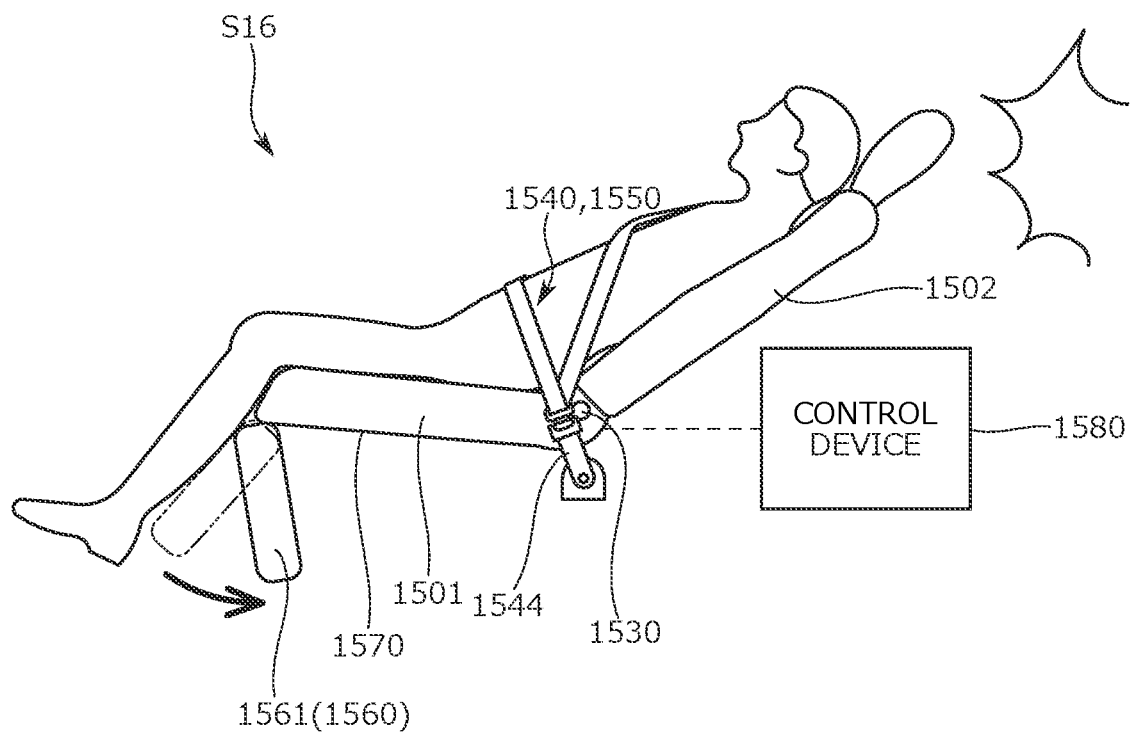
FIG. 32A is a side view of a vehicle seat device of a sixteenth embodiment and is a diagram for describing a state where a footrest has moved from "protruding position" to "normal position".

In the above configuration, as illustrated in FIG. 32A, when a rear collision of the vehicle is detected or detected in advance with the seat main body at "relax position", the control device 1580 first controls the drive of the ottoman device 1560 to drop the leg support member 1561 from "footrest position" to "normal position" (step S1). By doing so, it is possible to drop below the occupant's knees.

Figure 32B:
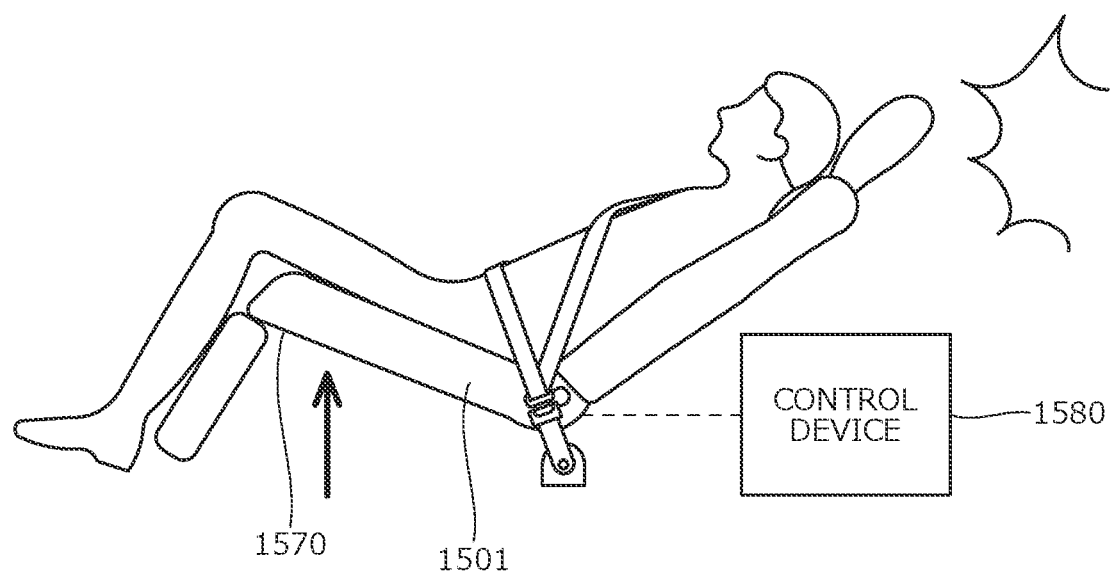
FIG. 32B is a diagram for describing a state where the front part of a seat cushion has moved upward from "normal position" to "tilt position".

Then, as illustrated in FIG. 32B, simultaneously with the movement of the leg support member 1561 or immediately after the movement of the leg support member 1561, the control device 1580 controls the drive of the tilt device 1570 to move the front part of seat cushion 1501 upward (step S2). By doing so, it is possible to relatively sink the occupant's lumbar.

Figure 32C:
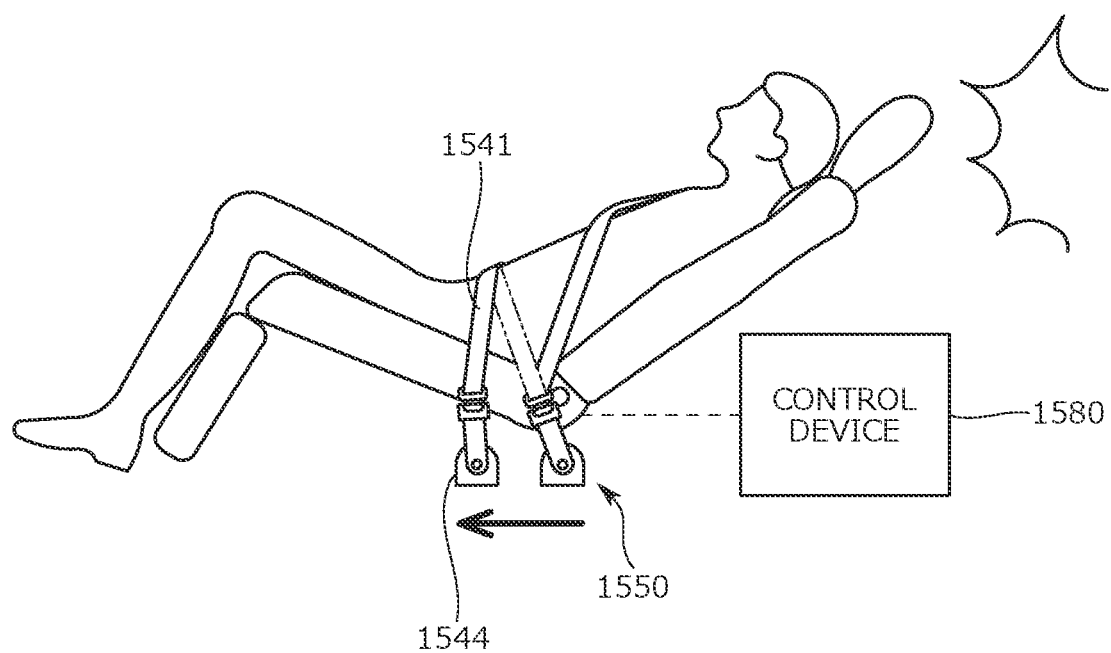
FIG. 32C is a diagram for describing a state where a belt anchor and a lap belt have moved from "normal position" to "front position".

Then, as illustrated in FIG. 32C, simultaneously with the movement of the seat cushion 1501 or immediately after the movement of the seat cushion 1501, the control device 1580 controls the drive of the anchor moving device 1550 to move the belt anchor 1544 forward (step S3). By doing so, a seat belt 1541 easily tightens the occupant downward. At that time, the drive of the belt retractor may be controlled to make the tightening force of the seat belt 1541 stronger than usual.

By doing so, the occupant's posture can be set to a suitable position in the event of a rear collision of the vehicle, and the occupant riding up can be suppressed suitably.

Seventeenth Embodiment (Vehicle Rear Collision Response)

Figure 33:
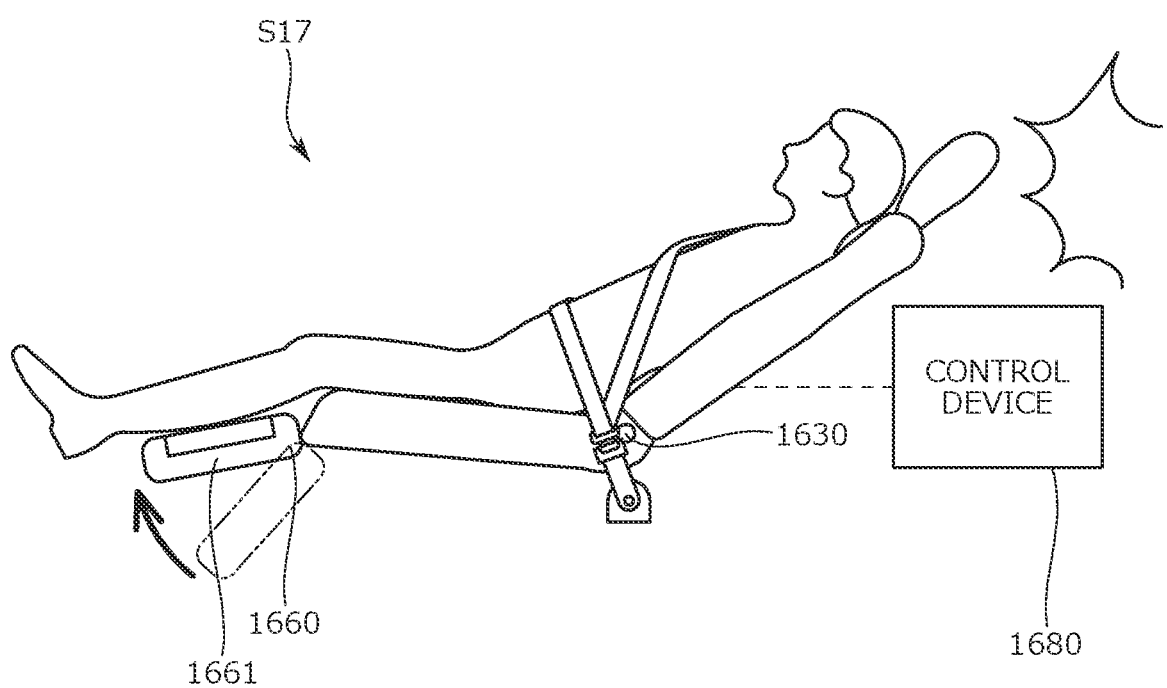
FIG. 33 is a side view of a vehicle seat device of a seventeenth embodiment and is a diagram for describing a state where a footrest has moved from "normal position" to "protruding position".

Next, a vehicle seat device S17 of a seventeenth embodiment will be described with reference to FIG. 33.

It should be noted that description of content that overlaps with the vehicle seat devices S1 to S16 described above will be omitted.

The vehicle seat device S17 includes a seat main body having a seat cushion 1601 and a seat back 1602, a reclining device 1630, an ottoman device 1660, and a control device 1680.

The reclining device 1630 is capable of switching the seat back 1602 between "normal position" and "relax position".

The ottoman device 1660 is capable of moving a leg support member 1661 in the seat front to back direction.

The ottoman device 1660 is capable of switching the leg support member 1661 between "normal position" and "footrest position" at which the leg support member 1661 is pivoted upward toward the front side beyond the normal position.

It should be noted that the part of the leg support member 1661 that abuts against the occupant's leg is provided with an impact absorbing portion more cushionable than the other part. The impact absorbing portion may be an air cell. The impact absorbing portion (air cell) may be controlled to inflate when the impact absorbing portion abuts against the occupant's leg.

When a rear collision of the vehicle is detected or detected in advance with the seat main body at "relax position", the control device 1680 controls the drive of the ottoman device 1660 to move the leg support member 1561 from "normal position" to "footrest position". Alternatively, the control device 1680 may control the drive of the ottoman device 1660 to move the leg support member 1561 further upward from "footrest position". By doing so, the occupant's leg can be deflected upward.

With the above configuration, it is possible to suppress the occupant's leg strongly hitting the front end portion of the seat cushion 1601 in the event of a rear collision of the vehicle. In other words, the trajectory of the occupant's leg can be shifted upward by the leg support member 1661 suitably holding the occupant's leg (calf). In addition, it is possible to disperse the load in the event of a collision by increasing the area of the occupant's contact with the seat main body.

Eighteenth Embodiment (Vehicle Rear Collision Response)

Figure 34:
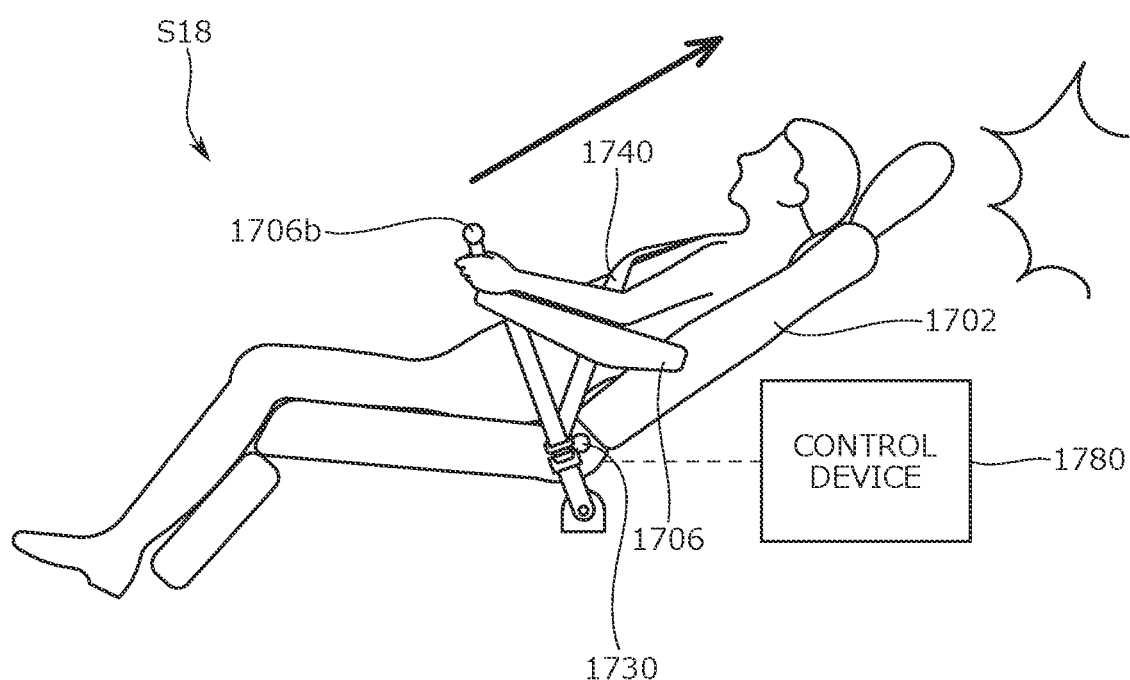
FIG. 34 is a side view of a vehicle seat device of an eighteenth embodiment.

Next, a vehicle seat device S18 of an eighteenth embodiment will be described with reference to FIG. 34.

It should be noted that description of content that overlaps with the vehicle seat devices S1 to S17 described above will be omitted.

The vehicle seat device S18 includes a seat main body having a seat back 1702 and an armrest 1706, a reclining device 1730, a seat belt device 1740, and a control device 1780.

The armrest 1706 has a grip portion 1706b for the occupant to hold with his or her arm. The grip portion 1706b may be a bar protruding upward from the main body portion of the armrest 1706 or may be a recessed portion formed in the main body portion of the armrest 1706.

Alternatively, the grip portion 1706b may be attached to a console box or the like.

The reclining device 1730 is capable of switching the seat back 1702 from "normal position" to "relax position".

When a rear collision of the vehicle is detected or detected in advance with the seat main body at "relax position", the control device 1780 performs control using a speaker (not illustrated) so as to announce "please hold the grip" or the like toward the occupant.

By doing so, the occupant riding up can be suitably suppressed even with the seat main body at "relax position" in the event of a rear collision of the vehicle. In other words, the occupant can be urged to hold the grip in an emergency.

This is because occupants (drivers) will not hold steering wheels (opportunities to hold will decrease) considering future autonomous driving technology and is to substitute steering wheels with grips.

Nineteenth Embodiment (Vehicle Lateral Collision Response)

Figure 35A:
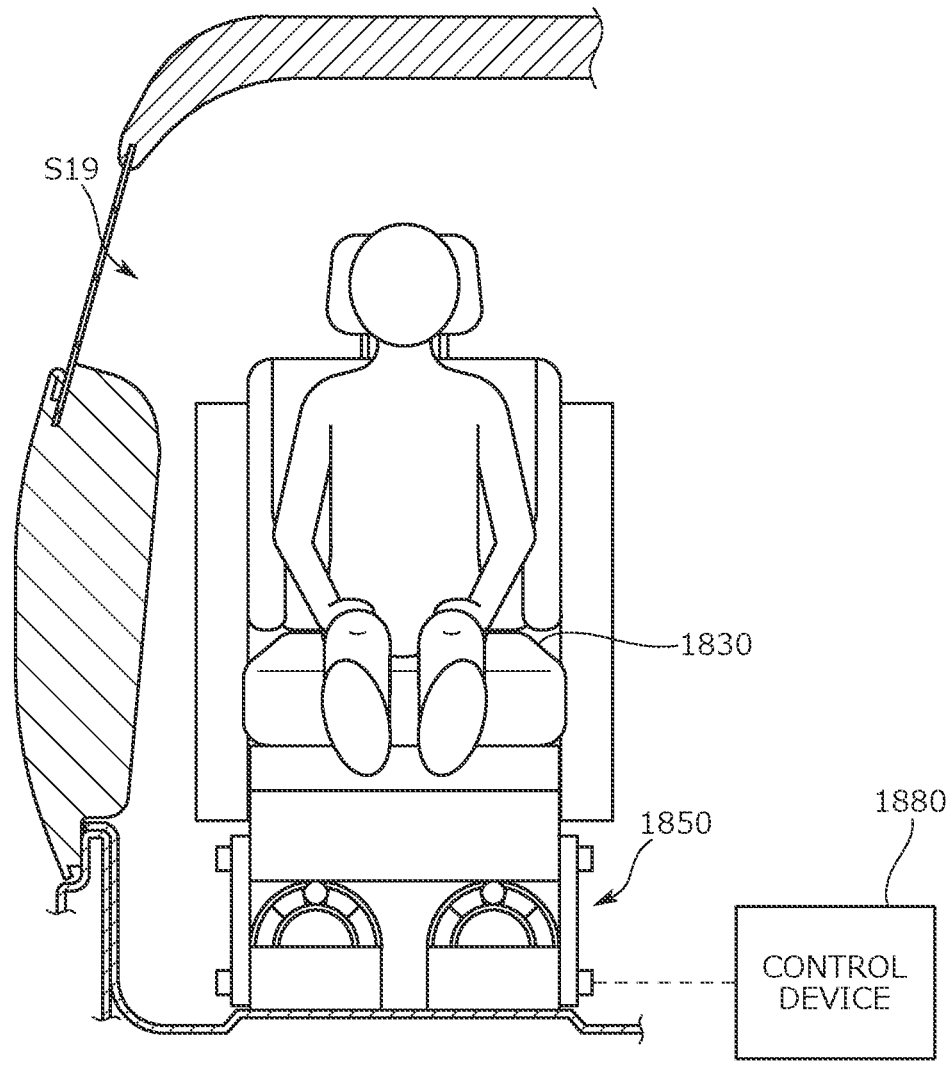
FIG. 35A is a front view of a vehicle seat device of a nineteenth embodiment, illustrating a state where a seat tilt adjusting device is at "normal position".
Figure 35A:
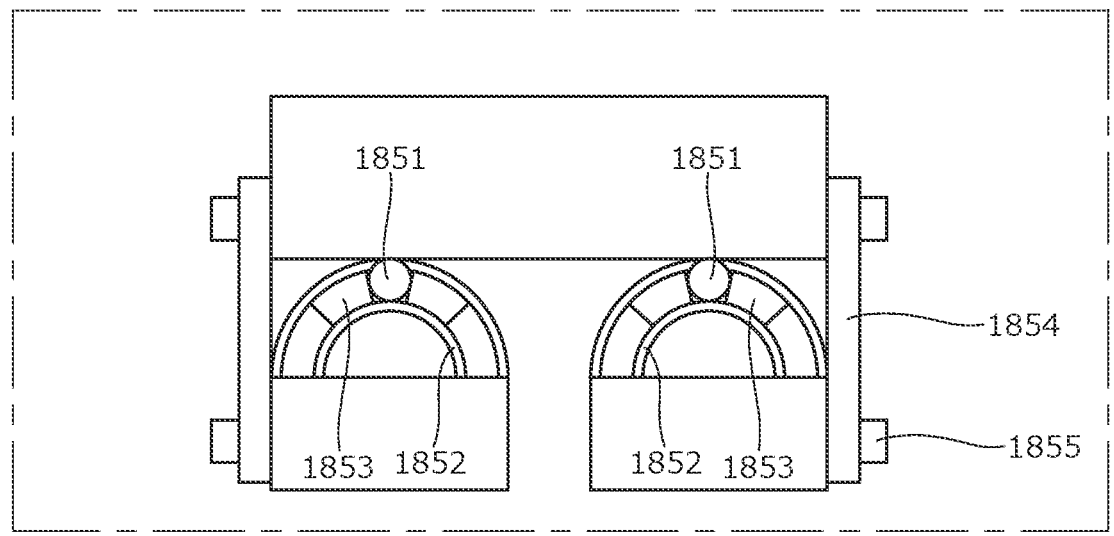
Figure 35B:
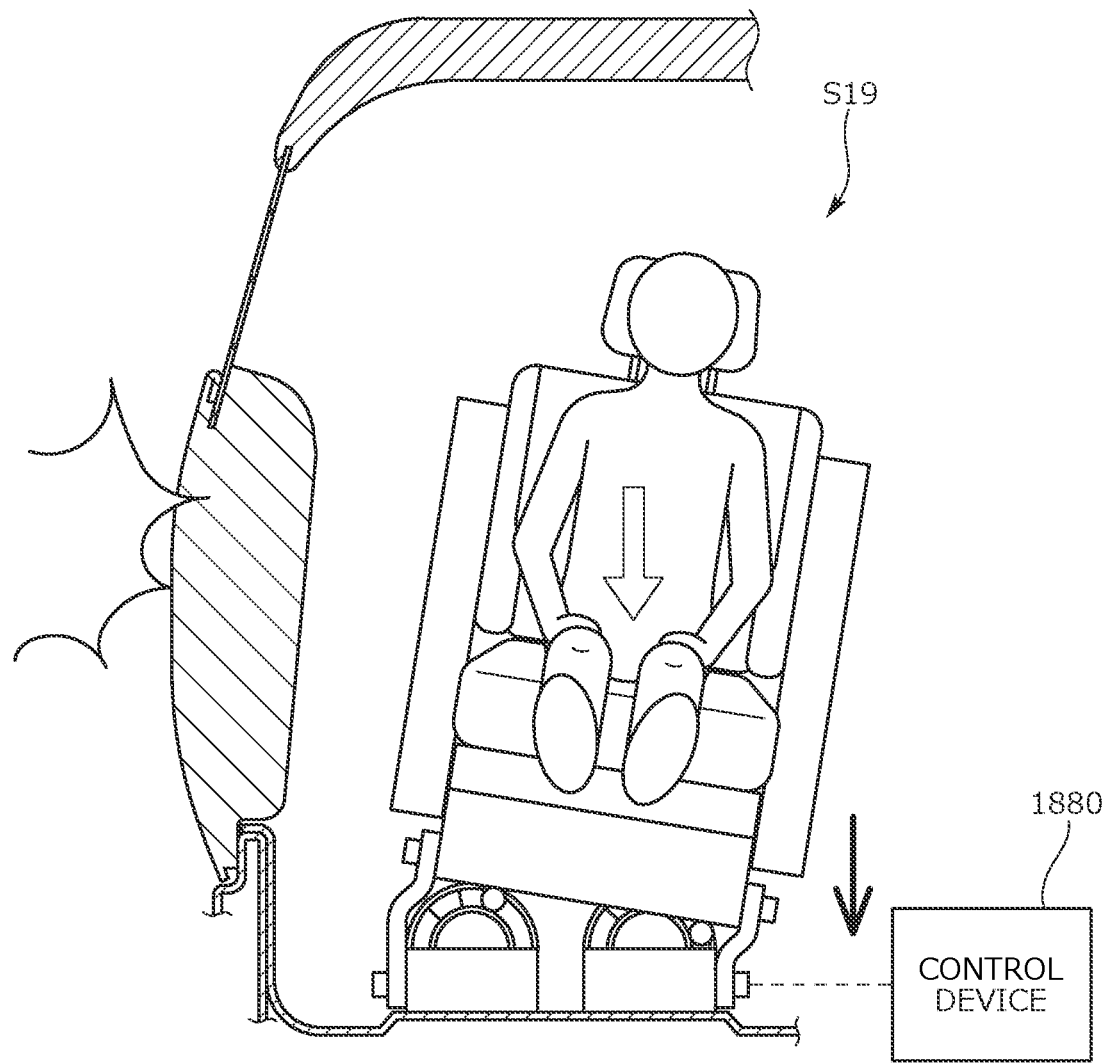
FIG. 35B is a diagram illustrating a state where the seat tilt adjusting device has rotationally moved from "normal position" to "tilt position" due to a lateral collision of a vehicle.
Figure 35B:
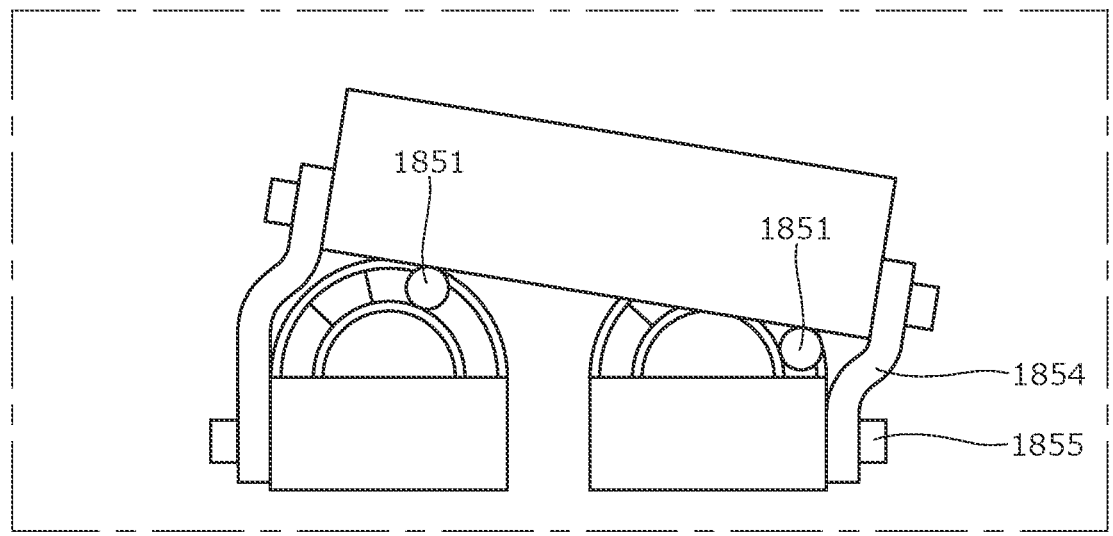

Next, a vehicle seat device S19 of a nineteenth embodiment will be described with reference to FIGS. 35A and 35B.

It should be noted that description of content that overlaps with the vehicle seat devices S1 to S18 described above will be omitted.

The vehicle seat device S19 includes a seat main body, a reclining device 1830, a seat tilt adjusting device 1850, and a control device 1880.

The reclining device 1830 is a device capable of switching the seat main body from "normal position" to "relax position".

The seat tilt adjusting device 1850 is a device capable of tilting the seat main body to the outside in the seat width direction.

Specifically, the seat tilt adjusting device 1850 includes a support member 1851 supporting the seat main body from below, a holder member 1852 for pivoting the support member 1851 along a predetermined pivot trajectory, and a lock member 1853 provided in the holder member and capable of locking the pivoting of the support member 1851.

In addition, the seat tilt adjusting device 1850 further includes a belt member 1854 connecting the seat main body side and the vehicle body side and a pretensioner 1855 provided on the vehicle body side to allow the belt member 1854 to be pulled out.

When a lateral collision of the vehicle is detected or detected in advance with the seat main body at "relax position", the control device 1880 controls the drive of the seat tilt adjusting device 1850 to tilt the seat main body toward the middle side in the vehicle width direction and lower the inside part of the seat main body.

Specifically, the control device 1880 releases the lock state caused by the lock member 1853 and controls the drive of the pretensioner 1855 to pull (tighten) the belt member 1854.

Then, the seat main body (support member 1851) is pivoted along the pivot trajectory of the holder member 1852 by the occupant's own weight and the inflation force of the side airbag provided in the vehicle body.

With the above configuration, in the event of a lateral collision of the vehicle, a clearance can be ensured between the occupant and the vehicle body (lateral wall of the vehicle body) and the impact load on the occupant can be reduced.

It should be noted that in a case where the seat main body is at "relax position", the occupant's head is at a low position and thus may fall out of the range of protection of the side airbag. Even in such a case, the impact load on the occupant's head can be reduced.

Twentieth Embodiment (Vehicle Lateral Collision Response)

Figure 36A:
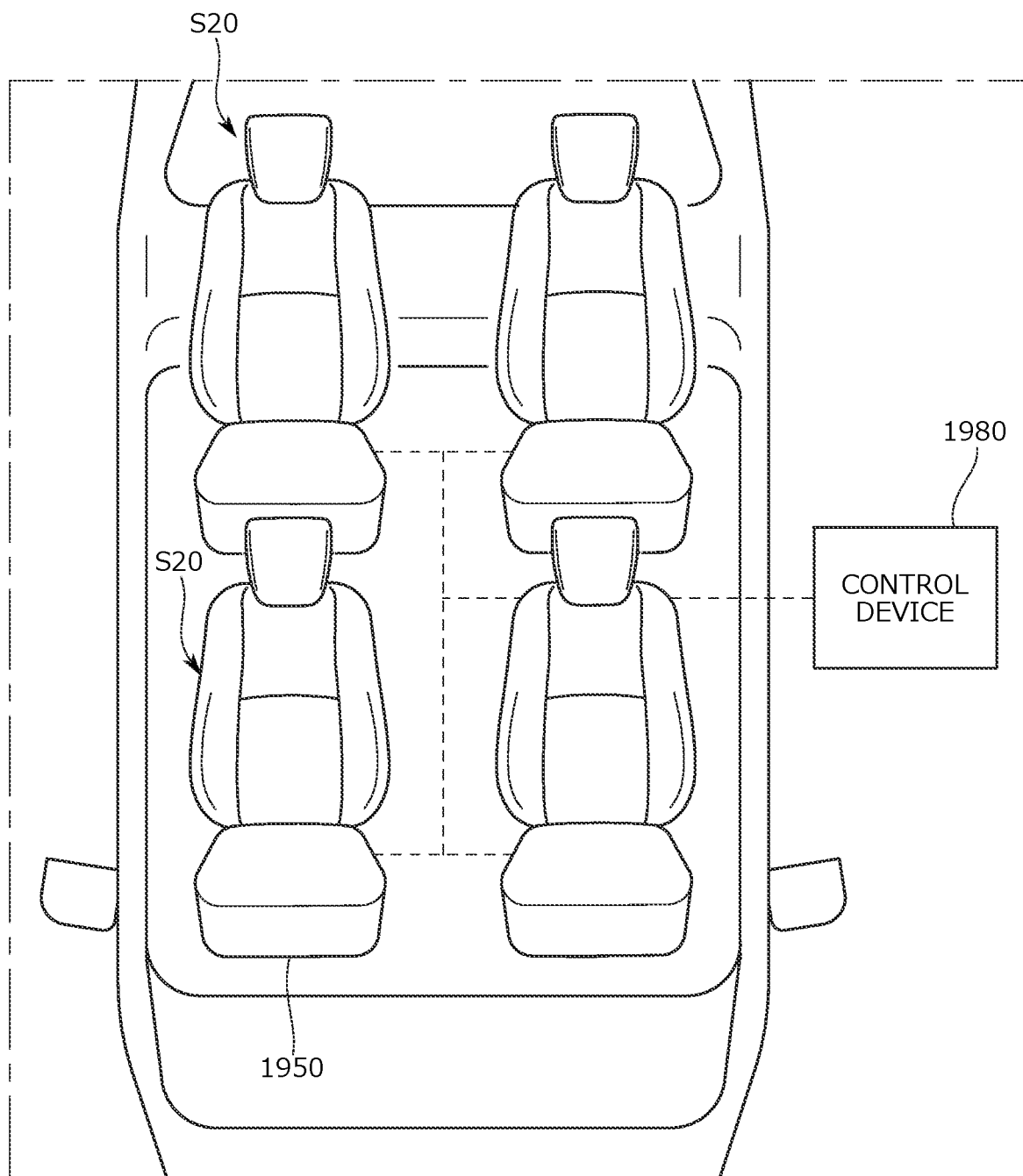
FIG. 36A is a top view of a vehicle seat device of a twentieth embodiment, illustrating a state where a seat main body is at "normal position".
Figure 36B:
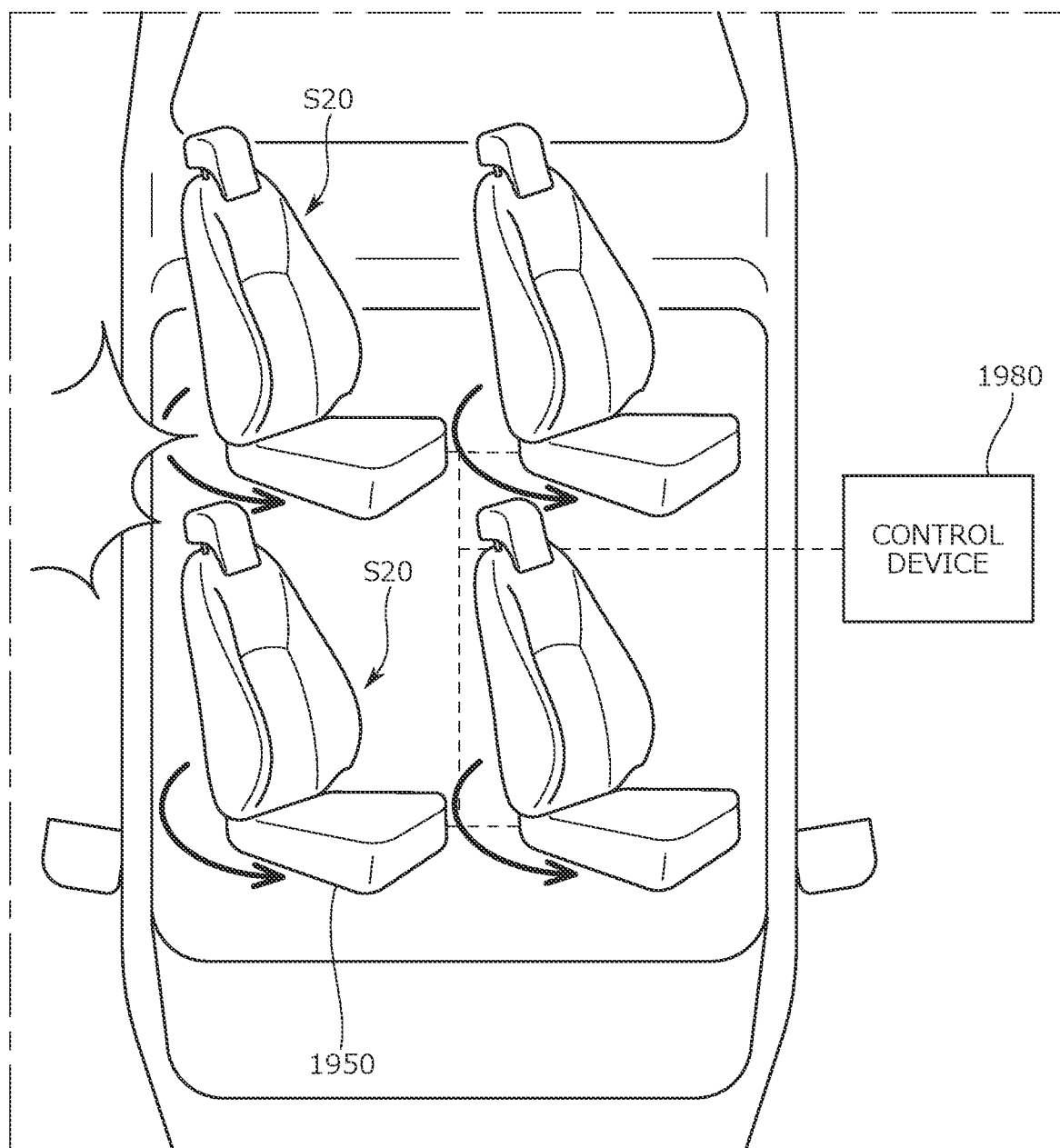
FIG. 36B is a diagram illustrating a state where the seat main body has rotationally moved from "normal position" to "rotation position" due to a lateral collision of a vehicle.

Next, a vehicle seat device S20 of a twentieth embodiment will be described with reference to FIGS. 36A and 36B.

It should be noted that description of content that overlaps with the vehicle seat devices S1 to S19 described above will be omitted.

The vehicle seat device S20 includes a seat main body, a seat rotating device 1950, and a control device 1980.

The seat rotating device 1950 is a device capable of rotating the seat main body around an axis along the up to down direction.

When a lateral collision of the vehicle is detected or detected in advance with the seat main body at "relax position", the control device 1980 controls the drive of the seat rotating device 1950 and rotates the seat main body so as to tilt to the middle side in the vehicle width direction.

By doing so, in the event of a lateral collision of the vehicle, the area of contact between the occupant and the seat main body can be increased suitably and the occupant can suitably follow the movement of the vehicle. As a result, it is possible to suppress the occupant's collision with the lateral wall of the vehicle attributable to the inertial force entailed by the lateral collision of the vehicle. In other words, a clearance can be ensured between the occupant and the vehicle body (lateral wall of the vehicle body) and the impact load on the occupant can be reduced.

Twenty-first Embodiment (Vehicle Collision Response)

Next, a vehicle seat device S21 of a twenty-first embodiment will be described with reference to FIGS. 37A, 37B, and 37C.

It should be noted that description of content that overlaps with the vehicle seat devices S1 to S20 described above will be omitted.

The vehicle seat device S21 includes a seat main body, a seat belt device 2040, and a control device 2080.

The seat belt device 2040 has a five-point seat belt 2041. It should be noted that the seat belt device 2040 may have a four-point seat belt, a six-point seat belt, or the like instead.

Figure 37A:
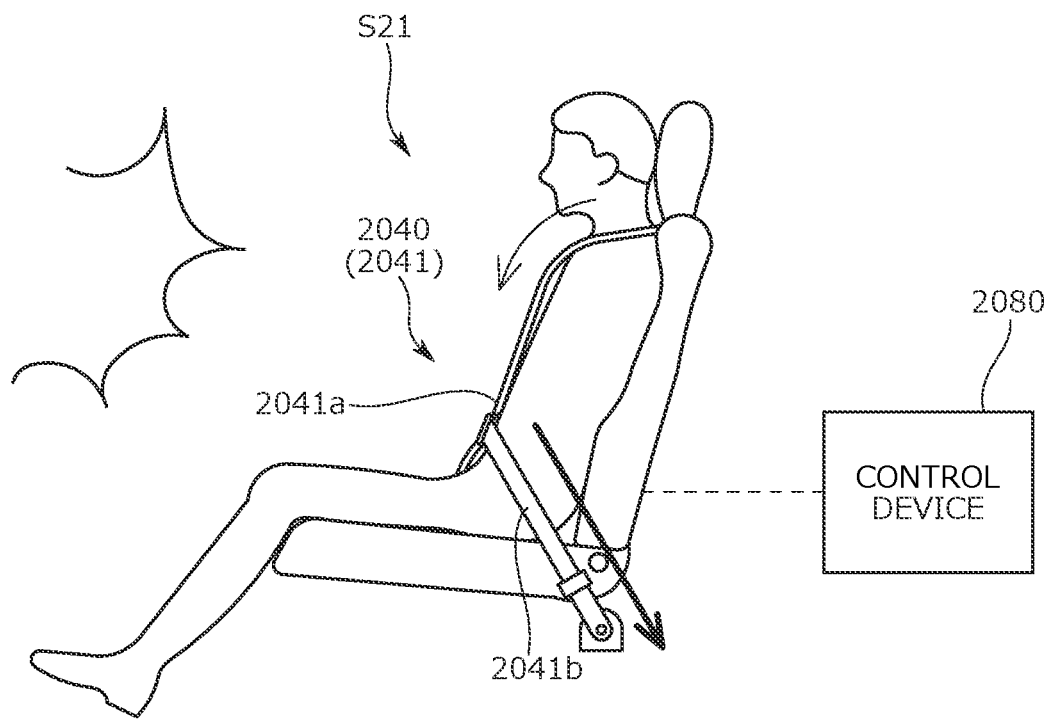
FIG. 37A is a side view of a vehicle seat device of a twenty-first embodiment and is a diagram for describing a state where a seat belt device has operated due to a frontal collision of a vehicle.

As illustrated in FIG. 37A, when a frontal collision of the vehicle is detected or detected in advance, the control device 2080 controls the drive of the seat belt device 2040 (belt retractor) to weaken the retraction force of a shoulder belt 2041a and strengthen the retraction force of a lap belt 2041b.

By doing so, the occupant's upper body can be raised slightly forward and the load applied to the occupant's spine can be mitigated. In addition, the occupant's pelvis can be fixed and the submarine phenomenon can be suppressed.

Figure 37B:
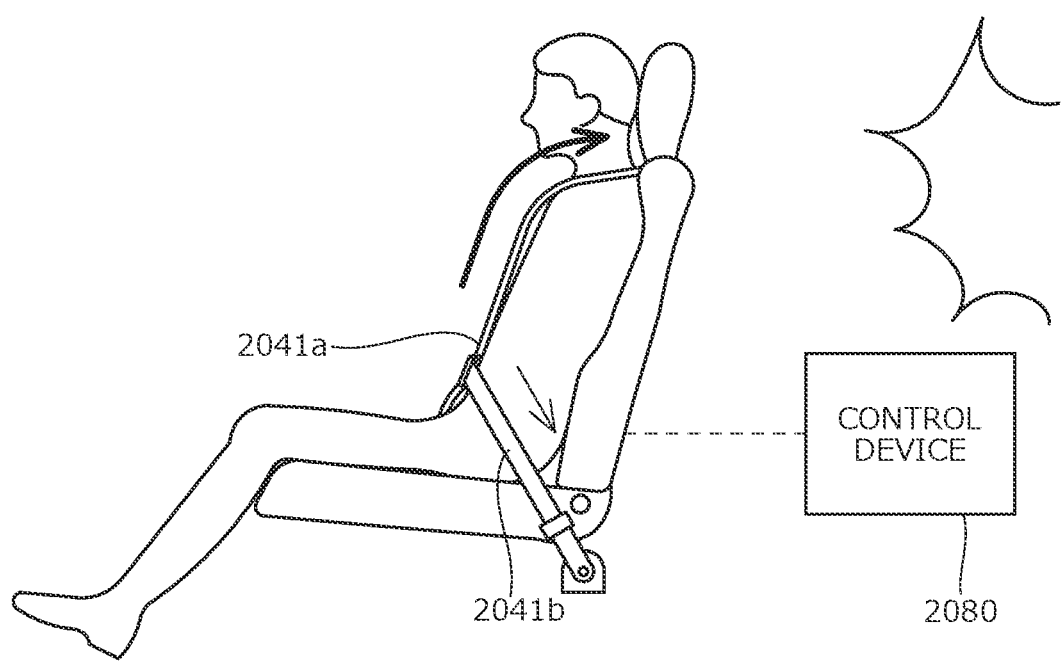
FIG. 37B is a diagram for describing a state where the seat belt device has operated due to a rear collision of a vehicle.

In addition, as illustrated in FIG. 37B, when a rear collision of the vehicle is detected or detected in advance, the control device 2080 controls the drive of the seat belt device 2040 (belt retractor) to strengthen the retraction force of the shoulder belt 2041a and weaken the retraction force of the lap belt 2041b.

By doing so, the occupant's upper body can be laid down slightly, the distance between the occupant's head and the headrest can be reduced, and the occupant riding up due to a rear collision of the vehicle can be suppressed. In addition, it is possible to avoid damage to the occupant's internal organs attributable to the occupant's rebound motion entailed by the rear collision.

Figure 37C:
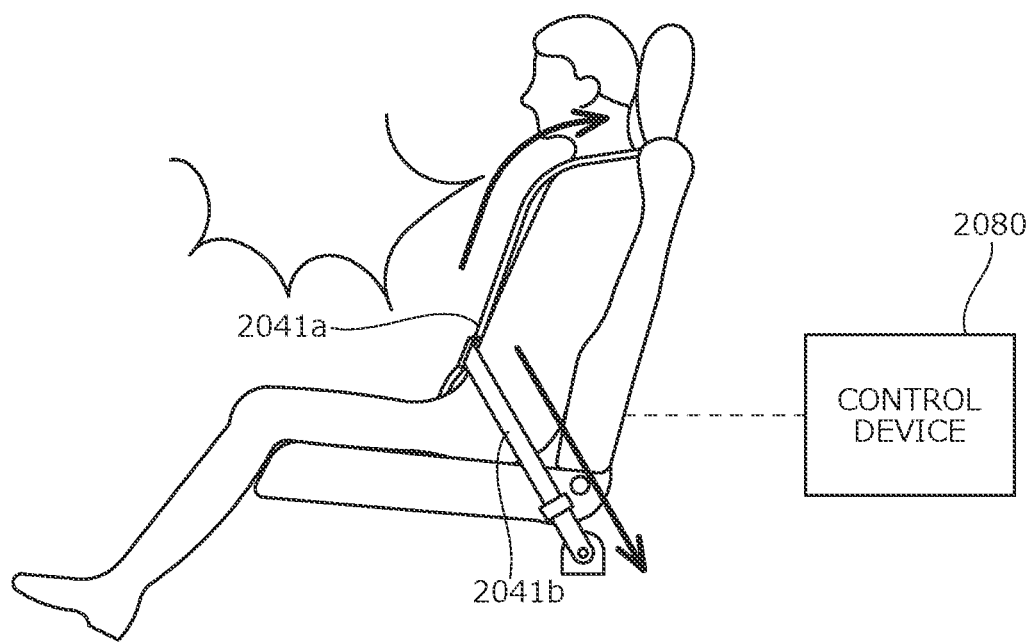
FIG. 37C is a diagram for describing a state where the seat belt device has operated due to a lateral collision of a vehicle.

In addition, as illustrated in FIG. 37C, when a lateral collision of the vehicle is detected or detected in advance, the control device 2080 controls the drive of the seat belt device 2040 (belt retractor) to strengthen the retraction force of the shoulder belt 2041*a* and strengthen the retraction force of the lap belt 2041*b*.

By doing so, the occupant can be strongly pressed against the seat main body and the occupant's lateral movement entailed by a lateral collision of the vehicle can be suppressed suitably.

As described above, by adjusting the retraction of the seat belt in accordance with the frontal, rear, and lateral collisions of the vehicle, the occupant's posture can be set to a suitable position and the occupant can be suitably protected from the collision load applied to the occupant.

Others

Although a vehicle seat device used in an automobile has been described as a specific example in the above embodiments, the present invention is not particularly limited and can also be used for various seat devices such as two-wheeled seat devices for two-wheeled vehicles, seat devices for vehicles such as trains and buses, seat devices for conveyances such as airplanes and ships, office chair devices for work, wheelchair devices, and child chair devices for shopping carts.

In the above embodiments, the vehicle seat device according to the present invention has been mainly described.

However, the above embodiments are merely examples for facilitating understanding of the present invention and do not limit the present invention. The present invention can be modified and improved without departing from the spirit thereof, and it is a matter of course that the present invention includes equivalents thereof.

REFERENCE SIGNS LIST

S1 to S21: vehicle seat device
1, 101, 201, 301, 401, 601, 701, 801, 901, 1501, 1601: seat cushion
  1*a*, 2*a*, 3*a*: pad material
  1*b*, 2*b*, 3*b*: skin material
2, 102, 202, 302, 402, 502, 602, 702, 802, 902, 1102, 1302, 1402, 1502, 1602, 1702: seat back
3, 504, 806, 906: headrest
  3*c*: pillar
4, 404: height link device
  404*a*: first link
  404*b*: second link
5: rail device
10: cushion frame
11: side frame
12: pan frame
13: rear connecting frame
14: support member (elastic spring)
15: attachment member (attachment clip)
20, 220: back frame
21: back side frame
22: upper frame
23: lower frame
26: pillar attachment member
30, 130, 230, 330, 430, 1230, 1330, 1530, 1630, 1730, 1830: reclining device
31, 231, 331: reclining main body
32, 132, 332: pivot shaft
33: connecting member
34: spiral spring
35: spring locking bracket
36: spring locking member
40, 140, 240, 340, 440, 640, 740, 1240, 1540, 1740, 2040: seat belt device
41, 141, 241, 641, 741, 1241, 2041: seat belt, five-point seat belt
  41*a*, 641*a*, 741*a*, 2041*a*: shoulder belt
  41*b*, 141*b*, 241*b*, 341*b*, 1241*b*, 2041*b*: lap belt
  41*c*: tongue plate
42, 43, 1243: belt retractor
44, 144, 244, 344, 1544: belt anchor
  44*a*, 144*a*, 344*a*: anchor bracket
  44*b*: anchor pivot shaft
  44*c*: anchor extending portion
  44*d*, 144*d*, 244*d*: anchor buckle
645, 745: belt guide
  645*a*, 745*a*: first housing
  645*b*, 745*b*: second housing
  645*c*, 745*c*: belt holding portion
  645*d*, 745*d*: fragile portion
  745*e*: connecting body
50, 150, 250, 350, 450, 1550: anchor moving device
51: movable member
  51*a*: fixed bracket
52: connecting member (connecting link)
  52*a*: first link pivot shaft
  52*b*: elongated link
  52*c*: second link pivot shaft
  52*d*: short link
151: drive mechanism
  151*a*: drive shaft
    151*aa*: drive gear portion
  151*b*: connecting shaft
  151*c*, 151*d*: stopper (regulating member)
152: transmission gear
  152*a*: wheel gear
  152*b*: worm
  152*c*: worm wheel
251: transmission cable (transmission member)
  251*a* to 251*c*: guide member
252: biasing spring
351: drive motor
352: telescopic rod
360: angle detection sensor (angle detection unit)
370: collision detection sensor (collision detection unit)
380, 480, 580, 880, 980, 1080, 1180, 1280, 1380, 1580, 1680, 1780, 1880, 1980, 2080: control device
381: storage unit
382: reference value setting unit
383: reference value update unit
384: communication unit
385: determination unit
386: control execution unit
550, 1350: seat back movable device
560: headrest movable device
570: airbag device
571: airbag
806, 1006, 1706: armrest
  1706*b*: grip portion
850, 1050: armrest movable device
907: table
950: table movable device
1150: lumbar support device
1151: lumbar support
1560, 1660: ottoman device
1561, 1661: leg support member 1570: tilt device
1850: seat tilt adjusting device
1851: support member
1852: holder member
1853: lock member
1854: belt member
1855: pretensioner
1950: seat rotating device
P: electric power source

The invention claimed is:

1. A vehicle seat device, comprising:
a seat main body having a seat cushion and a seat back;
a reclining device connecting the seat back to the seat cushion so as to be pivotable and capable of locking a pivoting motion of the seat back; and
a seat belt device for restraining an occupant seated on the seat main body,
wherein the seat belt device includes:
a lap belt restraining the occupant's lumbar or thighs,
a belt anchor attached at a position beside the seat main body and having a belt engaging portion engaging with an engaged portion provided in a tip portion of the lap belt, and
an anchor moving device capable of moving the belt engaging portion of the belt anchor in a seat front to back direction with respect to the seat main body,
wherein the anchor moving device includes:
a movable member attached to the seat cushion and movable in order to move the belt engaging portion to a seat front side beyond a normal position; and
a connecting member interposed between the movable member and the belt anchor and operating in order to convert a movable motion of the movable member into a moving motion of the belt anchor,
wherein the seat cushion includes a cushion frame as a skeleton, a pad material placed on the cushion frame, and a skin material covering the cushion frame and the pad material from above,
wherein the cushion frame includes:
side frames disposed on right and left sides in a seat width direction and extending in the seat front to back direction;
a front connecting frame connecting front parts of the right and left side frames; and
a rear connecting frame connecting rear parts of the right and left side frames, and
wherein the movable member is attached to a support member hooked on the front connecting frame and the rear connecting frame in a frame of the cushion frame.

2. The vehicle seat device according to claim 1, wherein the movable member is attached below the support member.

3. The vehicle seat device according to claim 1, wherein a plurality of support members are provided, and
the connecting member is disposed between the plurality of support members.

4. The vehicle seat device according to claim 1, wherein an end of the movable member in a left-right direction overlaps an end of the support member in the left-right direction in a top view.

5. The vehicle seat device according to claim 1, wherein a length of the movable member in the seat front to back direction is shorter than a length of the support member in the seat front to back direction.

6. The vehicle seat device according to claim 1, wherein a rear end of the movable member is disposed at a front position of a front end of the engaged portion.

7. A method for manufacturing a vehicle seat device, wherein the vehicle seat device includes a seat main body having a seat cushion and a seat back, a reclining device and a seat belt device, the method comprising:
preparing the seat main body;
attaching the reclining device to the seat main body so that the seat back is pivotable relation to the seat cushion and a pivoting motion of the seat back is locked; and
attaching the seat belt device to the seat main body so that the seat belt device restrains an occupant seated on the seat main body;
wherein the seat belt device includes:
a lap belt restraining the occupant's lumbar or thighs,
a belt anchor attached at a position beside the seat main body and having a belt engaging portion engaging with an engaged portion provided in a tip portion of the lap belt, and
an anchor moving device capable of moving the belt engaging portion of the belt anchor in a seat front to back direction with respect to the seat main body,
wherein the anchor moving device includes:
a movable member attached to the seat cushion and movable in order to move the belt engaging portion to a seat front side beyond a normal position; and
a connecting member interposed between the movable member and the belt anchor and operating in order to convert a movable motion of the movable member into a moving motion of the belt anchor,
wherein the seat cushion includes a cushion frame as a skeleton, a pad material placed on the cushion frame, and a skin material covering the cushion frame and the pad material from above,
wherein the cushion frame includes:
side frames disposed on right and left sides in a seat width direction and extending in the seat front to back direction;
a front connecting frame connecting front parts of the right and left side frames; and
a rear connecting frame connecting rear parts of the right and left side frames, and
wherein the movable member is attached to a support member hooked on the front connecting frame and the rear connecting frame in a frame of the cushion frame.

8. The method of claim 7, wherein the movable member is attached below the support member.

9. The method of claim 7, wherein
a plurality of support members are provided, and
the connecting member is disposed between the plurality of support members.

10. The method of claim 7, wherein an end of the movable member in a left-right direction overlaps an end of the support member in the left-right direction in a top view.

11. The method of claim 7, wherein a length of the movable member in the seat front to back direction is shorter than a length of the support member in the seat front to back direction.

12. The method of claim 7, wherein a rear end of the movable member is disposed at a front position of a front end of the engaged portion.

* * * * *